US012795327B2

(12) United States Patent
Vallet et al.

(10) Patent No.: US 12,795,327 B2
(45) Date of Patent: Nov. 10, 2026

(54) USER INTERFACES FOR NAVIGATING TO LOCATIONS OF SHARED DEVICES

(71) Applicant: Apple Inc., Cupertino, CA (US)

(72) Inventors: Leo Emile Jean Pierre Vallet, Los Angeles, CA (US); Frank De Jong, San Francisco, CA (US); Darious L. Allen, San Francisco, CA (US); Rachel F. Needle, New York, NY (US); William A. Viglakis, San Francisco, CA (US); William N. Danner, Santa Cruz, CA (US); Marcello Luppi, London (GB)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 18/677,680

(22) Filed: May 29, 2024

(65) Prior Publication Data

US 2024/0406677 A1 Dec. 5, 2024

Related U.S. Application Data

(60) Provisional application No. 63/581,955, filed on Sep. 11, 2023, provisional application No. 63/505,910, filed on Jun. 2, 2023.

(51) Int. Cl.

| | |
|---|---|
| ***H04W 4/24*** | (2024.01) |
| ***H04W 4/024*** | (2018.01) |
| ***H04W 4/029*** | (2018.01) |

(52) U.S. Cl.
CPC .......... *H04W 4/024* (2018.02); *H04W 4/029* (2018.02)

(58) Field of Classification Search
CPC ............................ H04W 4/024; H04W 4/029
See application file for complete search history.

(56) References Cited

U.S. PATENT DOCUMENTS 5,672,820 A 9/1997 Rossi et al.
5,956,038 A 9/1999 Rekimoto
6,144,318 A * 11/2000 Hayashi .............. G08G 1/0969 340/988
6,144,956 A 11/2000 Yajima et al.
6,323,846 B1 11/2001 Westerman et al.
6,421,608 B1 7/2002 Motoyama et al.
6,570,557 B1 5/2003 Westerman et al.
6,636,249 B1 10/2003 Rekimoto
6,677,932 B1 1/2004 Westerman (Continued)

FOREIGN PATENT DOCUMENTS

CN 103269510 A 8/2013
CN 109146954 A 1/2019

(Continued)

OTHER PUBLICATIONS

Non-Final Office Action received for U.S. Appl. No. 18/474,133, mailed on Mar. 24, 2025, 12 pages.

(Continued)

*Primary Examiner* — Myron Wyche
(74) *Attorney, Agent, or Firm* — Kubota & Basol LLP

(57) ABSTRACT

Some embodiments described in this disclosure are directed to one or more electronic devices that provide for navigating to destinations, including locations of other electronic devices, based on location information of the one or more electronic devices that is shared with the electronic device.

57 Claims, 34 Drawing Sheets

(56) References Cited

U.S. PATENT DOCUMENTS 7,274,292 B2 9/2007 Velhal et al.
7,372,276 B2 5/2008 Mulcahey
7,523,871 B1 4/2009 Wilson et al.
7,575,065 B1 8/2009 Podhrasky
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,788,032 B2 8/2010 Moloney
7,844,914 B2 11/2010 Andre et al.
7,957,762 B2 6/2011 Herz et al.
8,006,002 B2 8/2011 Kalayjian et al.
8,094,011 B2 1/2012 Faris et al.
8,239,784 B2 8/2012 Hotelling et al.
8,279,180 B2 10/2012 Hotelling et al.
8,380,430 B2 2/2013 Malone et al.
8,381,135 B2 2/2013 Hotelling et al.
8,433,722 B2 4/2013 Shin et al.
8,462,591 B1 6/2013 Marhaben
8,479,122 B2 7/2013 Hotelling et al.
8,526,677 B1 9/2013 Crichton et al.
8,576,669 B2 11/2013 Onda
8,847,754 B2 9/2014 Buchheim et al.
8,878,671 B2 11/2014 Buchheim et al.
9,002,372 B2 4/2015 Shakespeare et al.
9,348,458 B2 5/2016 Hotelling et al.
9,357,348 B2 5/2016 Evans et al.
9,443,414 B2 9/2016 Scavezze et al.
9,514,630 B1 12/2016 Steven
9,547,939 B2 1/2017 Hittel et al.
9,549,282 B1 1/2017 Mcdonough et al.
9,609,515 B2 3/2017 Tredoux et al.
9,654,598 B1 5/2017 Crawford et al.
9,706,357 B2 7/2017 Heo et al.
9,836,187 B2 12/2017 Lee et al.
9,892,535 B1 2/2018 Guy
9,900,733 B2 2/2018 Beattie, Jr.
9,911,310 B2 3/2018 Neumeyer et al.
9,933,937 B2 4/2018 Lemay et al.
9,997,043 B2 6/2018 H. Kazerouni
10,102,749 B1 10/2018 Wagner
10,147,303 B1 12/2018 Carter
10,154,379 B2 12/2018 Mei et al.
10,212,541 B1 2/2019 Brody et al.
10,292,006 B2 5/2019 Yu et al.
10,318,811 B1 6/2019 Gold et al.
10,373,463 B1 8/2019 Herring
10,386,960 B1 8/2019 Smith
10,424,189 B2 9/2019 Daoura et al.
10,438,409 B2 10/2019 Todeschini et al.
10,448,211 B1 10/2019 Shen et al.
10,462,611 B1 10/2019 Klinkner et al.
10,568,035 B1 2/2020 Tong
10,757,057 B2 8/2020 Friend et al.
10,757,540 B1 8/2020 Klinkner et al.
10,757,676 B1 8/2020 De La Broise et al.
10,777,053 B2 9/2020 Jenkins et al.
10,852,918 B1 12/2020 Voss
11,047,702 B1 6/2021 Meyer et al.
11,138,251 B2 10/2021 Estruch Tena et al.
11,145,183 B2 10/2021 Daoura et al.
11,216,624 B2 1/2022 Zarshchikov et al.
11,221,752 B2 1/2022 Howard et al.
11,222,203 B2 1/2022 Dante et al.
11,792,605 B2 10/2023 Daoura et al.
11,823,558 B2 11/2023 Persson
2002/0015024 A1 2/2002 Westerman et al.
2002/0183077 A1 12/2002 Fomukong
2004/0021567 A1 2/2004 Dunn
2004/0212630 A1 10/2004 Hobgood et al.
2004/0217859 A1 11/2004 Pucci et al.
2005/0190059 A1 9/2005 Wehrenberg
2006/0017692 A1 1/2006 Wehrenberg et al.
2006/0033724 A1 2/2006 Chaudhri et al.
2006/0197753 A1 9/2006 Hotelling
2006/0255935 A1 11/2006 Scalisi et al.
2006/0277469 A1 12/2006 Chaudhri et al.
2007/0021108 A1 1/2007 Bocking et al.
2007/0037582 A1 2/2007 Mohi et al.
2007/0037587 A1 2/2007 Mohi et al.
2007/0037588 A1 2/2007 Mohi et al.
2007/0042790 A1 2/2007 Mohi et al.
2007/0101291 A1 5/2007 Forstall et al.
2007/0106457 A1 5/2007 Rosenberg
2007/0157089 A1 7/2007 Van et al.
2007/0197229 A1 8/2007 Kalliola et al.
2007/0229350 A1 10/2007 Scalisi et al.
2007/0252696 A1 11/2007 Belisle et al.
2007/0291104 A1 12/2007 Petersen et al.
2008/0102786 A1 5/2008 Griffin
2008/0125040 A1 5/2008 Kalayjian
2008/0129491 A1 6/2008 Ruperto
2008/0143516 A1 6/2008 Mock et al.
2008/0170118 A1 7/2008 Albertson et al.
2008/0242278 A1 10/2008 Rekimoto
2008/0254808 A1 10/2008 Rekimoto
2009/0076723 A1 3/2009 Moloney
2009/0260022 A1 10/2009 Louch et al.
2009/0300511 A1 12/2009 Behar et al.
2010/0002938 A1 1/2010 Mulcahey
2010/0107179 A1 4/2010 Quintanilla et al.
2010/0151840 A1 6/2010 Bauchot et al.
2010/0198867 A1 8/2010 Rekimoto
2010/0255882 A1 10/2010 Kozitsyn et al.
2010/0325194 A1 12/2010 Williamson et al.
2011/0052083 A1 3/2011 Rekimoto
2011/0081920 A1 4/2011 Hung et al.
2011/0148625 A1 6/2011 Velusamy
2011/0181289 A1 7/2011 Rushing
2011/0187527 A1 8/2011 Goodwill et al.
2011/0210847 A1 9/2011 Howard et al.
2011/0222729 A1 9/2011 Gabara
2011/0234399 A1 9/2011 Yan
2011/0285506 A1 11/2011 Hillis
2011/0286310 A1 11/2011 Onda
2012/0008526 A1 1/2012 Borghei
2012/0052870 A1 3/2012 Habicher
2012/0075099 A1 3/2012 Brown
2012/0092373 A1 4/2012 Ryu et al.
2012/0166077 A1 6/2012 Herzog et al.
2012/0171998 A1 7/2012 Kang
2012/0229400 A1 9/2012 Birnbaum et al.
2013/0030931 A1 1/2013 Moshfeghi
2013/0107057 A1 5/2013 Zhou et al.
2013/0113715 A1 5/2013 Grant et al.
2013/0172016 A1 7/2013 Ooka
2013/0288719 A1 10/2013 Alonzo
2013/0328665 A1 12/2013 Cranfill et al.
2013/0332721 A1 12/2013 Chaudhri et al.
2014/0044305 A1 2/2014 Scavezze et al.
2014/0047413 A1 2/2014 Sheive et al.
2014/0089810 A1 3/2014 Chen et al.
2014/0101189 A1 4/2014 Schenkel
2014/0135042 A1 5/2014 Buchheim et al.
2014/0136633 A1 5/2014 Murillo et al.
2014/0162685 A1 6/2014 Edge
2014/0173439 A1 6/2014 Gutierrez et al.
2014/0213301 A1 7/2014 Evans et al.
2014/0242972 A1 8/2014 Slotznick
2014/0266698 A1 9/2014 Hall et al.
2014/0267411 A1 9/2014 Fein et al.
2014/0300452 A1 10/2014 Rofe et al.
2014/0327518 A1 11/2014 Loutit
2014/0329460 A1 11/2014 Loutit
2014/0364099 A1 12/2014 Pai et al.
2014/0365923 A1 12/2014 Lee et al.
2014/0365945 A1 12/2014 Karunamuni et al.
2015/0012307 A1 1/2015 Moss
2015/0058744 A1 2/2015 Dhingra et al.
2015/0154851 A1 6/2015 Vincent et al.
2015/0170496 A1 6/2015 King et al.
2015/0172393 A1 6/2015 Oplinger et al.
2015/0356393 A1 12/2015 Daoura et al.

(56) References Cited

U.S. PATENT DOCUMENTS

| | | | |
|---|---|---|---|
| 2016/0026869 | A1 | 1/2016 | Rekimoto |
| 2016/0027307 | A1 | 1/2016 | Abhyanker et al. |
| 2016/0055676 | A1 | 2/2016 | Kasahara et al. |
| 2016/0092705 | A1 | 3/2016 | Wadman et al. |
| 2016/0171777 | A1 | 6/2016 | Todeschini et al. |
| 2016/0203641 | A1 | 7/2016 | Bostick et al. |
| 2016/0335876 | A1 | 11/2016 | Verma |
| 2016/0350639 | A1 | 12/2016 | Tere |
| 2017/0006577 | A1 | 1/2017 | Koum et al. |
| 2017/0048686 | A1 | 2/2017 | Chang et al. |
| 2017/0053560 | A1 | 2/2017 | Aldossary et al. |
| 2017/0064504 | A1 | 3/2017 | Jose |
| 2017/0064511 | A1 | 3/2017 | Mccormick |
| 2017/0092085 | A1 | 3/2017 | Agarwal |
| 2017/0092090 | A1 | 3/2017 | Lerner |
| 2017/0168159 | A1 | 6/2017 | Gatland |
| 2017/0180934 | A1 | 6/2017 | Brice et al. |
| 2017/0353833 | A1 | 12/2017 | De Barros Chapiewski et al. |
| 2017/0357320 | A1 | 12/2017 | Chaudhri et al. |
| 2017/0365100 | A1 | 12/2017 | Walton |
| 2018/0077097 | A1 | 3/2018 | Alfaro et al. |
| 2018/0084517 | A1 | 3/2018 | Do et al. |
| 2018/0091951 | A1 | 3/2018 | Sandel et al. |
| 2018/0147472 | A1 | 5/2018 | Deangelis et al. |
| 2018/0158197 | A1 | 6/2018 | Dasgupta et al. |
| 2018/0165924 | A9 | 6/2018 | Olsson et al. |
| 2018/0184286 | A1 | 6/2018 | Patterson |
| 2018/0189567 | A1 | 7/2018 | Maheriya et al. |
| 2018/0198973 | A1 | 7/2018 | Eronen et al. |
| 2018/0227393 | A1 | 8/2018 | Daub |
| 2018/0240176 | A1 | 8/2018 | Cronin et al. |
| 2018/0241488 | A1 | 8/2018 | Daoura et al. |
| 2018/0276427 | A1 | 9/2018 | Depew et al. |
| 2018/0278888 | A1 | 9/2018 | Kasahara et al. |
| 2018/0343561 | A1 | 11/2018 | Patterson |
| 2018/0349516 | A1 | 12/2018 | Dutta et al. |
| 2018/0357876 | A1 | 12/2018 | Smoak |
| 2019/0050901 | A1 | 2/2019 | Vincent et al. |
| 2019/0073113 | A1 | 3/2019 | Yang |
| 2019/0086666 | A1 | 3/2019 | Wu |
| 2019/0102372 | A1 | 4/2019 | Hailpern et al. |
| 2019/0103012 | A1 | 4/2019 | Daoura et al. |
| 2019/0114887 | A1 | 4/2019 | Brantley |
| 2019/0114921 | A1 | 4/2019 | Cazzoli |
| 2019/0163748 | A1 | 5/2019 | Cuthbert et al. |
| 2019/0174265 | A1 | 6/2019 | Chen |
| 2019/0182626 | A1 | 6/2019 | Miller et al. |
| 2019/0285413 | A1 | 9/2019 | Hallett |
| 2019/0362556 | A1 | 11/2019 | Ben-Dor et al. |
| 2019/0370544 | A1 | 12/2019 | Wright et al. |
| 2020/0015040 | A1 | 1/2020 | Baird et al. |
| 2020/0107164 | A1 | 4/2020 | Lopatin et al. |
| 2020/0107165 | A1 | 4/2020 | Pai et al. |
| 2020/0110934 | A1 | 4/2020 | Paul |
| 2020/0117339 | A1 | 4/2020 | Amitay et al. |
| 2020/0139929 | A1 | 5/2020 | Turley |
| 2020/0220914 | A1 | 7/2020 | Carrigan et al. |
| 2020/0242848 | A1 | 7/2020 | Ambler et al. |
| 2020/0257865 | A1 | 8/2020 | Zarshchikov et al. |
| 2020/0259908 | A1 | 8/2020 | Klinkner et al. |
| 2020/0260142 | A1 | 8/2020 | Kasahara et al. |
| 2020/0273235 | A1 | 8/2020 | Emami et al. |
| 2020/0379946 | A1 | 12/2020 | Coffman et al. |
| 2020/0382908 | A1 | 12/2020 | Behzadi et al. |
| 2020/0382912 | A1 | 12/2020 | Dancie et al. |
| 2020/0409537 | A1 | 12/2020 | Story et al. |
| 2021/0048305 | A1* | 2/2021 | Baig .................. G01C 21/3614 |
| 2021/0190503 | A1 | 6/2021 | Landers |
| 2021/0264154 | A1 | 8/2021 | Lamont |
| 2021/0314735 | A1 | 10/2021 | Klinkner et al. |
| 2022/0023136 | A1 | 1/2022 | Xia et al. |
| 2022/0035510 | A1 | 2/2022 | Behzadi et al. |
| 2022/0050563 | A1 | 2/2022 | Behzadi et al. |
| 2022/0075503 | A1 | 3/2022 | Behzadi et al. |
| 2022/0100286 | A1 | 3/2022 | De Jong et al. |
| 2022/0103974 | A1 | 3/2022 | De Jong et al. |
| 2022/0107187 | A1* | 4/2022 | Okabe ................ G01C 21/3626 |
| 2022/0223013 | A1 | 7/2022 | Persson et al. |
| 2022/0335807 | A1 | 10/2022 | Jong et al. |
| 2022/0365633 | A1 | 11/2022 | Rochette et al. |
| 2023/0164103 | A1 | 5/2023 | Ham et al. |
| 2023/0262420 | A1 | 8/2023 | Behzadi et al. |
| 2023/0342009 | A1 | 10/2023 | De Jong et al. |
| 2023/0375359 | A1 | 11/2023 | Fleizach et al. |
| 2024/0012531 | A1 | 1/2024 | Behzadi et al. |
| 2024/0062634 | A1 | 2/2024 | Persson |
| 2024/0272773 | A1 | 8/2024 | De Jong et al. |
| 2024/0334161 | A1 | 10/2024 | De Jong et al. |
| 2024/0406672 | A1 | 12/2024 | Sart |
| 2025/0088584 | A1 | 3/2025 | De Jong et al. |

FOREIGN PATENT DOCUMENTS

| | | | |
|---|---|---|---|
| EP | 2439920 | A1 | 4/2012 |
| EP | 2482164 | A1 | 8/2012 |
| IT | 20163647 | A1 | 11/2017 |
| JP | 2006-284458 | A | 10/2006 |
| JP | 2007-88943 | A | 4/2007 |
| JP | 2017-15593 | A | 1/2017 |
| JP | 2018-101831 | A | 6/2018 |
| JP | 2020-531938 | A | 11/2020 |
| WO | 2001/037004 | A1 | 5/2001 |
| WO | 2012/047920 | A1 | 4/2012 |
| WO | 2013169849 | A2 | 11/2013 |
| WO | 2014105276 | A1 | 7/2014 |
| WO | 2018/034053 | A1 | 2/2018 |
| WO | 2020/214864 | A1 | 10/2020 |
| WO | 2023/105450 | A1 | 6/2023 |

OTHER PUBLICATIONS

Advisory Action received for U.S. Appl. No. 17/659,830, mailed on Mar. 26, 2025, 3 pages.

Final Office Action received for U.S. Appl. No. 17/663,816, mailed on Mar. 21, 2025, 36 pages.

International Search Report received for PCT Patent Application No. PCT/US2024/046045, mailed on Nov. 28, 2024, 4 pages.

Corrected Notice of Allowability received for U.S. Appl. No. 17/452,971, mailed on Mar. 11, 2024, 3 pages.

Corrected Notice of Allowability received for U.S. Appl. No. 17/455,843, mailed on Mar. 14 2024, 3 pages.

European Search Report received for European Patent Application No. 21799155.3, mailed on Sep. 27, 2024, 4 pages.

Extended European Search Report received for European Patent Application No. 20790659.5, mailed on Nov. 29, 2022, 11 pages.

Extended European Search Report received for European Patent Application No. 20798438.6, mailed on Jan. 3, 2023, 11 pages.

Final Office Action received for U.S. Appl. No. 17/452,971, mailed on Jun. 1, 2022, 22 pages.

Final Office Action received for U.S. Appl. No. 17/455,821, mailed on Jul. 29, 2022, 20 pages.

Final Office Action received for U.S. Appl. No. 17/455,843, mailed on Oct. 3, 2022, 27 pages.

Final Office Action received for U.S. Appl. No. 17/503,246, mailed on May 20, 2022, 17 pages.

Final Office Action received for U.S. Appl. No. 17/659,830, mailed on Nov. 19, 2024, 16 pages.

Final Office Action received for U.S. Appl. No. 17/663,816, mailed on Mar. 27, 2024, 38 pages.

Final Office Action received for U.S. Appl. No. 18/474,133, mailed on Aug. 26, 2024, 13 pages.

Google Maps' Location Sharing Feature Can Show Your Friends' Battery Status, Available online at: <https://www.firstpost.com/tech/news-analysis/google-maps-location-sharing-feature-can-show-your-friends-battery-status-4885521.html>, [Retrieved Jan. 27, 2023], Aug. 3, 2018, 2 pages.

Howtechs, Motorola Moto G—How to reorganize app and widget, https://www.youtube.com/watch?v=0szKlr7xnqs, Dec. 22, 2013, 15 pages.

(56) References Cited

OTHER PUBLICATIONS

International Search Report received for PCT Application No. PCT/US2023/019402, mailed on Sep. 19, 2023, 6 pages.
Wikipedia, "Virtual Network Computing", Wikipedia, Available online at <https://en.wikipedia.org/w/index.php?t%20itle=Virtual%20Network%20Computing&oldid=1120211990>, Nov. 5, 2024, 5 pages.
Stolyar Brenda, "Google Maps' Location Sharing Now Lets You Track Battery Status", https://www.digitaltrends.com/mobile/google-maps-lets-you-share-your-location-and-battery-level/, Aug. 3, 2018, pp. 1-4.
International Search Report received for PCT Patent Application No. PCT/US2021/071555, mailed on Feb. 14, 2022, 6 pages.
International Search Report received for PCT Patent Application No. PCT/US2022/071806, mailed on Oct. 21, 2022, 6 pages.
International Search Report received for PCT Patent Application No. PCT/US2022/072389, mailed on Nov. 30, 2022, 7 pages.
International Search Report received for PCT Patent Application No. PCT/US2023/022602, mailed on Sep. 4, 2023, 4 pages.
International Search Report received for PCT Patent Application No. PCT/US2024/015620, mailed on Jul. 17, 2024, 7 pages.
International Search Report received for PCT Patent Application No. PCT/US2024/031500, mailed on Nov. 21, 2024, 6 pages.
International Search Report received for PCT Patent Application No. PCT/US2024/031781, mailed on Aug. 13, 2024, 5 pages.
Non-Final Office Action received for U.S. Appl. No. 17/448,491, mailed on Jul. 27, 2022, 16 pages.
Non-Final Office Action received for U.S. Appl. No. 17/452,971, mailed on Feb. 15, 2023, 17 pages.
Non-Final Office Action received for U.S. Appl. No. 17/452,971, mailed on Jan. 21, 2022, 12 pages.
Non-Final Office Action received for U.S. Appl. No. 17/455,821, mailed on Apr. 7, 2022, 18 pages.
Non-Final Office Action received for U.S. Appl. No. 17/455,821, mailed on Dec. 8, 2022, 24 pages.
Non-Final Office Action received for U.S. Appl. No. 17/455,843, mailed on Feb. 15, 2023, 28 pages.
Non-Final Office Action received for U.S. Appl. No. 17/455,843, mailed on May 26, 2022, 20 pages.
Non-Final Office Action received for U.S. Appl. No. 17/503,246, mailed on Feb. 3, 2022, 15 pages.
Non-Final Office Action received for U.S. Appl. No. 17/659,830, mailed on Mar. 14, 2024, 14 pages.
Non-Final Office Action received for U.S. Appl. No. 17/663,816, mailed on Oct. 19, 2023, 35 pages.
Non-Final Office Action received for U.S. Appl. No. 17/663,816, mailed on Sep. 28, 2024, 39 pages.
Non-Final Office Action received for U.S. Appl. No. 18/304,911, mailed on Sep. 12, 2024, 41 pages.
Non-Final Office Action received for U.S. Appl. No. 18/474,133, mailed on Jul. 3, 2024, 13 pages.
Non-Final Office Action received for U.S. Appl. No. 18/499,157, mailed on Jun. 5, 2024, 7 pages.
Notice of Allowance received for U.S Appl. No. 18/499,157, mailed on Dec. 12, 2024, 7 pages.
Notice of Allowance received for U.S. Appl. No. 17/448,491, mailed on Jan. 18, 2023, 8 pages.
Notice of Allowance received for U.S. Appl. No. 17/448,491, mailed on May 4, 2023, 7 pages.
Notice of Allowance received for U.S. Appl. No. 17/452,971, mailed on Aug. 17, 2023, 11 pages.
Notice of Allowance received for U.S. Appl. No. 17/452,971, mailed on Dec. 12, 2023, 7 pages.
Notice of Allowance received for U.S. Appl. No. 17/455,821, mailed on Dec. 12, 2023, 9 pages.
Notice of Allowance received for U.S. Appl. No. 17/455,821, mailed on Sep. 20, 2023, 8 pages.
Notice of Allowance received for U.S. Appl. No. 17/455,843, mailed on Jul. 19, 2023, 9 pages.
Notice of Allowance received for U.S. Appl. No. 17/455,843, mailed on Nov. 1, 2023, 7 pages.
Notice of Allowance received for U.S. Appl. No. 17/503,246, mailed on Dec. 7, 2022, 10 pages.
Notice of Allowance received for U.S. Appl. No. 17/503,246, mailed on Jan. 25, 2023, 9 pages.
Notice of Allowance received for U.S. Appl. No. 17/503,246, mailed on May 18, 2023, 9 pages.
Notice of Allowance received for U.S. Appl. No. 17/594,742, mailed on Jul. 24, 2023, 8 pages.
Notice of Allowance received for U.S. Appl. No. 17/594,742, mailed on Mar. 29, 2023, 9 pages.
Notice of Allowance received for U.S. Appl. No. 18/309,492, mailed on Mar. 8, 2024, 10 pages.
Notice of Allowance received for U.S. Appl. No. 18/309,492, mailed on Nov. 24, 2023, 10 pages.
Search Report received for Chinese Patent Application No. 202210059059.2, mailed on Dec. 22, 2023, 5 pages (2 pages of English Translation and 3 pages of Official Copy).
Hill Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.
Mokatren et al., "Exploring the Potential of a Mobile Eye Tracker as an Intuitive Indoor Pointing Device: A Case Study in Cultural Heritage", In: Future Generation Computer Systems, Available online at: <https://is-web.hevra.haifa.ac.il/images/lecturers_files/ishimshoni_files/MokatrenFGCS.pdf>, [retrieved on Jul. 26, 2020], Jul. 1, 2017, 14 pages.
Roberts et al., "The Use of Augmented Reality, GPS and INS for Subsurface Data Visualisation", FIG XXII International Congress, Washington, D.C. USA, Apr. 19-26, 2002, 12 pages.

* cited by examiner

USER INTERFACES FOR NAVIGATING TO LOCATIONS OF SHARED DEVICES

CROSS-REFERENCE TO RELATED APPLICATIONS

This application claims the benefit of U.S. Provisional Application No. 63/505,910, filed Jun. 2, 2023, and U.S. Provisional Application No. 63/581,955, filed Sep. 11, 2023, the contents of which are herein incorporated by reference in their entireties for all purposes.

FIELD OF THE DISCLOSURE

This relates generally to user interfaces that enable a user to navigate to locations of findable items (e.g., other electronic devices) on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users may wish to use such devices to navigate to locations of other electronic devices (e.g., trackable items). Enhancing the user's interactions with the device improves the user's experience with the device and decreases user interaction time, which is particularly important where input devices are battery-operated.

SUMMARY OF THE DISCLOSURE

Some embodiments described in this disclosure are directed to one or more electronic devices that provide for navigating to destinations, including locations of other electronic devices, based on location information of the one or more electronic devices that is shared with the electronic device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
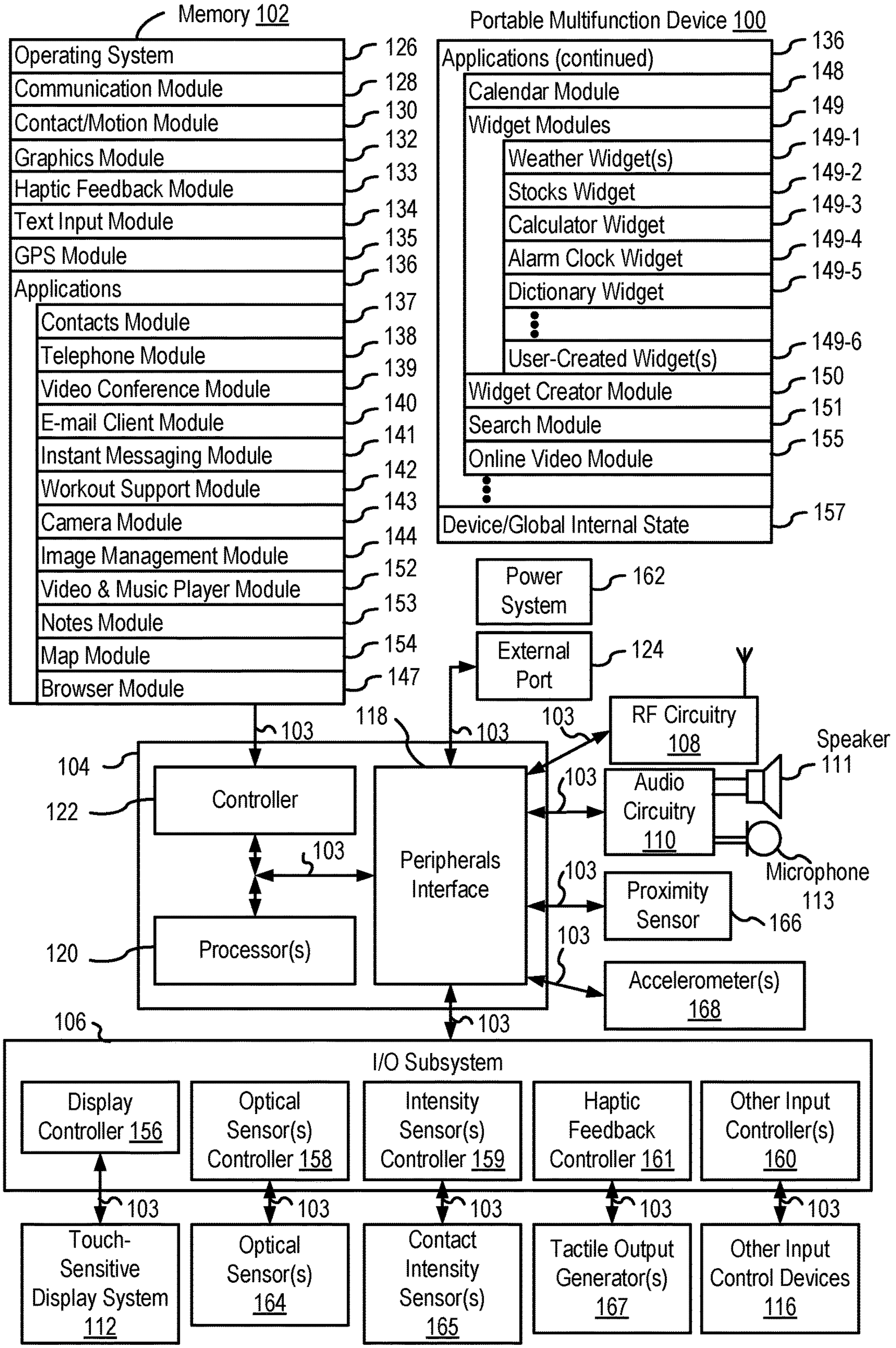
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Some embodiments described in this disclosure are directed to one or more electronic devices that provide for navigating to destinations, including locations of other electronic devices, based on location information of the one or more electronic devices that is shared with the electronic device.

There is a need for electronic devices to see the locations of other electronic devices and facilitate navigation to such locations based on the tracking of the locations. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and/or iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
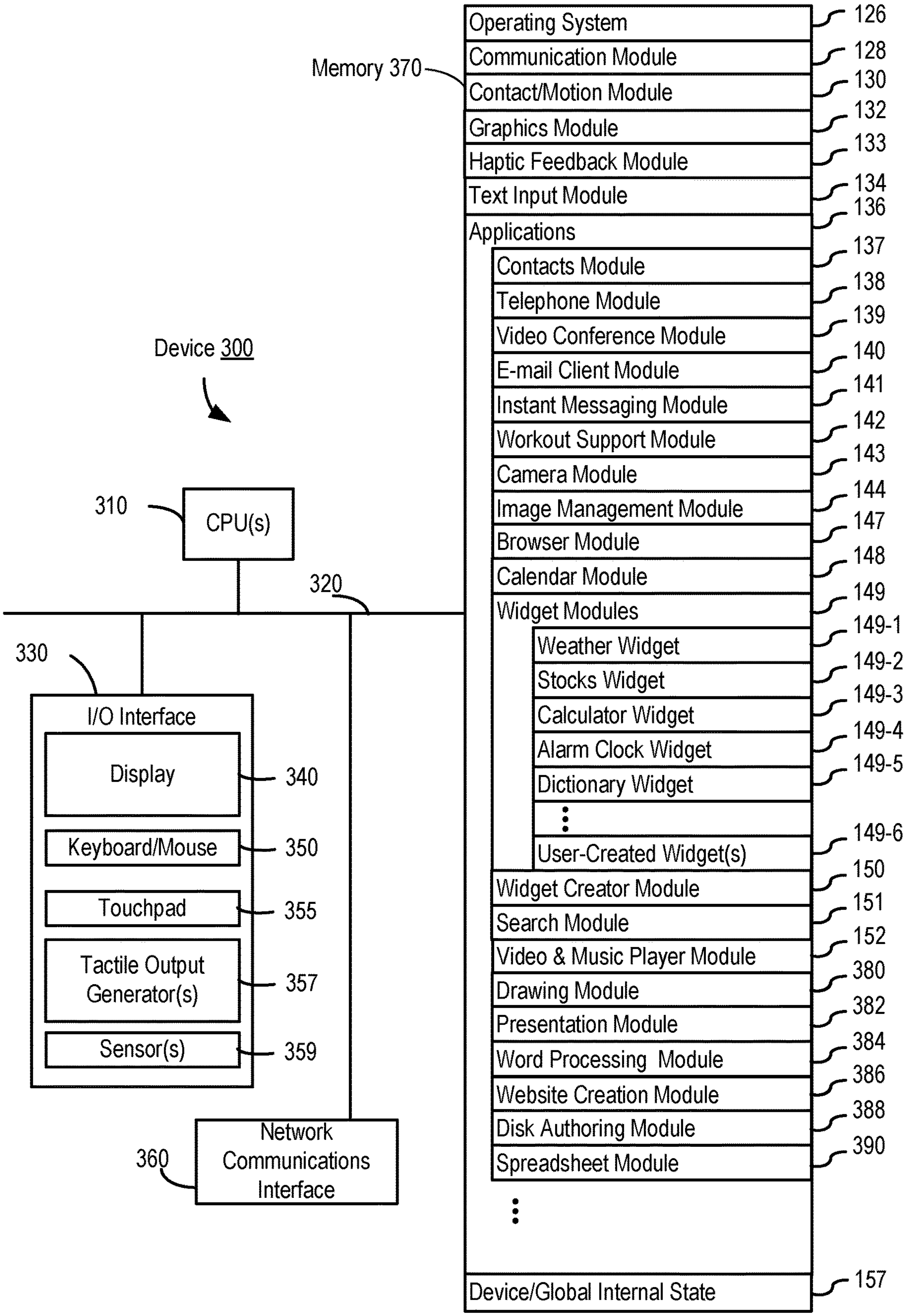
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and/or terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
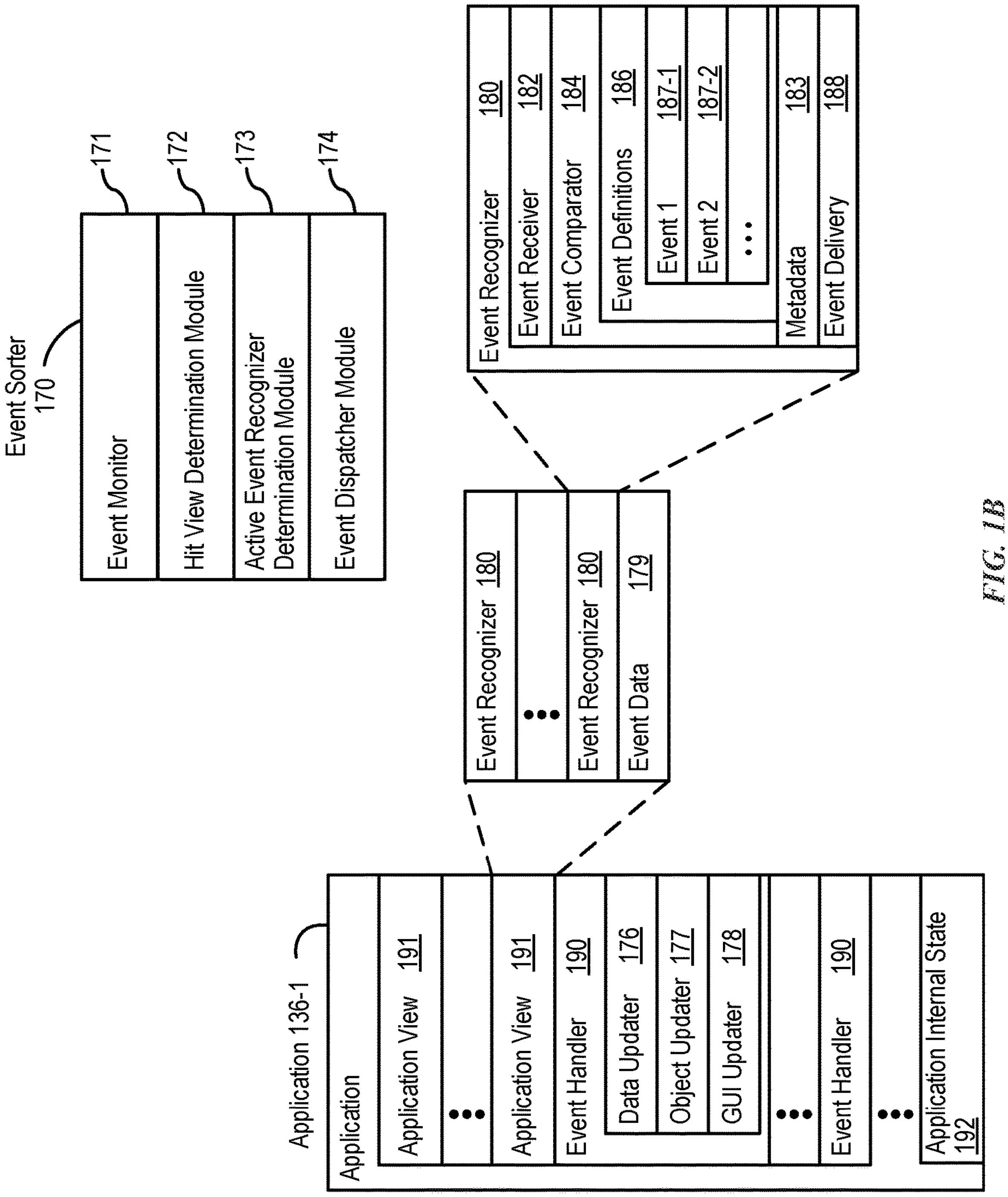
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
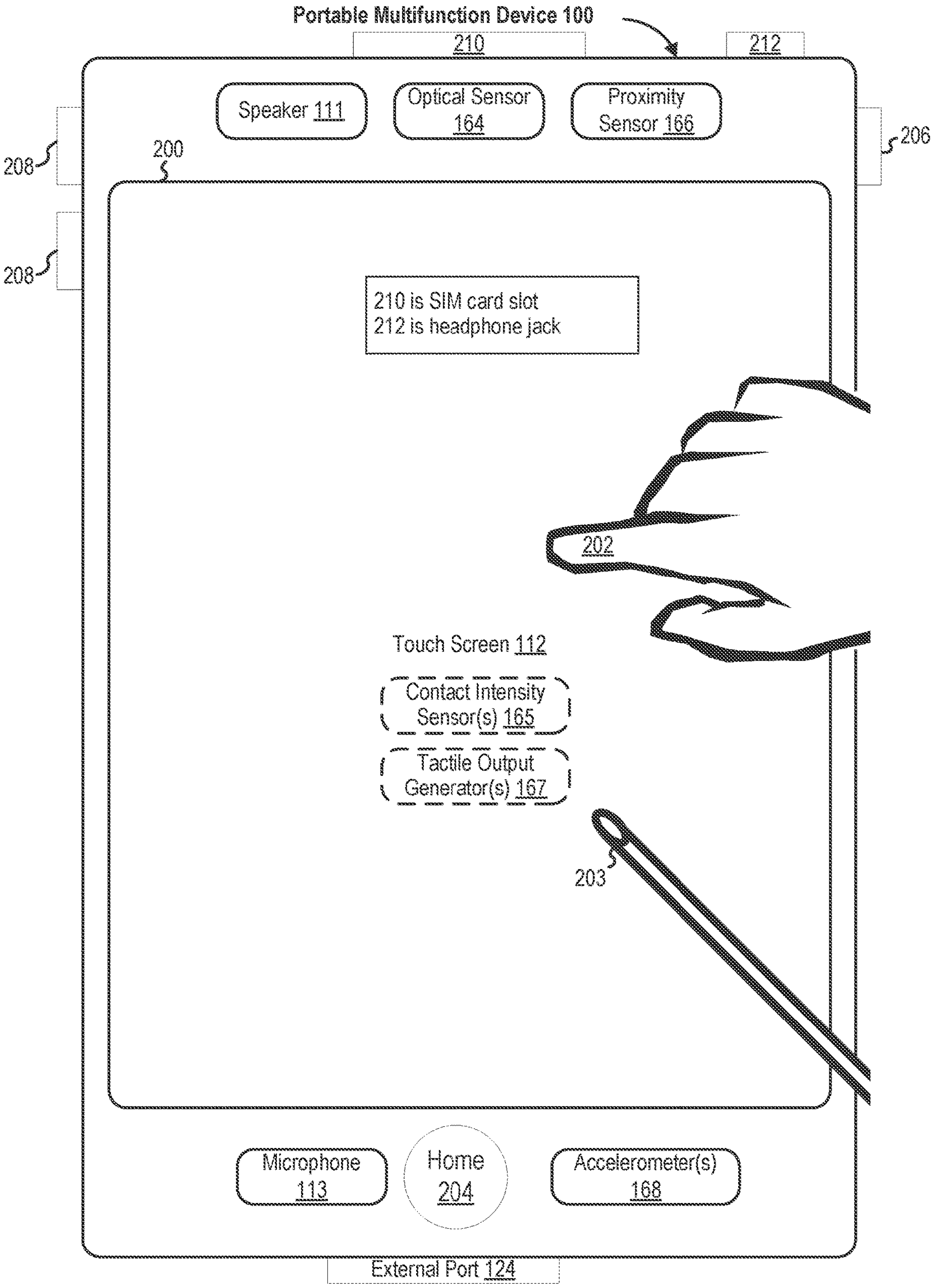
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
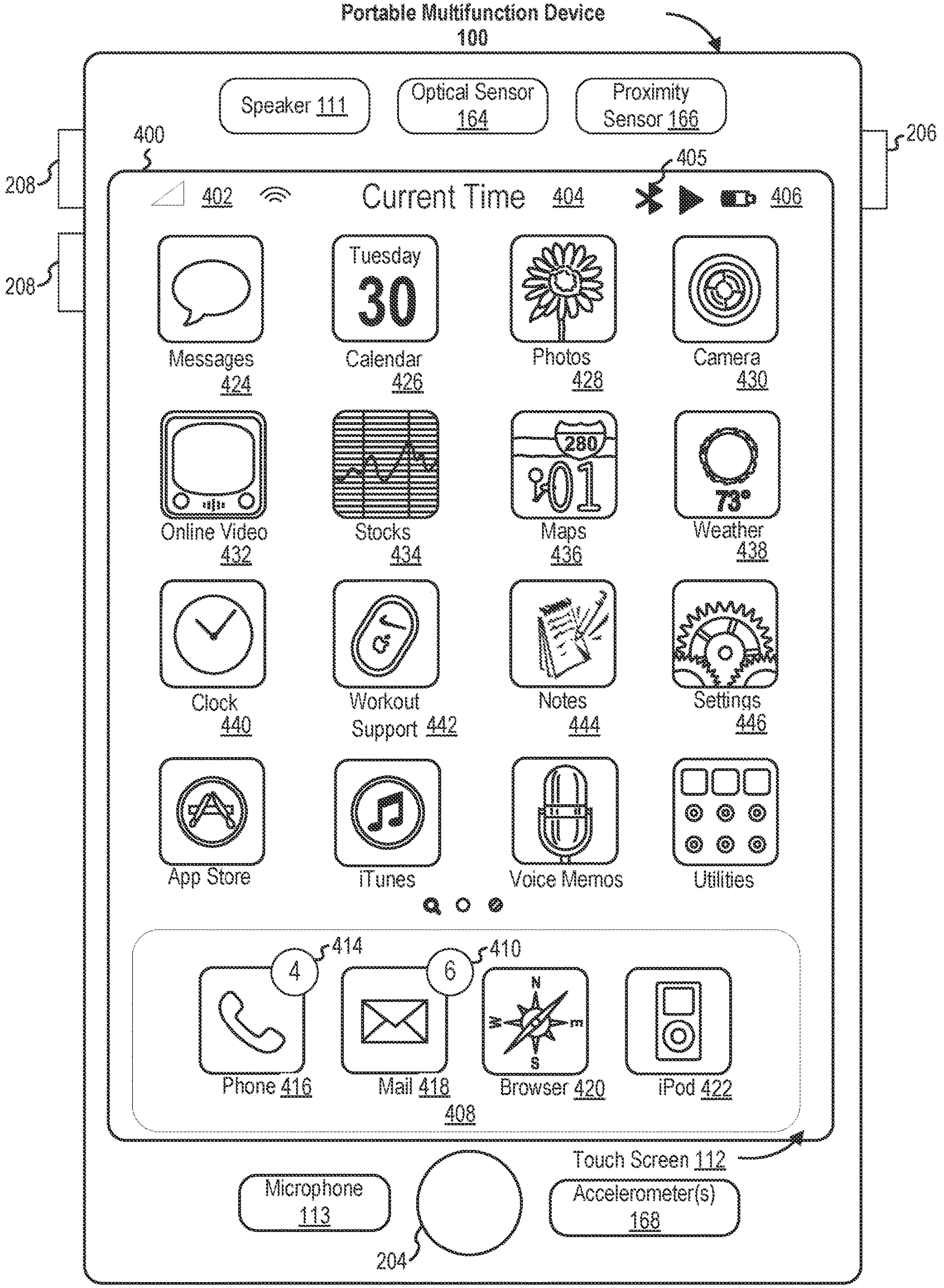
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
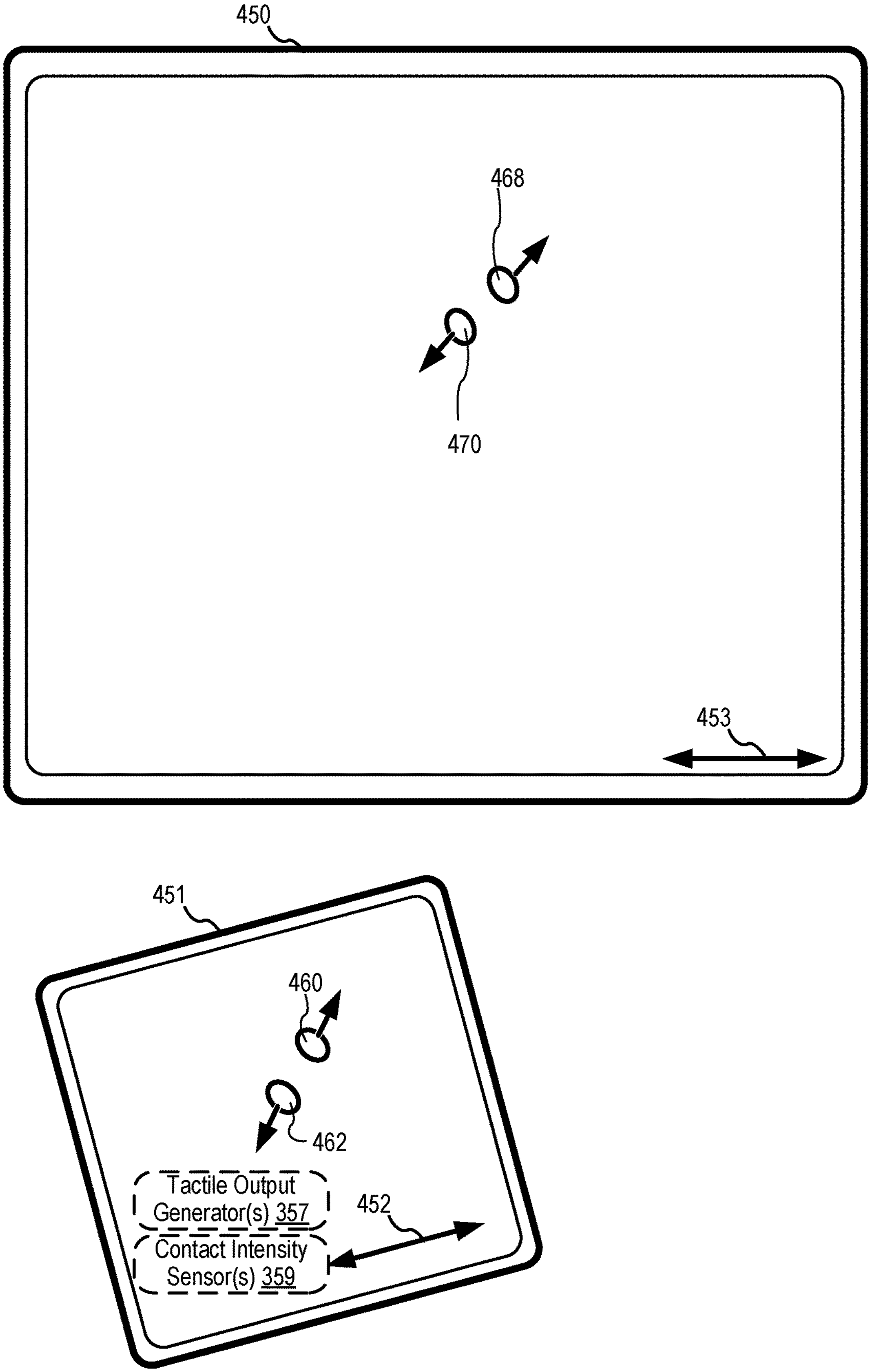
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
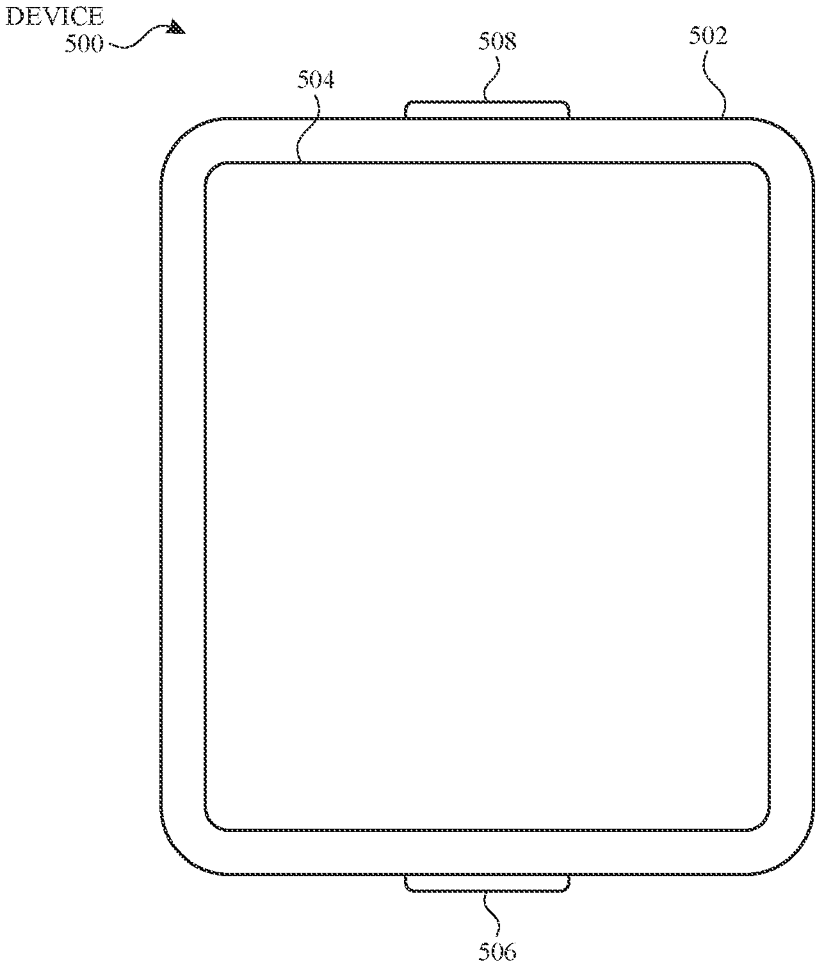
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
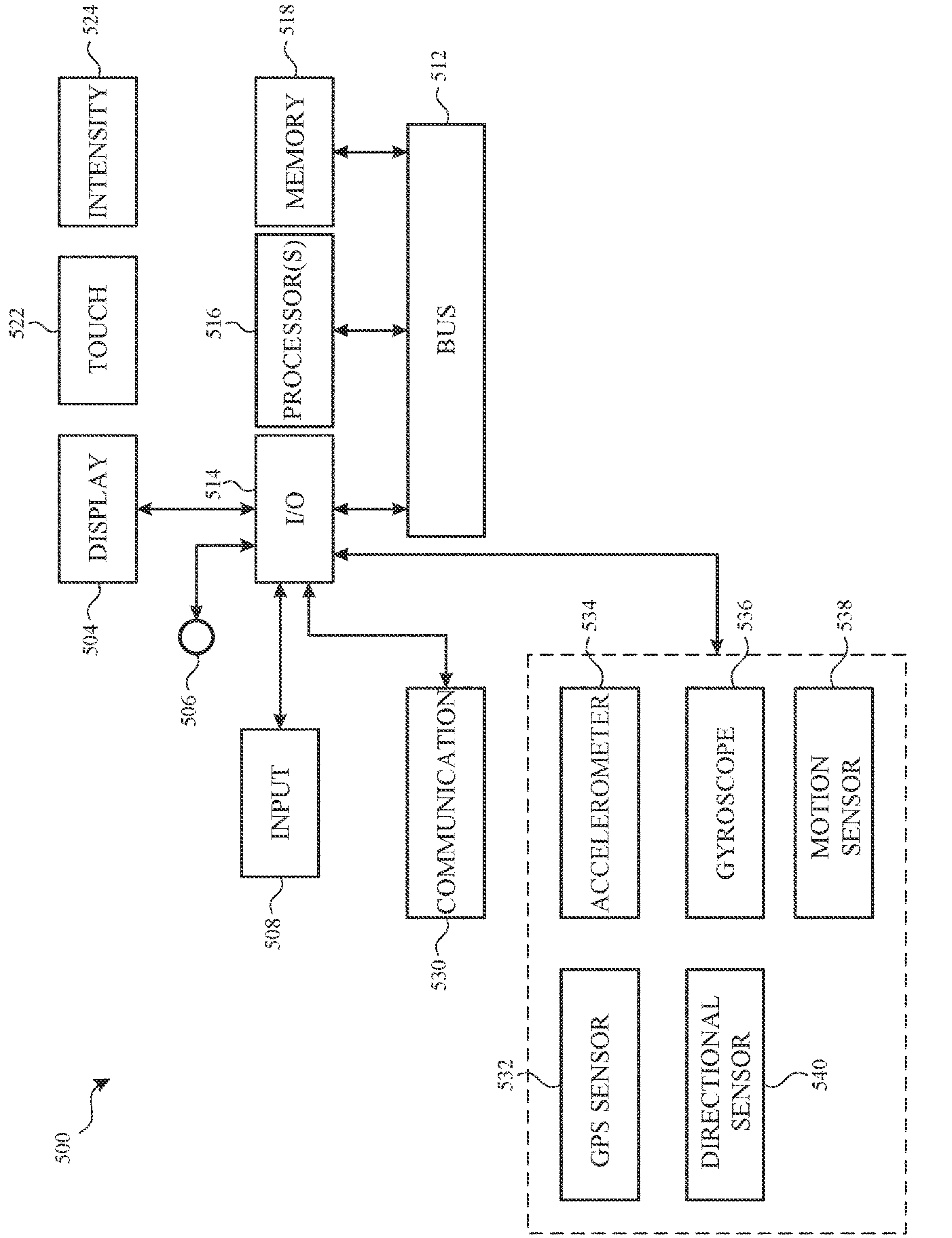
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
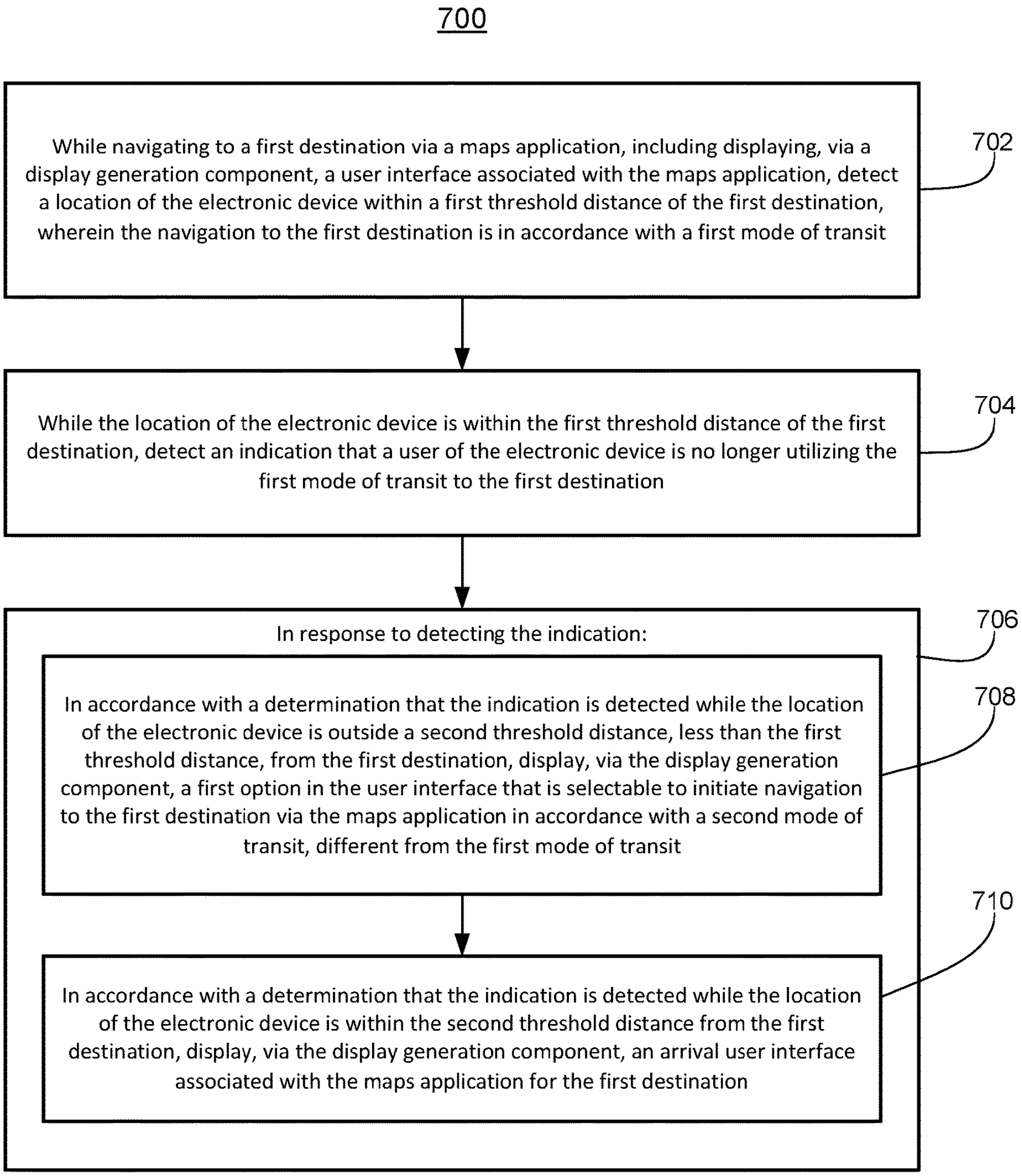
FIG. 7 is a flow diagram illustrating a method of facilitating navigation to a location of one or more second electronic devices based on location information of the one or more second electronic devices, in accordance with some embodiments of the disclosure.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
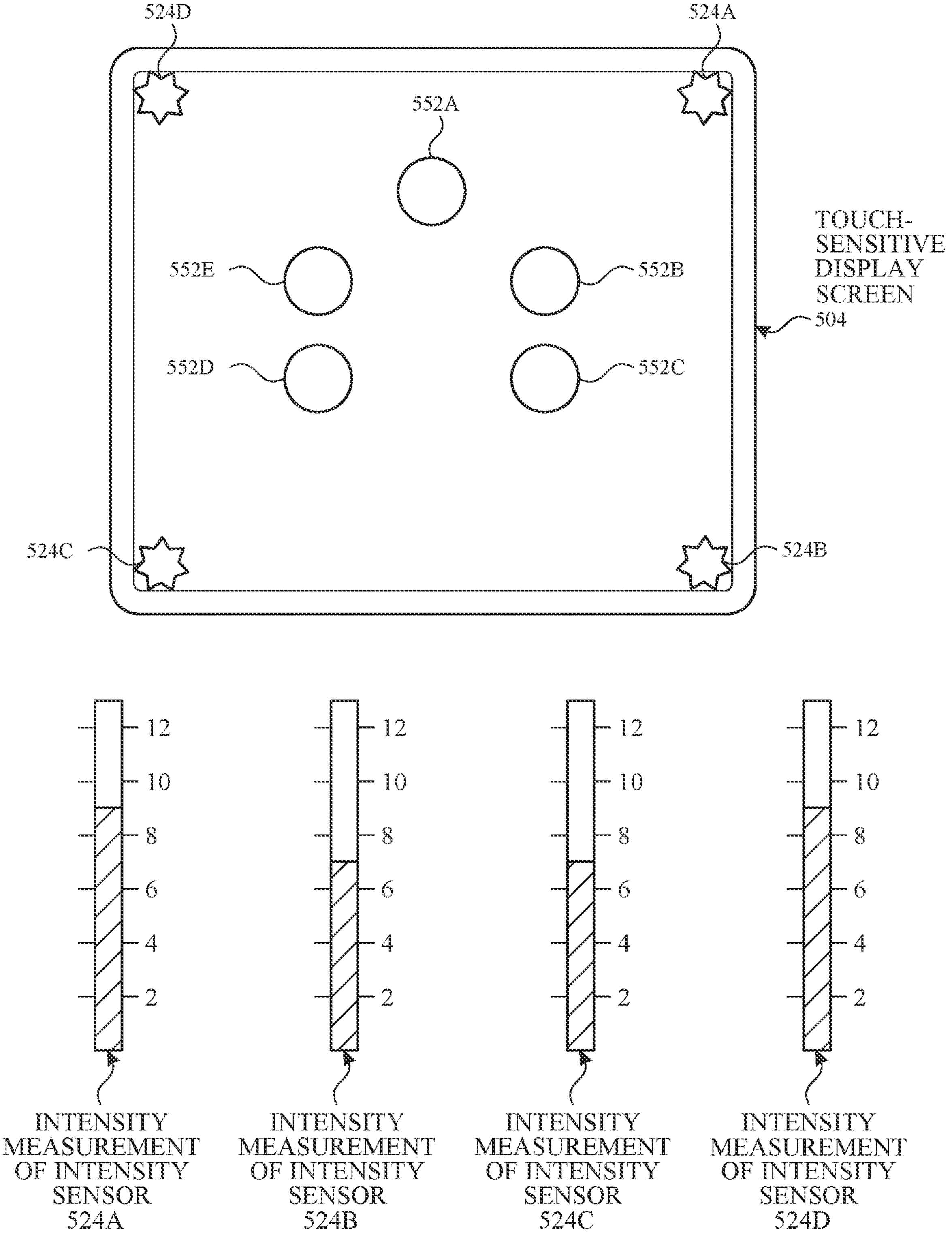
FIGS. 5C-5D illustrate exemplary components of a personal electronic device having a touch-sensitive display and intensity sensors in accordance with some embodiments.
Figure 5D:
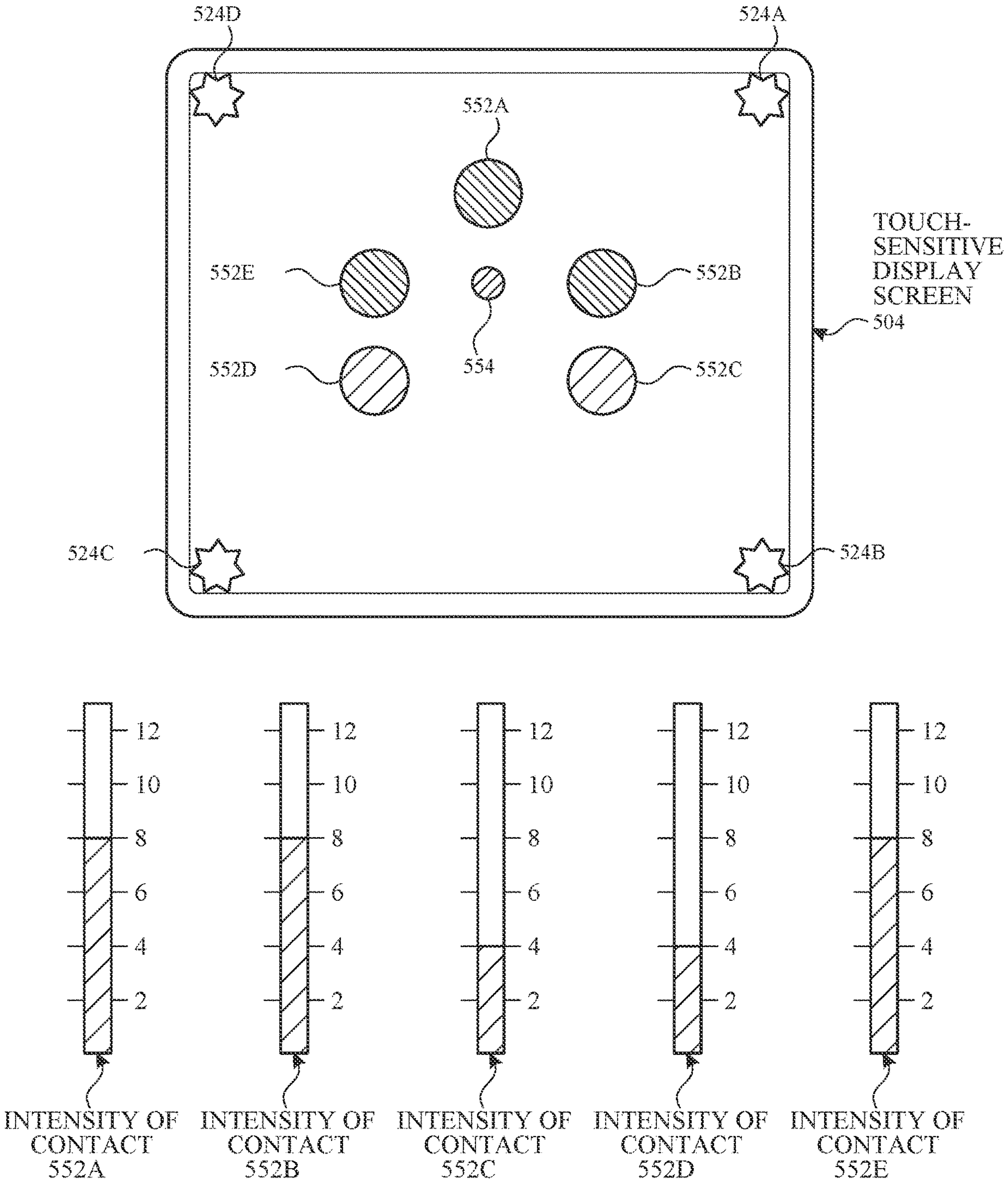

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
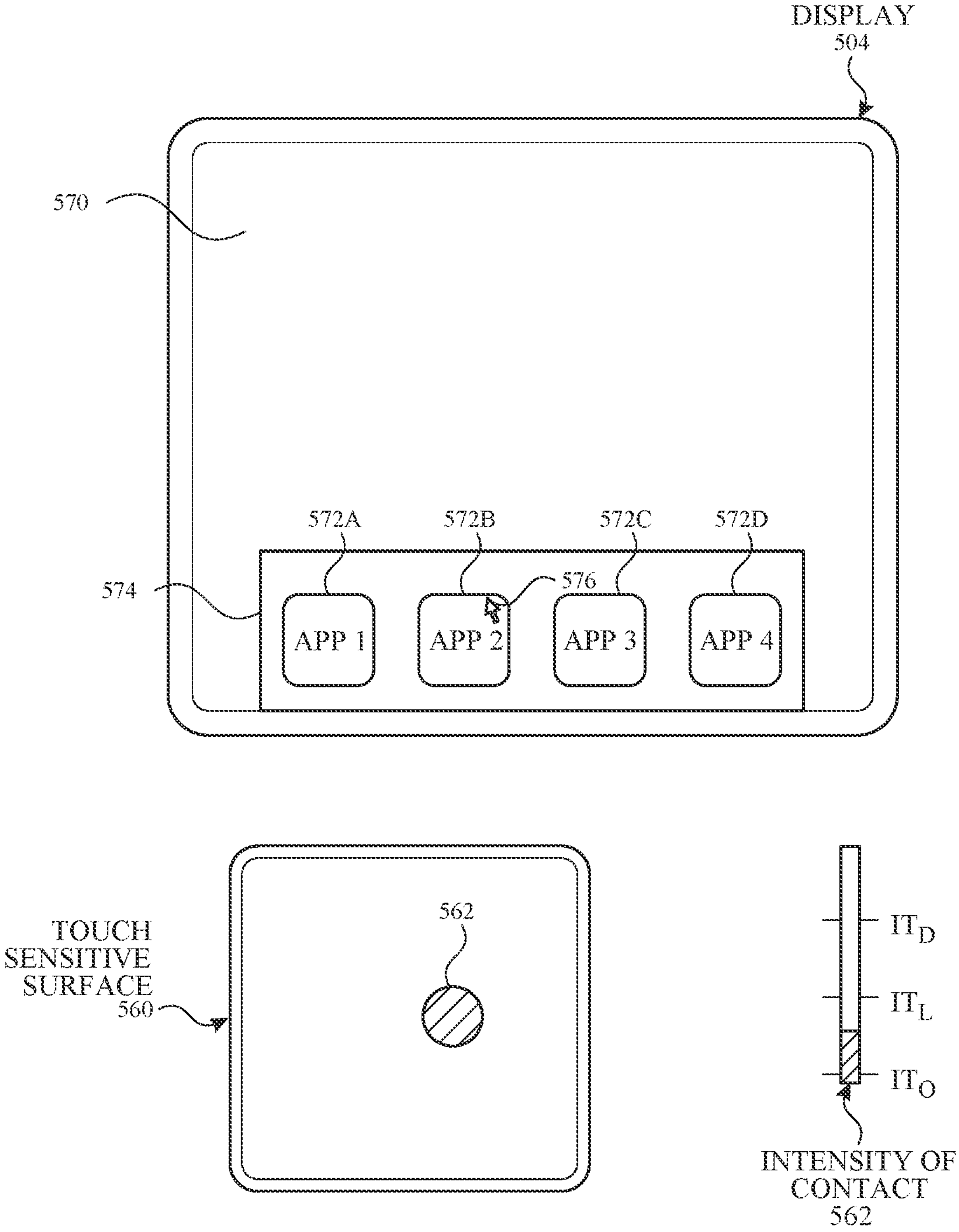
FIGS. 5E-5H illustrate exemplary components and user interfaces of a personal electronic device in accordance with some embodiments.
Figure 5F:
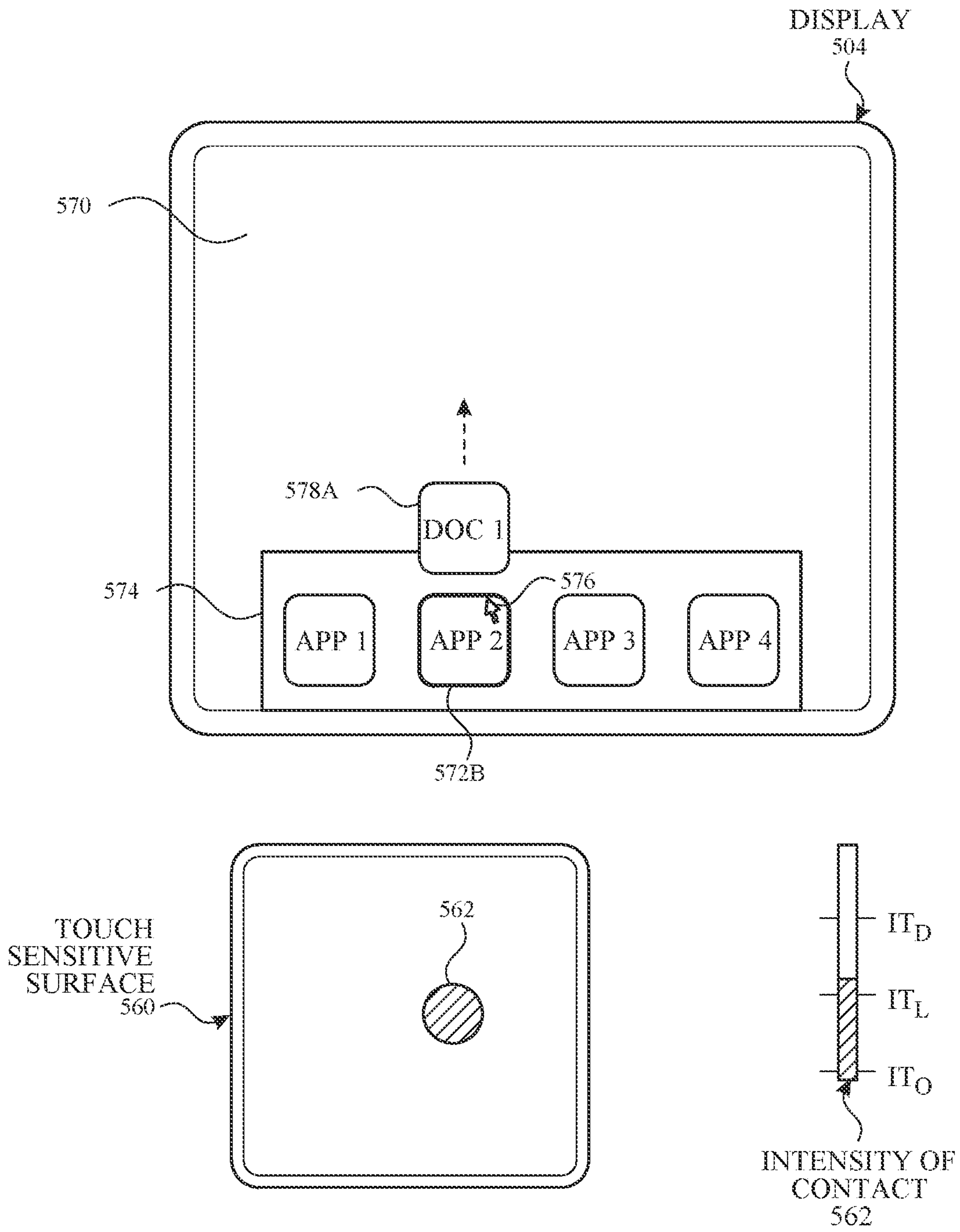
Figure 5G:
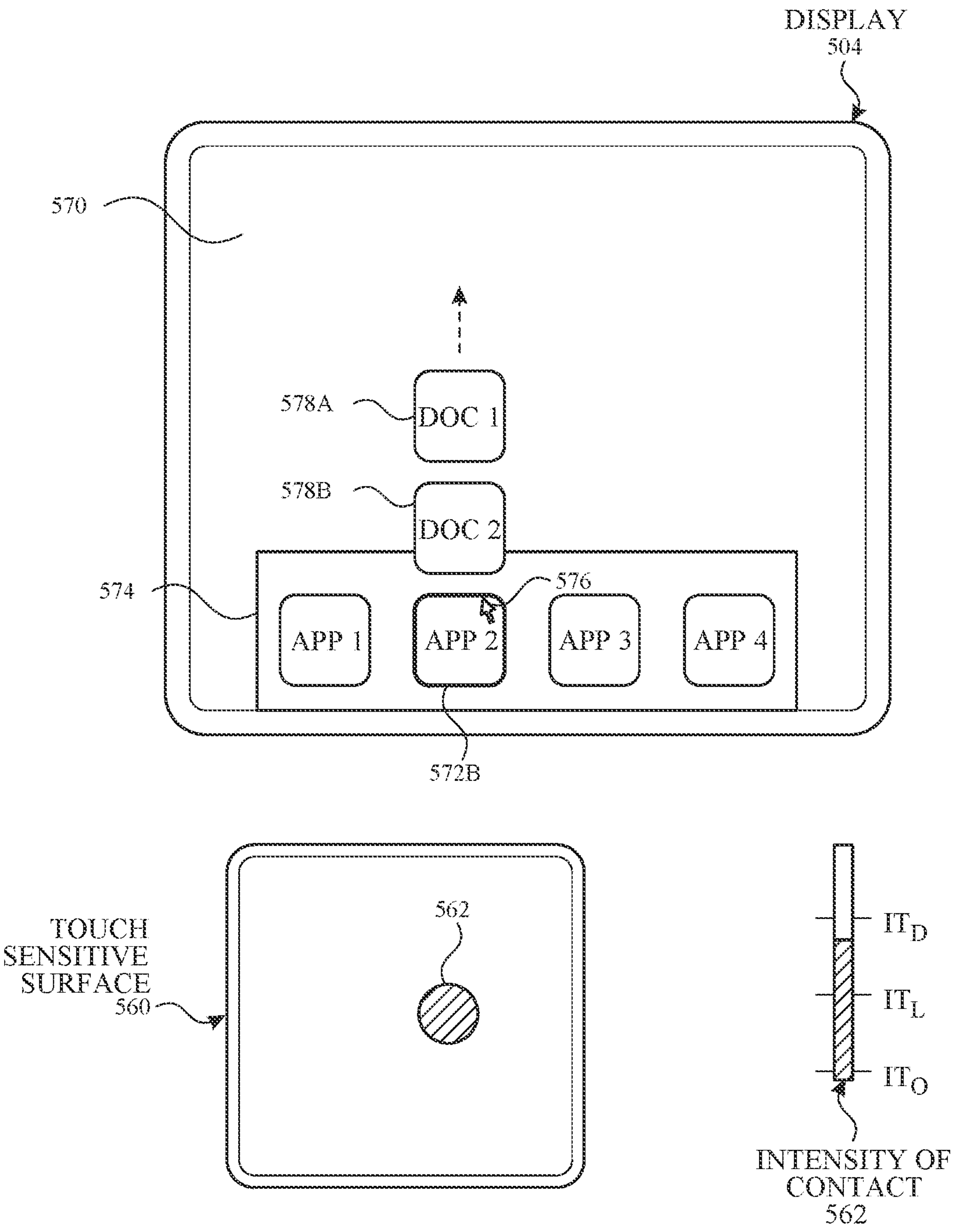
Figure 5H:
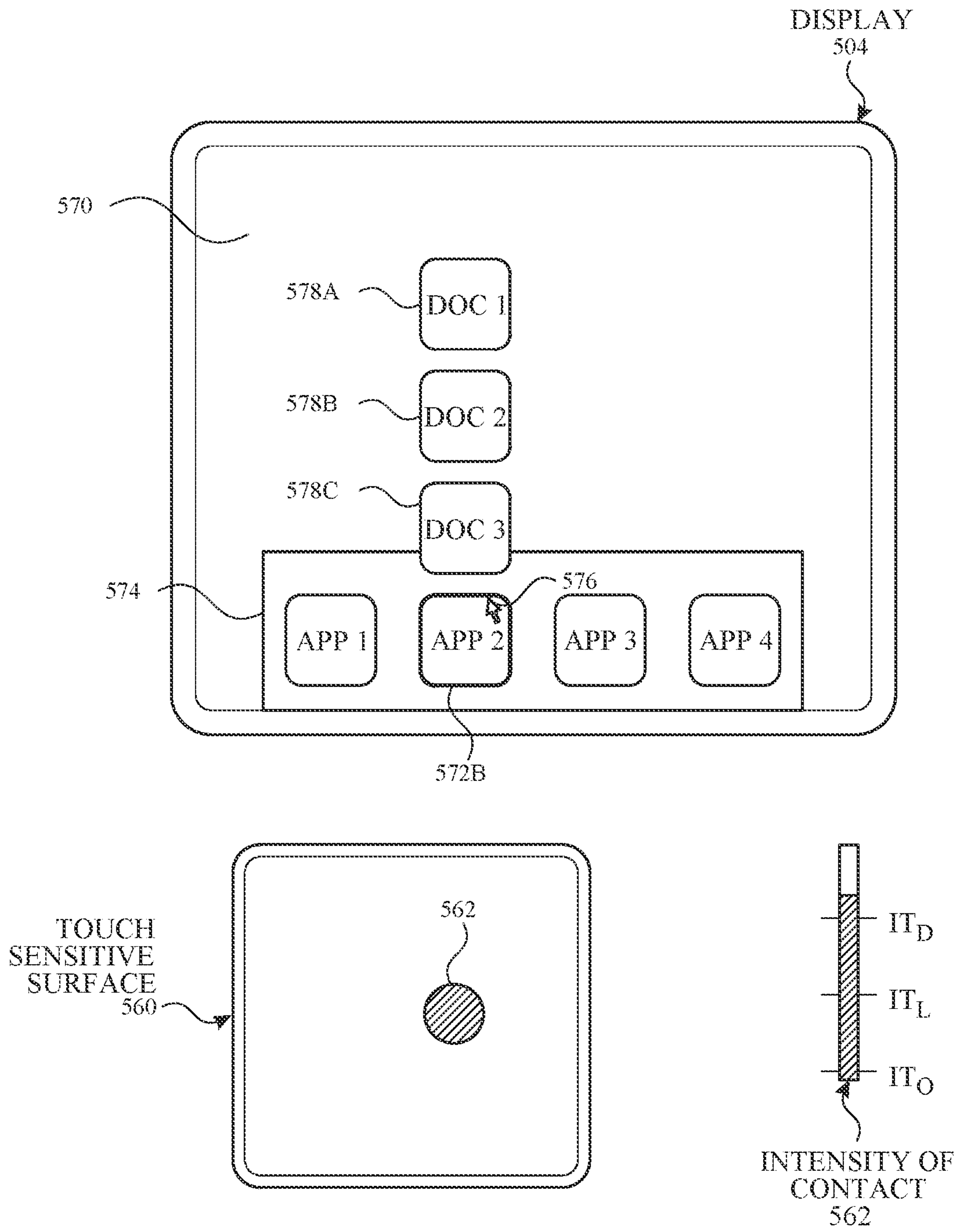

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Location Sharing and Navigation Integration

Users interact with electronic devices in many different manners. In some embodiments, an electronic device is able to see the location of an object, such as a second electronic device. In some embodiments, access to locations of such electronic devices can be shared by an owner of the electronic device with another user (e.g., a user of another electronic device). In some embodiments, the electronic device is able to navigate to the location of the object, optionally while the electronic device has access to the location of the object. The embodiments described below provide ways in which an electronic device facilitates navigation to locations of one or more objects (e.g., other electronic devices), optionally while the electronic device has access to location information of the one or more objects, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6KK illustrate exemplary ways in which an electronic device facilitates navigation to a location of one or more second electronic devices based on location information of the one or more second electronic devices, in accordance with some embodiments of the disclosure. The embodiments in these figures are used to illustrate the processes described below, including the processes described with reference to FIG. 7.

Figure 6B:
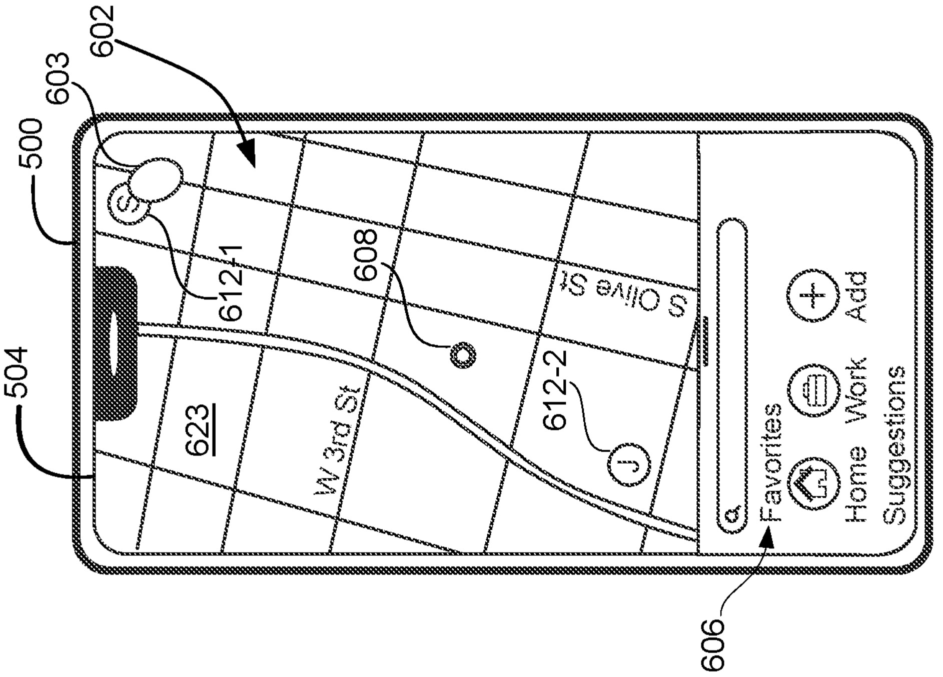
FIGS. 6A-6KK illustrate exemplary ways in which an electronic device facilitates navigation to a location of one or more second electronic devices based on location information of the one or more second electronic devices, in accordance with some embodiments of the disclosure.
Figure 6A:
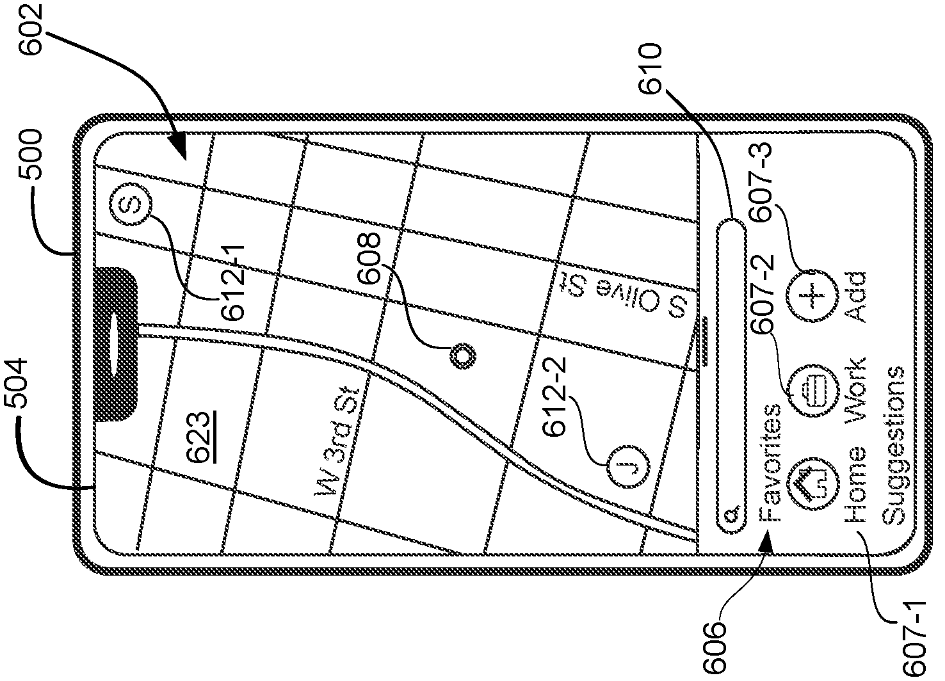

FIGS. 6A-6KK illustrate an electronic device 500 associated with a user, including touchscreen 504 displaying one or more aspects of navigating to one or more destinations. In FIG. 6A, electronic device 500 represents a mobile electronic device belonging to John, as described in more detail later. Furthermore, and as shown in FIG. 6A, electronic device 500 displays a user interface 602 of a maps application via which navigation to one or more destinations is able to be facilitated.

In the example of FIG. 6A, the user (e.g., John) of the electronic device 500 has access to the locations of one or more second electronic devices. For example, in FIG. 6A and as discussed in more detail below, the user of the electronic device 500 has access to a location of an electronic device associated with a second user (e.g., Sam) and a location of an electronic device associated with a third user (e.g., Jane). It should be understood that, as described below, the location of the electronic device associated with the second user (e.g., Sam) and the location of the second user are referred to herein interchangeably, and, likewise, the location of the electronic device associated with the third user (e.g., Jane) and the location of the third user are referred to herein interchangeably. In some embodiments, as discussed herein later, the user of the electronic device 500 is able to access information regarding the locations of the second user and the third user to which the user has access via an item locating application.

In some embodiments, as shown in FIG. 6A, the user interface 602 of the maps application includes a representation of a map 623 of a physical region surrounding and/or including the location of the user (e.g., John) and/or the electronic device 500. It should be understood that, as described below, the location of the electronic device 500 and the location of the user (e.g., John) of the electronic device 500 are referred to herein interchangeably. In some embodiments, the map 623 indicates the location of the user and/or the electronic device 500 as a circle/icon 608, which is optionally centered within the map 623 (e.g., the physical region represented by the map 623 is centered around the location of the user (e.g., John)). Additionally, in some embodiments, as shown in FIG. 6A, the map 623 includes indications of locations of other users (e.g., locations of other electronic devices associated with the other users) to which the user (e.g., John) has access. For example, in FIG. 6A, the map includes a representation 612-1 (e.g., an icon) of a location of the second user (e.g., Sam) discussed above and a representation 612-2 (e.g., an icon) of a location of the third user (e.g., Jane) discussed above. In some embodiments, the representation 612-1 is displayed at a location on the map 623 corresponding to the location of the second user (e.g., Sam) in the physical region and the representation 612-2 is displayed at a location on the map 623 corresponding to the location of the third user (e.g., Jane) in the physical region. In some embodiments, the map 623 is displaying the representations 612-1 and 612-2 of the locations of the second user (e.g., Sam) and the third user (e.g., Jane), respectively, because a distance from the location of the user (e.g., John) to the location of the second user and the location of the third user is within a bounded distance defined by the physical region surrounding the location of the electronic device 500. For example, if the physical region surrounding the location of the electronic device 500 is bounded in each of the North, East, South, and West directions by a distance of 15 miles, the location of the second user (e.g., Sam) and the location of the third user (e.g., Jane) are less than 15 miles from the location of the electronic device 500. As further shown in FIG. 6A, and as noted above, the representations 612-1 and 612-2 indicate the corresponding user/electronic device (e.g., via a graphic or image corresponding to the users Sam and Jane, such as letter "S" representing the user Sam and letter "J" representing the user Jane), such that the user (e.g., John) can visually identify the other users on the map 623 of the user interface 602. In some embodiments, and as shown in FIG. 6A, the representations of the other users on the map 623 of the user interface 602 are bubbles and/or circles including the graphics discussed above. However, it should be understood that the representations are optionally any shape and/or size.

Additionally, in some embodiments, as shown in FIG. 6A, the user interface 602 of the maps application includes search bar 610 (e.g., a text-entry field) that is selectable to input text for searching for a particular destination, as discussed below. In some embodiments, as shown in FIG. 6A, the user interface 602 includes a Favorites region 606 that includes one or more saved/favorited destinations. For example, as shown in FIG. 6A, the Favorites region 606 includes a first indication 607-1 of a first saved destination (e.g., a Home destination), a second indication 607-2 of a second save destination (e.g., a Work destination), and a third indication 607-3 that is selectable to add an additional destination to the Favorites region 606. In some embodiments, the first indication 607-1 is selectable to initiate navigation, in the user interface 602, to the first saved destination and the second indication 607-2 is selectable to initiate navigation to the second saved destination.

In some embodiments, the representations 612-1 and 612-2 on the map 623 of the user interface 602 are selectable to display information corresponding to the user associated with the selected representation. In FIG. 6B, while the user interface 602 of the maps application is displayed via the touchscreen 504, the electronic device 500 detects a selection, via contact 603, directed to the representation 612-1 of the location of the second user (e.g., Sam) on the map 623 in the user interface 602. For example, the electronic device 500 detects a click, tap, slide, and/or hover input on the touchscreen 504 over a location corresponding to the representation 612-1.

Figure 6D:
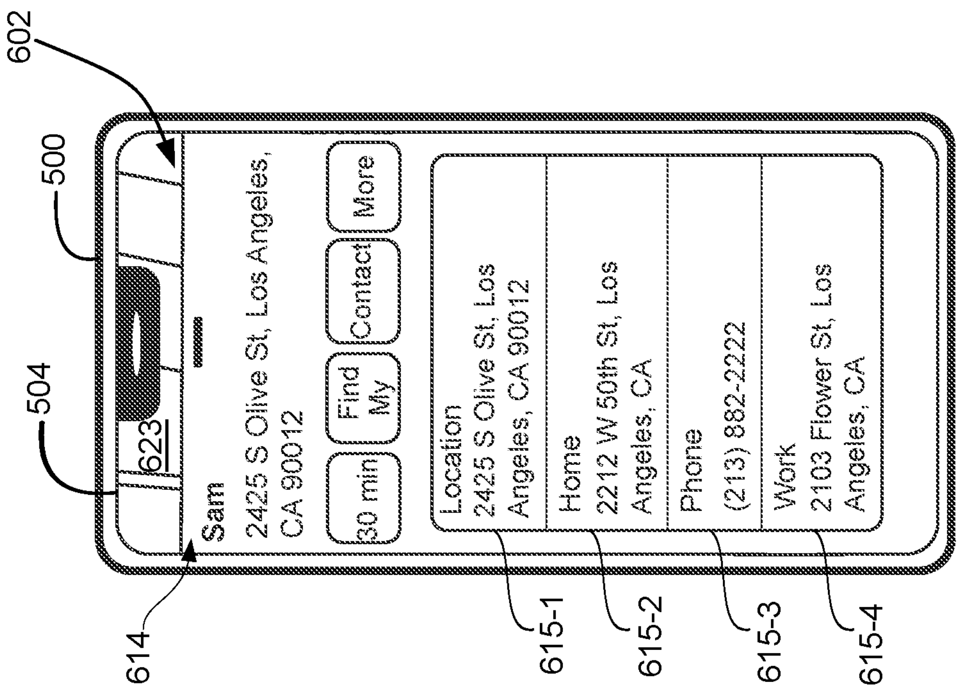
Figure 6C:
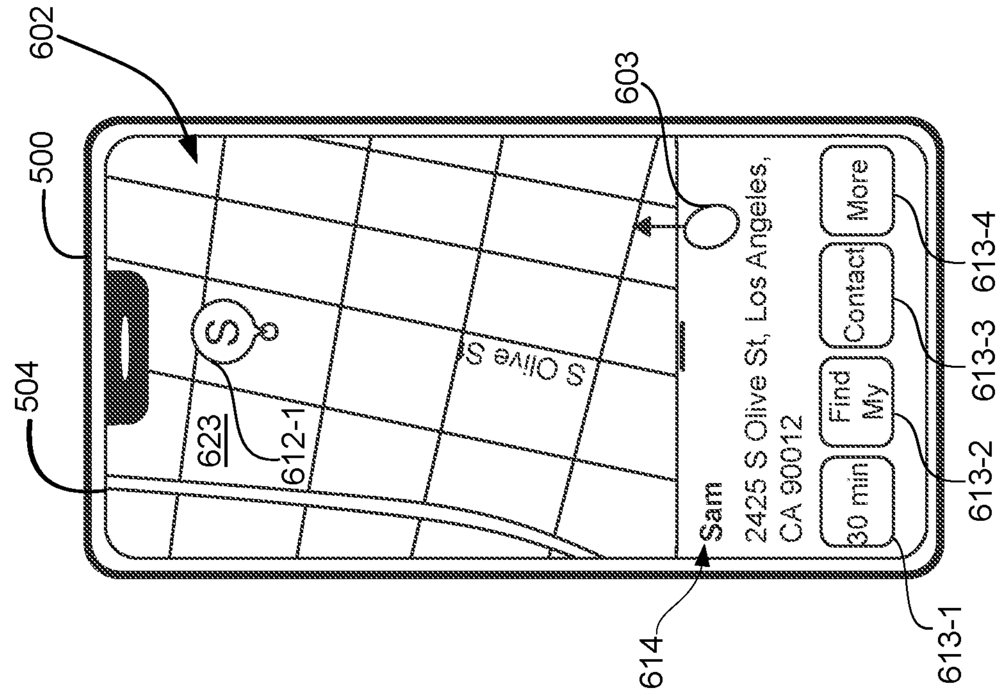

In some embodiments, as shown in FIG. 6C, in response to detecting the selection of the representation 612-1 on the map 623, the electronic device 500 displays region 614 (e.g., a virtual card or page) that includes information corresponding to the second user (e.g., Sam). Additionally, as shown in FIG. 6C, the electronic device 500 optionally expands and/or increases a size of the representation 612-1 to indicate selection of the representation 612-1 as discussed above. In some embodiments, as shown in FIG. 6A, the region 614 includes an indication identifying the second user (e.g., the region 614 includes text "Sam" as a title of the region 614). Additionally, as shown in FIG. 6A, because the user of the electronic device 500 has access to the location of the second user, the region 614 includes an indication of a current location of the second user. For example, the electronic device 500 displays an address (e.g., 2425 S Olive St) at which the second user is currently located (e.g., based on location information shared by the electronic device associated with the second user). In some embodiments, as shown in FIG. 6A, the region 614 includes a first option 613-1 that is selectable to initiate navigation, in the user interface 602, to the current location of the second user. In some embodiments, the first option 613-1 includes an indication of a travel time (e.g., 30 minutes) to travel to the second user in accordance with a particular mode of transit (e.g., driving, walking, public transport, etc.). Additionally, as shown in FIG. 6A, the region 614 includes a second option 613-2 that is selectable to display a user interface of the item locating application discussed previously above, a third option 613-3 that is selectable to display a user interface of a phone calling application that enables the user to contact (e.g., via phone call, text, email, etc.) the second user, and a fourth option 613-4 that is selectable to display additional options in the user interface 602, such as an option to add the location of the second user to the Favorites region 606 discussed above and/or an option to call the second user (e.g., via the phone calling application discussed above).

In FIG. 6C, while displaying the region 614 that corresponds to the second user (e.g., Sam), the electronic device detects movement of contact 603 directed to the region 614. For example, as shown in FIG. 6C, the electronic device 500 detects a swipe of the contact 603 directed to a portion of the region 614 upward in the user interface 602. In some embodiments, as shown in FIG. 6D, in response to detecting the movement of the contact 603 directed to the region 614, the electronic device 500 shifts the region 614 upward in the user interface 602 in accordance with the movement of the contact 603, such that a greater amount of the map 623 is occupied by the region 614, and displays additional information corresponding to the second user (e.g., Sam). For example, as shown in FIG. 6D, the region 614 includes one or more indications of locations/addresses associated with the second user. In some embodiments, the region 614 includes a first indication 615-1 of the current location of the second user as discussed previously above, a second indication 615-2 of a home address of the second user (e.g., saved to the second user's contact in the phone calling application discussed above), a third indication 615-3 of a phone number of the second user (e.g., saved to the second user's contact in the phone calling application discussed above), and a fourth indication 615-4 of a work address of the second user (e.g., saved to the second user's contact in the phone calling application discussed above).

Figure 6E:
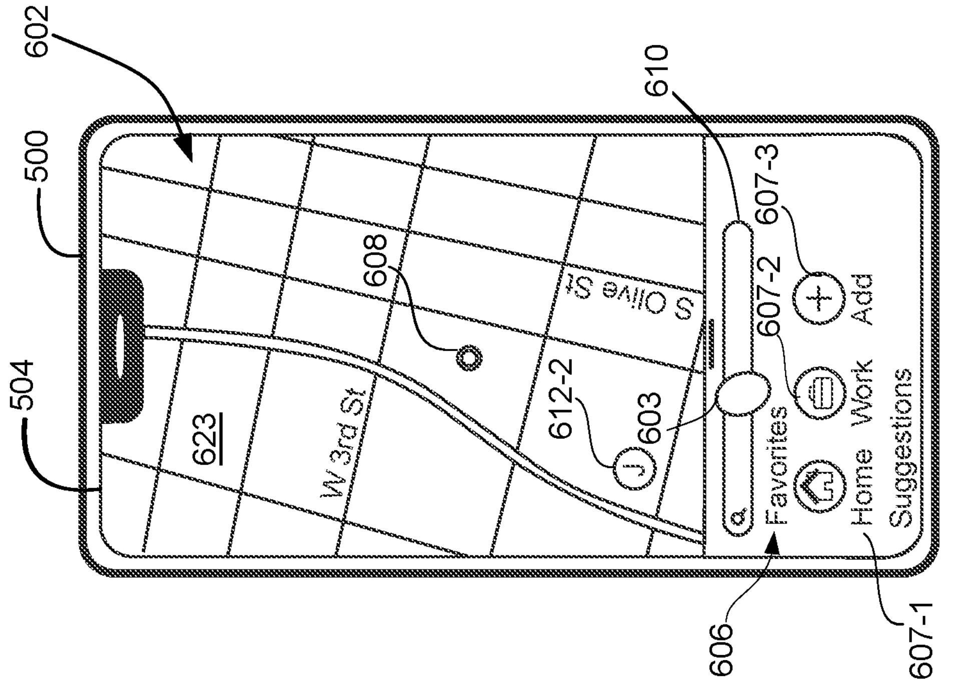

Accordingly, while the region 614 is displayed in the user interface 602 as shown in FIG. 6D, selection of the first option 613-1 and/or one of the indications 615-1, 615-2, and 614-4 will cause the electronic device to initiate navigation to a location associated with the second user, such as the current location of the second user or one of the addresses discussed above of the second user. For example, in FIG. 6D, if the electronic device 500 detects a selection (e.g., via contact 603 discussed above) directed to the first option 613-1 in the region 614, the electronic device 500 updates the user interface 602 to include navigation region 634 that enables the user to initiate navigation to the location of the second user, as shown in FIG. 6K and as discussed in more detail below.

Alternatively, in some embodiments, the user of the electronic device 500 is able to initiate navigation to the location of the second user (e.g., Sam) via the search bar 610 discussed previously above, including an instance in which the user of the electronic device 500 does not have access to the location of the second user. In FIG. 6E, while the user interface 602 is displayed and while the user of the electronic device 500 does not have access to the location of the second user (e.g., which causes the map 623 to no longer include the representation 612-1 (e.g., icon) of the second user as discussed above), the electronic device 500 detects a selection, via contact 603, directed to the search bar 610 in the user interface 602. In some embodiments, the selection of the search bar 610 has one or more characteristics of selection inputs discussed above.

Figure 6F:
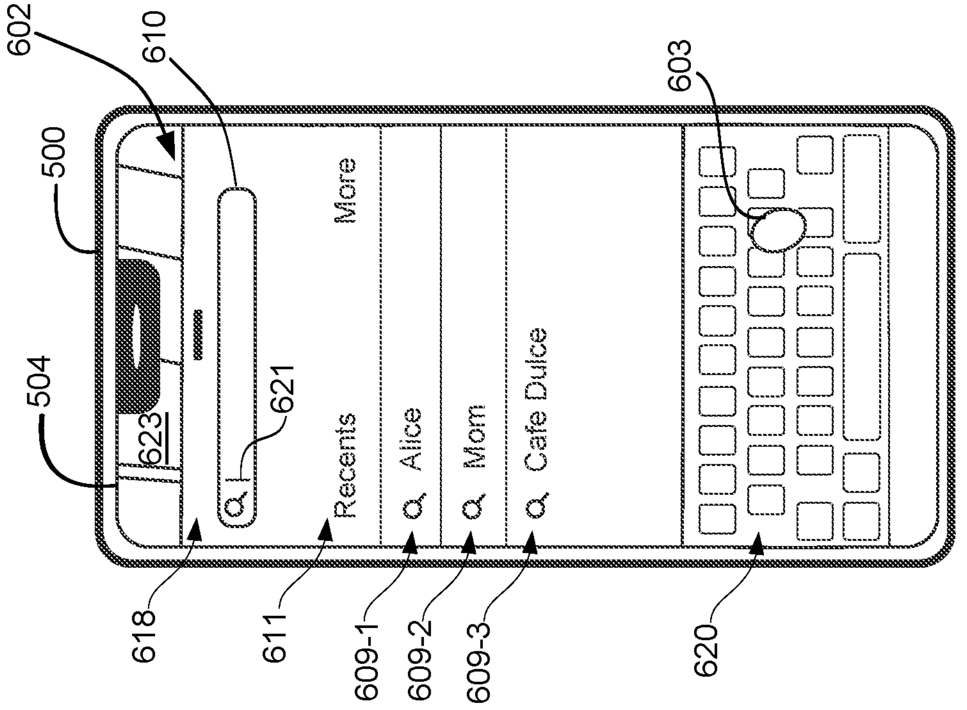

In some embodiments, as shown in FIG. 6F, in response to detecting the selection of the search bar 610, the electronic device 500 displays search region 618 overlaid on the map 623 in the user interface 602. In some embodiments, as shown in FIG. 6F, the search region 618 includes the search bar 610 discussed above, which now includes text cursor 621 indicating that text is able to be entered into the search bar 610 to search for one or more destinations for navigation. Additionally, in some embodiments, as shown in FIG. 6F, the search region 618 includes a list 611 of recent locations/destinations that the user of the electronic device 500 has navigated to (e.g., within the past hour, day, week, month, etc.), such as a first recent destination 609-1 (e.g., corresponding to a location of user Alice), a second recent destination 609-2 (e.g., corresponding to a location of user Mom), and a third recent destination 609-3 (e.g., corresponding to a location of business Café Dulce). In some embodiments, as shown in FIG. 6F, the search region 618 also includes keyboard 620 (e.g., a digital keyboard of the electronic device 500) comprising a plurality of keys that are selectable to enter text into the search bar 610.

Figure 6G:
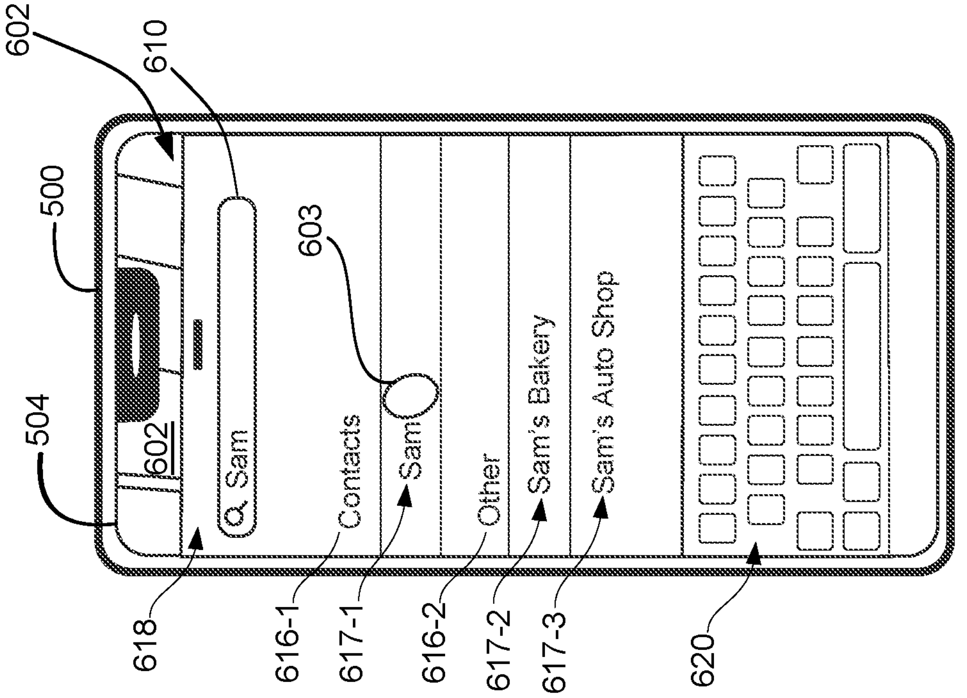

In FIG. 6F, while the search region 618 is displayed in the user interface 602, the electronic device 500 detects a sequence of one or more selections, via contact 603, of one or more keys of the keyboard 620 in the user interface 602. For example, the electronic device 500 detects a sequence of taps of the contact 603 on the touchscreen 504 at locations corresponding to one or more keys of the keyboard 620. In some embodiments, as shown in FIG. 6G, in response to detecting the sequence of one or more selections directed to the keyboard 620, the electronic device 500 updates the search bar 610 to include text corresponding to the selected one or more keys of the keyboard 620. For example, as shown in FIG. 6G, the electronic device 500 displays the text "Sam" at the location of the text cursor 621 in FIG. 6F in the search bar 610. In some embodiments, as shown in FIG. 6G, when the electronic device 500 enters the text "Sam" into the search bar 610, the electronic device 500 displays a plurality of search results corresponding to the text "Sam" in the search region 618. For example, as shown in FIG. 6G, the electronic device 500 displays search results organized according to type, such as Contacts, as indicated by indication 616-1, and Other, as indicated by indication 616-2. In some embodiments, as shown in FIG. 6G, the search results include the second user (e.g., Sam), as indicated by result 617-1, a business "Sam's Bakery", as indicated by result 617-2, and a business "Sam's Auto Shop", as indicated by result 617-3.

Figure 6H:
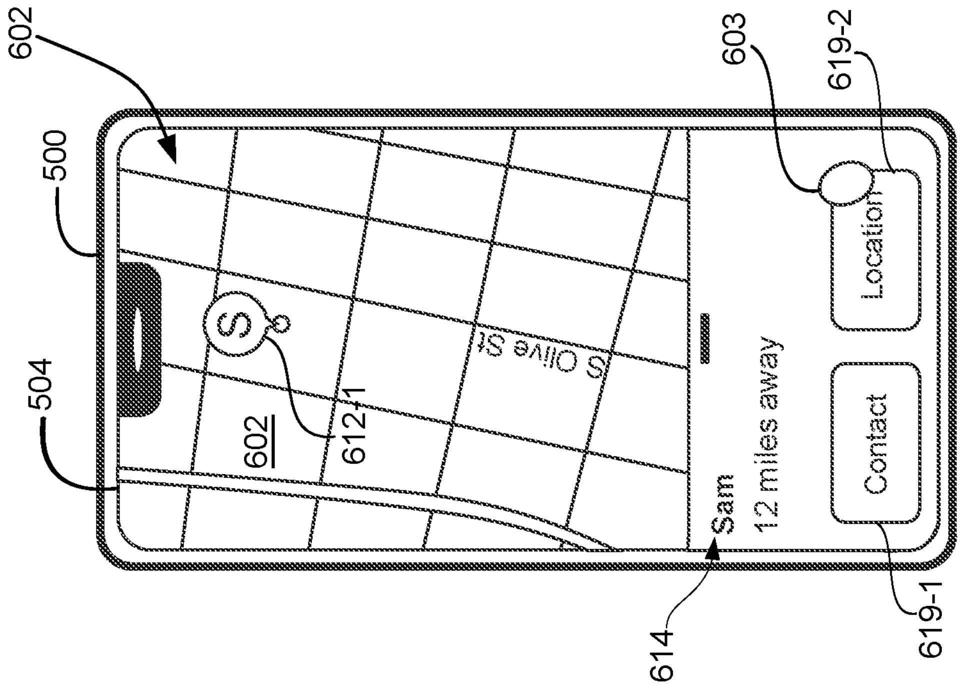

In FIG. 6G, while the plurality of search results are displayed in the search region 618, the electronic device 500 detects a selection, via a tap of contact 603, directed to the result 617-1 corresponding to the second user (e.g., Sam). In some embodiments, the selection of the result 617-1 has one or more characteristics of selection inputs discussed previously above. In some embodiments, as shown in FIG. 6H, in response to detecting the selection of the result 617-1 corresponding to the second user, the electronic device 500 displays, in the user interface 602, the region 614 (e.g., contact card or page) corresponding to the second user described previously above with reference to FIG. 6C. However, as shown in FIG. 6H, because the user of the electronic device 500 does not have access to the location of the second user in the example of FIG. 6H, the region 614 does not include the indication of the current location of the second user. Rather, as shown in FIG. 6H, the region 614 includes an indication of a distance (e.g., 12 miles) to a known/saved address associated with the second user, such as the home address or work address discussed above with reference to FIG. 6D, which is not necessarily the current location of the second user. Additionally, as shown in FIG. 6H, the region 614 optionally does not include second option 613-2 of FIG. 6C because the user of the electronic device does not have access to the location of the second user. In some embodiments, as shown in FIG. 6H, the region 614 includes first option 619-1 corresponding to third option 613-3 in FIG. 6C and second option 619-2 which is selectable to initiate a process for requesting access to the location of the second user.

In FIG. 6H, while displaying the region 614 in the user interface 602, the electronic device 500 detects a selection, via a tap of contact 603, directed to the second option 619-2. In some embodiments, the selection of the second option 619-2 has one or more characteristics of selection inputs discussed previously above.

In some embodiments, in response to detecting the selection of the second option 619-2 in FIG. 6H, the electronic device 500 initiates a process for requesting access to the location of the second user (e.g., from the second user). In some embodiments, as shown in FIG. 6I, initiating the process to request access to the location of the second user includes displaying, via the touchscreen 504, a user interface 622 of a messaging application. For example, as shown in FIG. 6I, the user interface 622 corresponds to a text messaging conversation between the user of the electronic device 500 and the second user (e.g., Sam). In some embodiments, as shown in FIG. 6I, the user interface 622 includes a plurality of message bubbles corresponding to text messages transmitted between the user and the second user, such as message bubbles 626-1 and 626-2 transmitted by the electronic device 500 to a second electronic device associated with the second user and message bubble 626-3 received by the electronic device 500 and transmitted by the second electronic device. Additionally, in some embodiments, the user interface 622 includes message-entry field 625, including text cursor 621, for inputting text for the text messaging conversation between the user and the second user. In some embodiments, when the user interface 622 is displayed in response to detecting the selection of the second option 619-2 in FIG. 6H, as shown in FIG. 6I, the electronic device 500 displays location sharing widget 624 in the user interface 622 that is able to be transmitted as a message within the text messaging conversation. For example, as shown in FIG. 6I, the location sharing widget 624 includes a first option 627-1 that is selectable to request access to the location of the second user from the second user and a second option 627-2 that is selectable to share access to the location of the user of the electronic device 500 with the second user.

In FIG. 6I, while the location sharing widget 624 is displayed in the user interface 622, the electronic device 500 detects a selection, via a tap of contact 603, directed to the first option 627-1. In some embodiments, the selection of the first option 627-1 has one or more characteristics of selection inputs discussed previously herein. In some embodiments, in response to detecting the selection of the first option 627-1, the electronic device 500 transmits the request, via the text messaging conversation in the user interface 622, to the second user for obtaining access to the location of the second user (e.g., via the second electronic device associated with the second user).

Figure 6J:
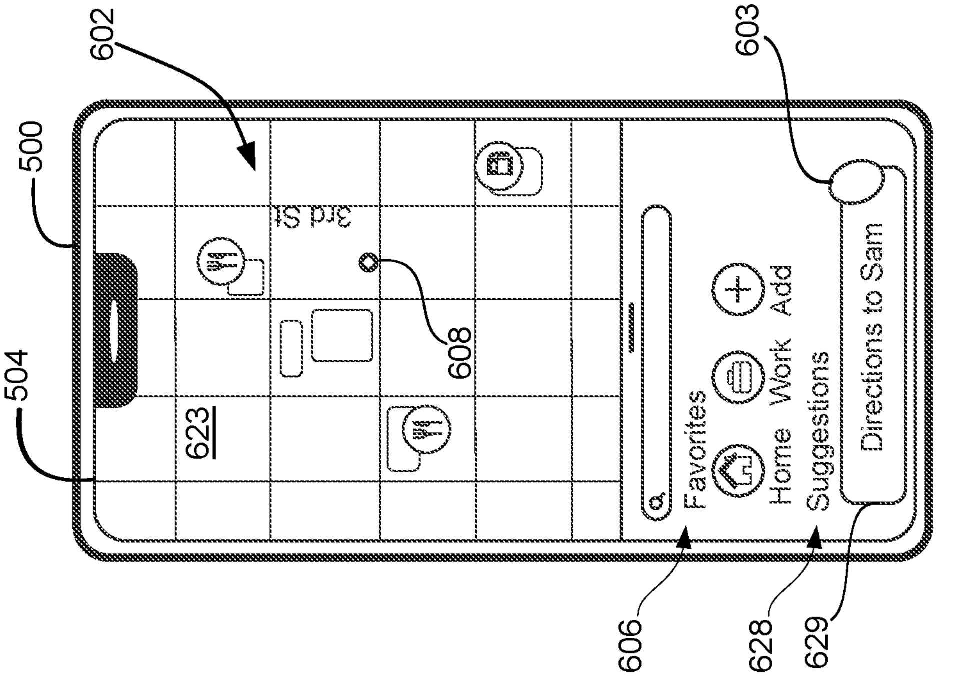
Figure 6I:
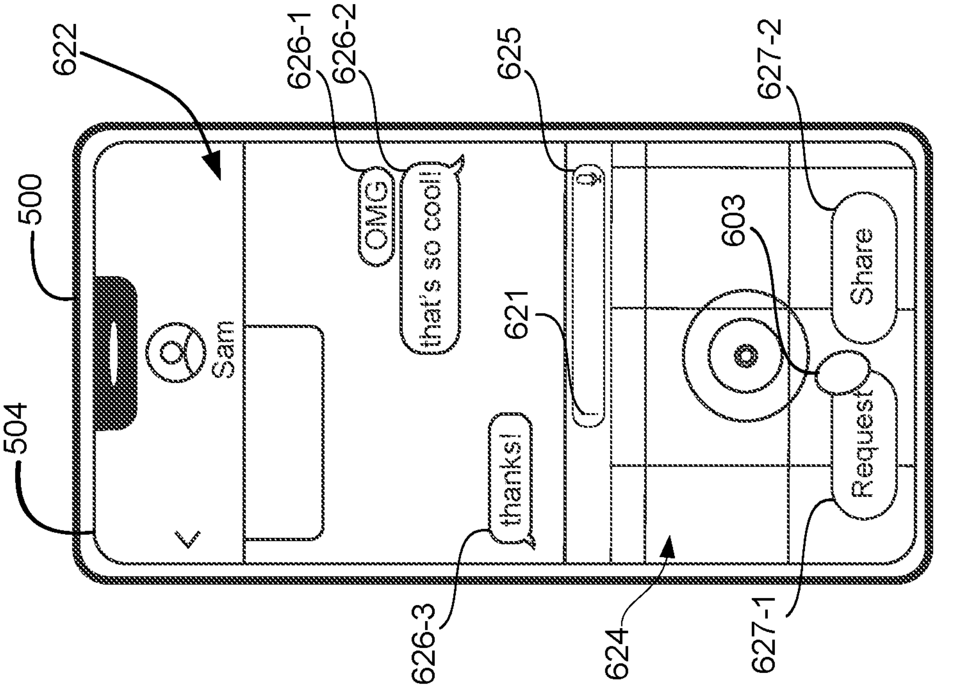
Figure 6K:
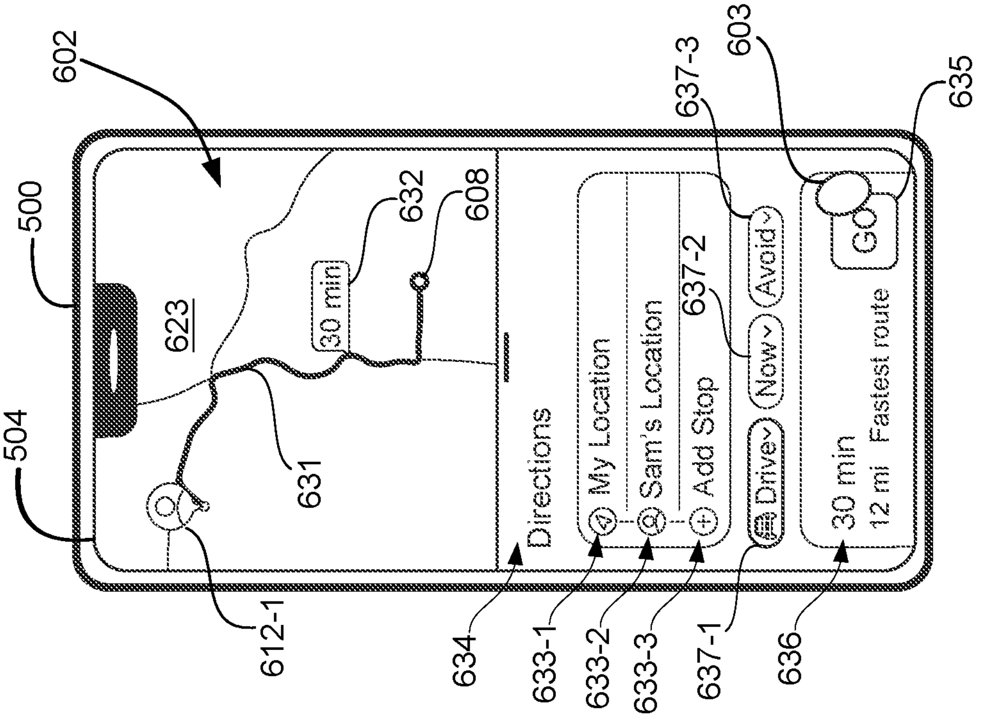

In some embodiments, as shown in FIG. 6J, in accordance with a determination that the second user grants access to the location of the second user to the user of the electronic device 500, when the user interface 602 of the maps application is reopened (e.g., redisplayed) on the touchscreen 504, the user interface 602 includes suggestion element 629. For example, as shown in FIG. 6J, the user interface 602 includes Suggestions region 628 that includes the suggestion element 629. In some embodiments, the suggestion element 629 suggests navigation to the location of the second user (e.g., Sam) based on the recent user activity of obtaining access to the location of the second user as discussed above. In some embodiments, the suggestion element 629 is selectable to initiate navigation to the location of the second user.

In FIG. 6J, while displaying the user interface 602 that includes the suggestion element 629, the electronic device 500 detects, via a tap of contact 603, directed to the suggestion element 629, as similarly discussed above. In some embodiments, in response to detecting the selection of the suggestion element 629, the electronic device 500 initiates navigation to the location of the second user. In some embodiments, as shown in FIG. 6K, initiating navigation to the location of the second user includes updating display of the user interface 602 to include the navigation region 634 mentioned previously above. In some embodiments, as shown in FIG. 6K, the navigation region 634 includes an indication 633-1 of a starting point in a route of the navigation, which optionally corresponds to the current location of the user of the electronic device 500, an indication 633-2 of an ending point (e.g., the destination) in the route of the navigation, which corresponds to the location of the second user (e.g., Sam's Location), and an option 633-3 that is selectable to add a stop (e.g., an intervening destination) to the route of the navigation, as discussed in more detail later. In some embodiments, as shown in FIG. 6K, the navigation region 634 includes a first option 637-1 for designating the mode of transit for the navigation, such as driving, walking, public transport, cycling, etc. As shown in the example of FIG. 6K, the designated mode of transit for the navigation is driving (e.g., Drive). Additionally, as shown in FIG. 6K, the navigation region 634 includes a second option 637-2 for defining a start time for the navigation (e.g., starting now or at a later user-defined time), which is defined as starting now (e.g., Now). In some embodiments, the navigation region 634 also includes a third option 637-3 for assigning a driving condition for the navigation, such as avoiding highways, avoiding toll roads, etc. Lastly, as shown in FIG. 6K, the navigation region 634 optionally includes a navigate option 635 that is selectable to start the navigation to the location of the second user. As shown in FIG. 6K, the navigation option 635 is optionally displayed with an indication of an estimated travel time 636 (e.g., 30 minutes) and an indication of a distance (e.g., 12 miles) between the current location of the user and the destination (e.g., the location of the second user).

Additionally, in some embodiments, when the electronic device 500 displays the navigation region 634 in the user interface 602, as shown in FIG. 6K, the electronic device 500 updates the map 623 to visually indicate the route 631 of the navigation from the current location of the user (e.g., represented by icon 608) to the destination (e.g., the location of the second user, represented by representation 612-1). Additionally, as shown in FIG. 6K, the map 623 optionally includes an indication of the estimated travel time discussed above, indicated by label 632.

Figure 6L:
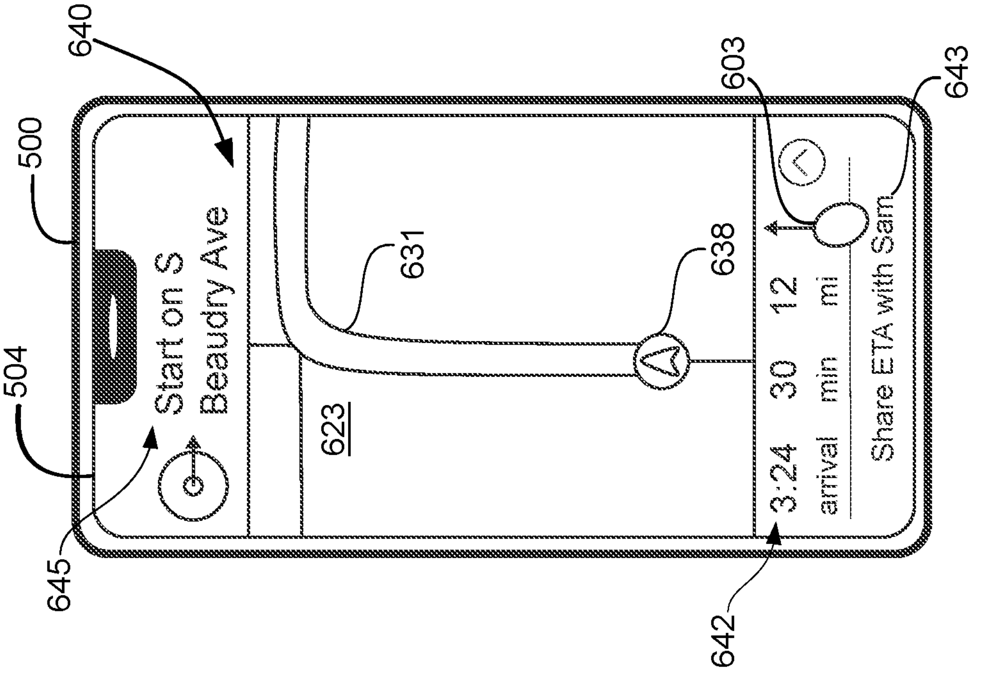

In FIG. 6K, while the navigation region 634 is displayed in the user interface 602, the electronic device 500 detects a selection, via a tap of contact 603, directed to the navigate option 635. In some embodiments, the selection of the navigate option 635 has one or more characteristics of the selection inputs described previously above. In some embodiments, as shown in FIG. 6L, in response to detecting the navigate option 635, the electronic device 500 initiates the navigation to the destination (e.g., the location of the second user). In some embodiments, as shown in FIG. 6L, initiating the navigation to the destination includes displaying a navigation user interface 640 (e.g., via the touchscreen 504). As shown in FIG. 6L, the navigation user interface 640 optionally includes visual navigation instructions. For example, the navigation user interface 640 includes textual directions 645, optionally displayed at a top portion of the navigation user interface 640, that instruct the user of the electronic device 500 how to travel to the destination based on the current mode of transit (e.g., driving directions). Additionally, as shown in FIG. 6L, the electronic device 500 displays a visual indication of a current portion of the route 631 to the destination on the map 623 and a visual indication 638 of the current location of the user of the electronic device 500 on the route to the destination. In some embodiments, as discussed below, the portion of the map 623, the portion of the route 631 and the visual indication 638 are updated as the location of the electronic device 500 changes during the navigation to the destination (e.g., as the distance between the current location of the electronic device 500 and the location of the second user increases or decreases).

Additionally, in some embodiments, as shown in FIG. 6L, the navigation user interface 640 includes navigation control region 642. As shown in FIG. 6L, the navigation control region 642 includes an indication of a current estimated time of arrival (ETA) at the destination (e.g., 3:24), an indication of a current travel time (e.g., 30 minutes), and an indication of a current distance between the electronic device 500 and the destination (e.g., 12 miles). In some embodiments, as discussed below, the indications shown in the navigation control region 642 are updated as the location of the electronic device 500 changes during the navigation to the destination (e.g., as the distance between the current location of the electronic device 500 and the location of the second user increases or decreases). Additionally, as shown in FIG. 6L, the navigation control region 642 includes share option 643 that is selectable to initiate a process to share the current ETA (e.g., 3:24) with another user. In some embodiments, in accordance with a determination that the next destination on the route corresponds to a location of a user, the share option 643 is selectable to initiate a process to share the current ETA with that user. For example, in FIG. 6L, because the destination is the location of the second user (e.g., Sam), the share option 643 is selectable to initiate a process to share the current ETA with the second user, as indicated.

Figure 6N:
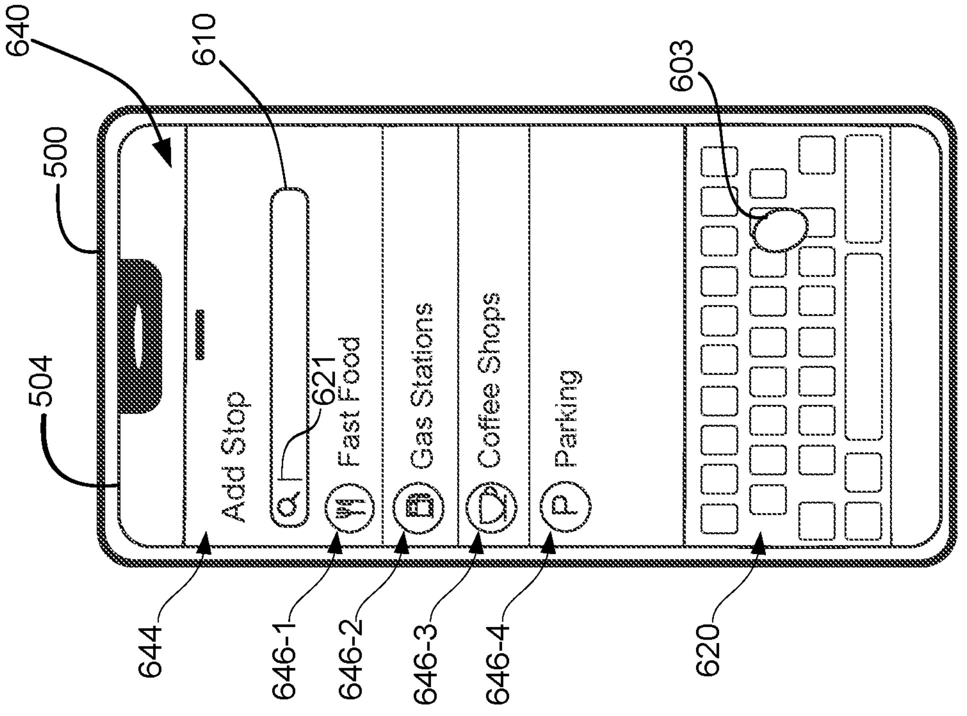
Figure 6M:
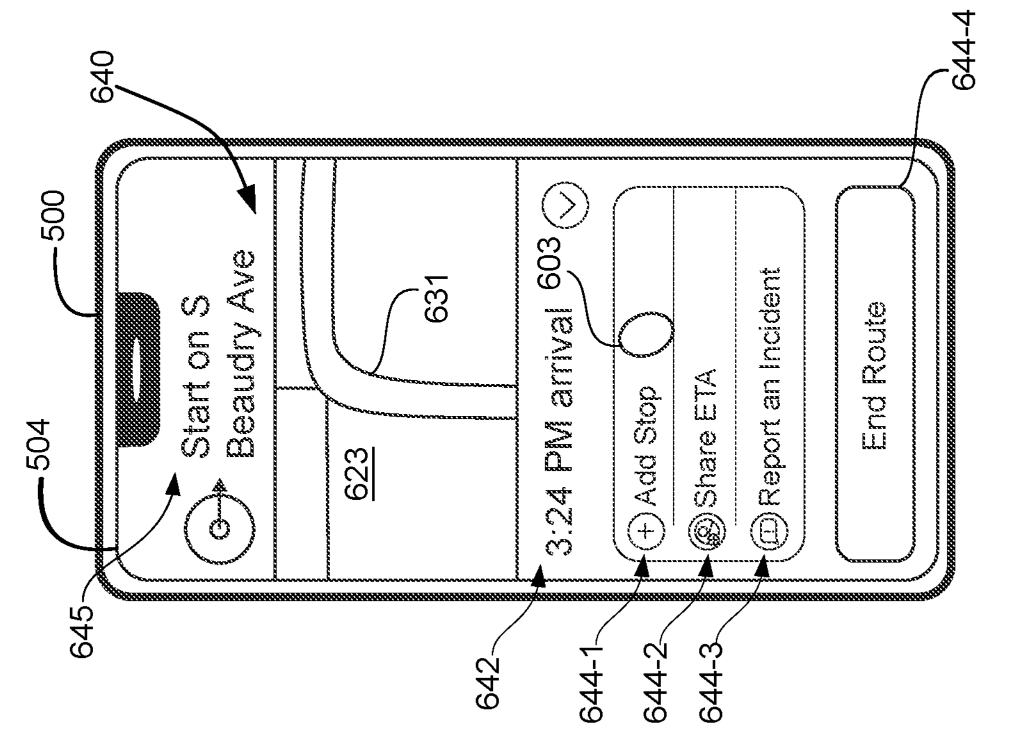

In FIG. 6L, while displaying the navigation user interface 640, the electronic device 500 detects movement of contact 603 (e.g., upward) directed to the navigation control region 642 in the navigation user interface 640. In some embodiments, the movement of the contact 603 (e.g., swipe of the contact 603) has one or more characteristics of movements of the contact 603 discussed above. In some embodiments, as shown in FIG. 6M, in response to detecting the movement of the contact 603 directed to the navigation control region 642, the electronic device 500 shifts the navigation control region 642 upward in the navigation user interface 640 in accordance with the movement of the contact 603, such that the navigation control region 642 is overlaid over a portion of the map 623 in the navigation user interface 640. In some embodiments, as shown in FIG. 6M, when the navigation control region 642 is shifted upward in the navigation user interface 640, the information included in the navigation control region 642 changes. For example, the navigation control region 642 includes the indication of the current ETA (e.g., 3:24 PM), but no longer includes the indication of the travel time or the indication of the distance discussed above. Additionally, as shown in FIG. 6M, the navigation control region 642 is updated to include a first option 644-1 that is selectable to initiate a process to add a stop to the navigation (e.g., an intervening destination), a second option 644-2 that is selectable to share the current ETA with another user, as similarly discussed above, and a third option 644-3 that is selectable to report a traffic incident (e.g., a crash, a road hazard, an inoperable vehicle, etc.) within the maps application. Further, in some embodiments, the navigation control region 642 includes an end option 644-4 that is selectable to terminate the current navigation to the destination.

In FIG. 6M, while the navigation control region 642 is displayed in the navigation user interface 640, the electronic device 500 detects a selection, via a tap of contact 603, directed to the first option 644-1 in the navigation control region 642. In some embodiments, the selection of the first option 644-1 has one or more characteristics of selection inputs discussed above. In some embodiments, in response to detecting the selection of the first option 644-1, the electronic device initiates a process to add a stop to the current navigation. For example, as shown in FIG. 6N, the electronic device 500 updates the navigation user interface 640 to include Add Stop region 644. In some embodiments, as shown in FIG. 6N, the Add Stop region 644 includes search bar 610, including text cursor 621, via which a particular stop (e.g., intervening destination) is able to be searched via a text query, as similarly discussed above. Additionally, as shown in FIG. 6N, the Add Stop region 644 includes categories of destinations from which to select a stop that is near the user or near the route to the destination. For example, as shown in FIG. 6N, the Add Stop region 644 includes a first category 646-1 corresponding to fast food restaurants (e.g., Fast Food), a second category 646-2 corresponding to gas stations (e.g., Gas Stations), a third category 646-3 corresponding to coffee shops (e.g., Coffee Shops), and a fourth category 646-4 corresponding to parking areas (e.g., Parking). In some embodiments, as shown in FIG. 6N, when the electronic device 500 displays the Add Stop region 644 in the navigation user interface 640, the electronic device 500 displays the digital keyboard 620 discussed previously above for entering text into the search field 610.

Figure 6O:
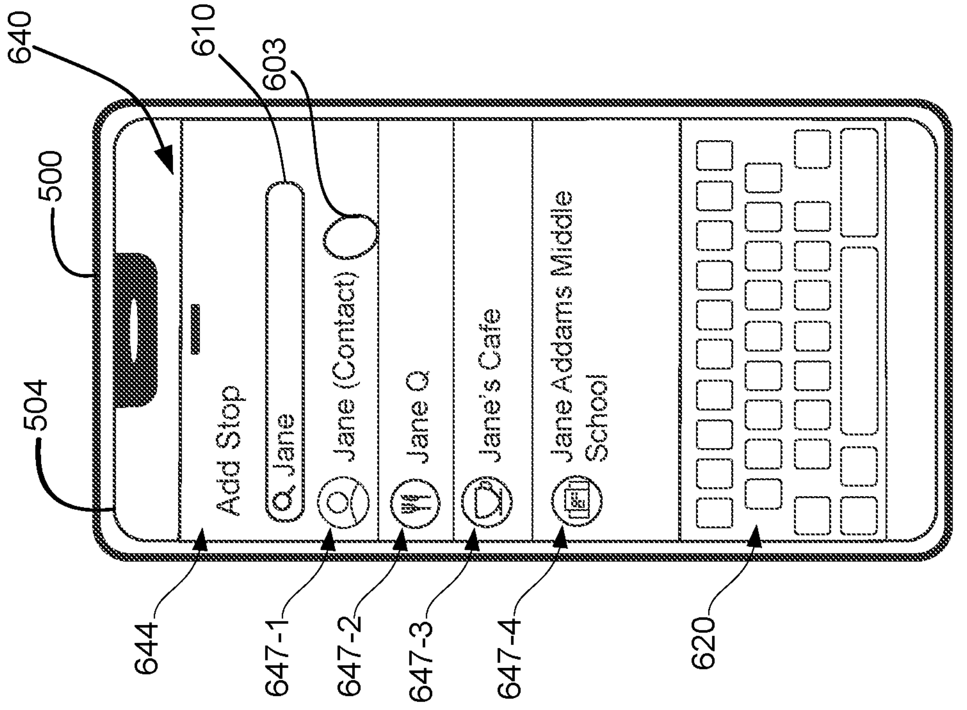

In FIG. 6N, while the Add Stop region 644 and the keyboard 620 are displayed in the navigation user interface 640, the electronic device 500 detects a sequence of one or more inputs, via a sequence of one or more taps of the contact 603, directed to one or more keys of the keyboard 620, as similarly discussed above. In some embodiments, as shown in FIG. 6O, in response to detecting the sequence of one or more inputs directed to one or more keys of the keyboard 620, the electronic device 500 updates the search field 610 to include text (e.g., "Jane") corresponding to the selected one or more keys. In some embodiments, as shown in FIG. 6O, when the electronic device 500 enters the text "Jane" into the search bar 610 in response to detecting the sequence of one or more inputs discussed above, the electronic device 500 displays a plurality of search results based on the text "Jane" in the search bar 610. For example, as shown in FIG. 6O, the electronic device 500 is displaying a first result 647-1 corresponding to a third user Jane discussed previously above, a second result 647-2 corresponding to a restaurant (e.g., Jane Q), a third result 647-3 corresponding to a café (e.g., Jane's Café), and a fourth result 647-4 corresponding to a school (e.g., Jane Addams Middle School). In some embodiments, the plurality of search results are selectable to add the selected destination as a next stop for the current navigation.

Figure 6P:
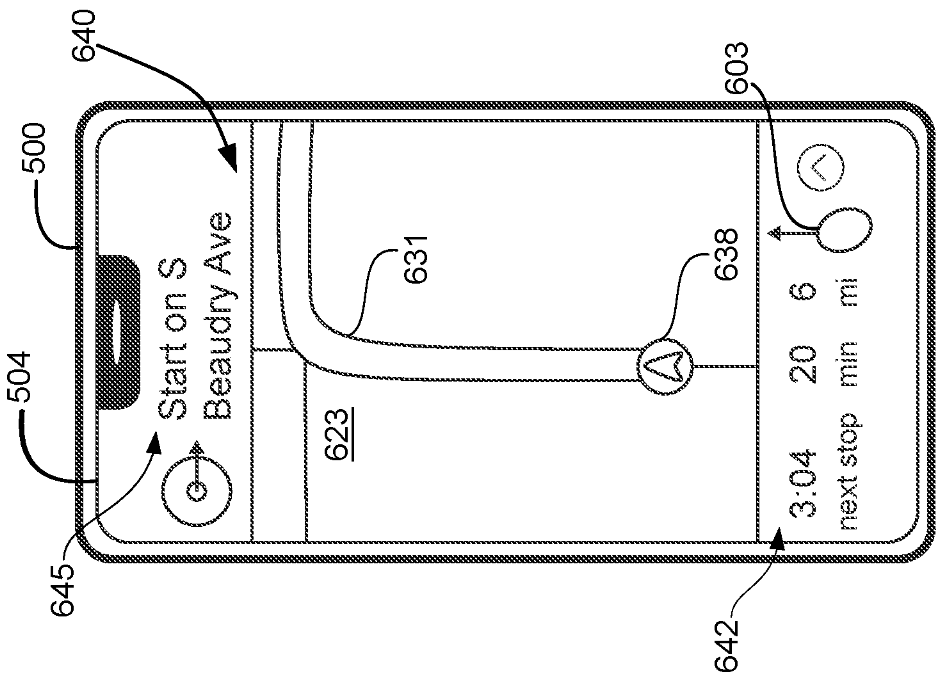

In FIG. 6O, while displaying the plurality of search results in the Add Stop region 644, the electronic device 500 detects a selection, via a tap of contact 603, directed to the first result 647-1, as similarly discussed above. In some embodiments, as shown in FIG. 6P, in response to detecting the selection of the first result 647-1, the electronic device 500 updates the route 631 to the destination (e.g., the location of the second user) to include the location of the third user (e.g., Jane) as an intervening destination. For example, as shown in FIG. 6P, the electronic device 500 initiates navigation to the location of the third user and updates the indications in the navigation control region 642 to be based on a distance between the current location of the electronic device 500 and the location of the third user. As shown in FIG. 6P, the indication of the ETA is updated to be 3:04, the indication of the travel time is updated to be 20 minutes, and the indication of the distance to the next stop is updated to be 6 miles.

Figure 6R:
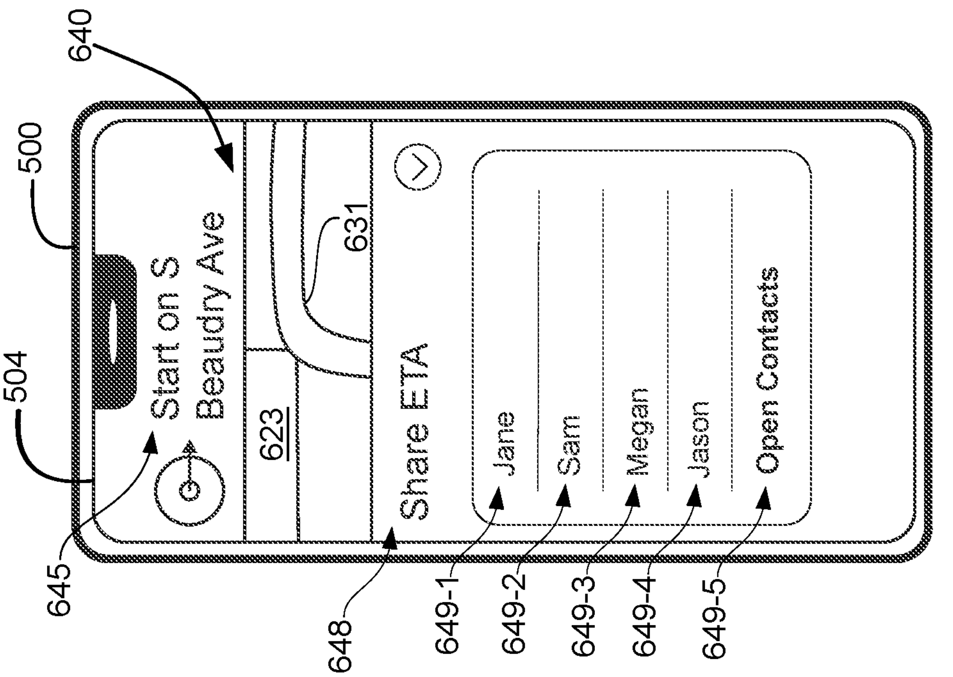
Figure 6Q:
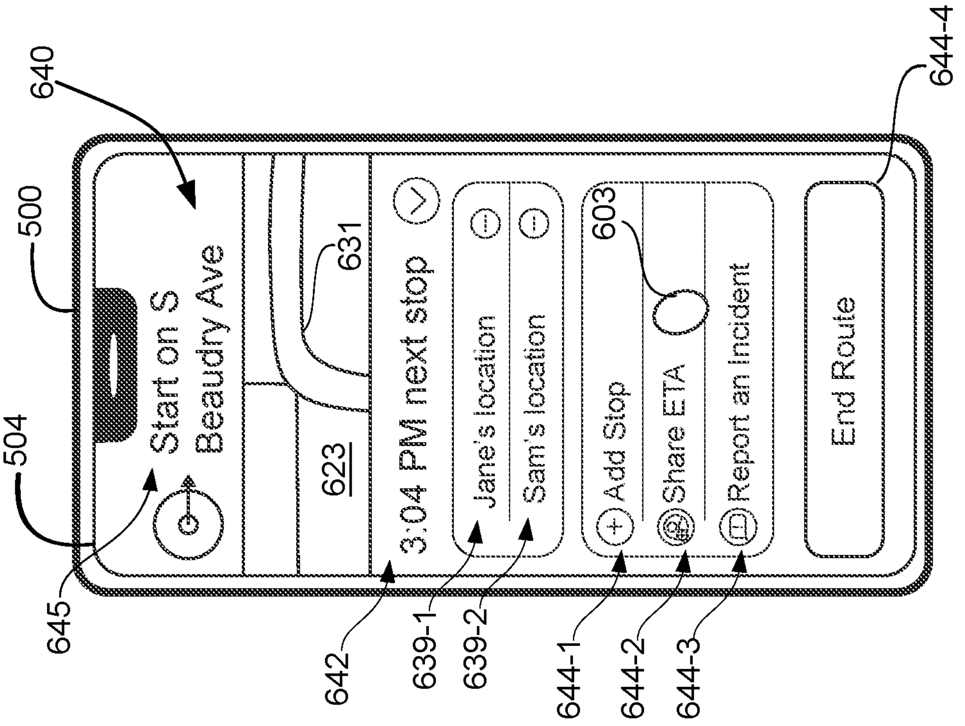

In FIG. 6P, while displaying the navigation user interface 640 for navigating to the location of the third user, the electronic device 500 detects movement (e.g., a swipe) of contact 603 directed to the navigation control region 642, as similarly discussed above. In some embodiments, as similarly discussed above, in response to detecting the movement of the contact 603 directed to the navigation control region 642, the electronic device 500 shifts the navigation control region 642 upward in the navigation user interface 640 and updates the information included in the navigation control region 642. For example, as shown in FIG. 6Q, the navigation control region 642 is updated to include an indication of a next stop 639-1 on the route (e.g., Jane's location" and an indication of a last stop 639-2 on the route (e.g., Sam's location). In some embodiments, the indications 639-1 and 639-2 are selectable to initiate rearrangement of the corresponding stops on the route (e.g., to swap the stops such that Jane's location is the final destination and Sam's location is the intervening destination).

In FIG. 6Q, while displaying the navigation control region 642 in the navigation user interface 640, the electronic device 500 detects a selection, via a tap of contact 603, directed to the second option 644-2 discussed previously above. In some embodiments, as shown in FIG. 6R, in response to detecting the selection of the second option 644-2, the electronic device 500 initiates a process to share the current ETA at the next stop (e.g., the location of the third user) with one or more users. For example, as shown in FIG. 6R, the electronic device 500 displays Share ETA region 648 that includes a list of users with whom the current ETA at the next stop is able to be shared. As shown in FIG. 6R, the list includes the third user 649-1 (e.g., Jane), the second user 649-2 (e.g., Sam), a fourth user 649-3 (e.g., Megan), and a fourth user 646-4 (e.g., Jason). In some embodiments, the list of users is selectable to share the current ETA with one or more selected users in the list of users. For example, selection of the third user 649-1 in the list causes the electronic device 500 to transmit location information corresponding to the electronic device 500 to a third electronic device associated with the third user (e.g., Jane) that allows the third user to follow the location of the electronic device 500 along the route to the next stop (e.g., the location of the third user). Additionally, as shown in FIG. 6R, the Share ETA region 648 includes option 649-5 that is selectable to select an alternative user (e.g., not included in the list shown in FIG. 6R) from a list of all contacts within the phone calling application discussed previously above.

In some embodiments, navigating to a destination via the maps application discussed above includes determining (e.g., establishing) one or more areas relative to the destination. For example, the one or more areas include a Parking area centered on the destination and an Arrival area centered on the destination. In some embodiments, the Parking area is defined by a first radius corresponding to a first threshold distance relative to the destination, example values of which are provided below with reference to method 700, and the Arrival area is defined by a second radius, smaller than the first radius, corresponding to a second threshold distance relative to the destination, example values of which are also provided below with reference to method 700. In some embodiments, as discussed below, while navigating to the destination, when the location of the electronic device 500 is within the one or more areas discussed above, the electronic device 500 automatically changes display of user interfaces associated with the maps application that further enhance the user's ability to travel to and locate the destination.

Figure 6T:
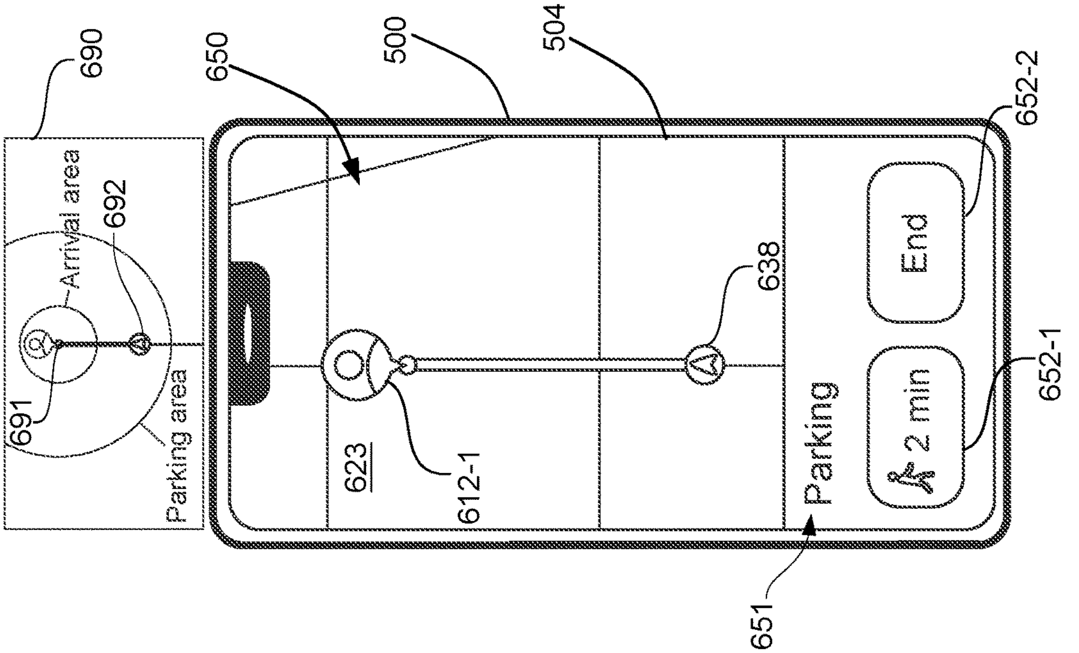
Figure 6S:
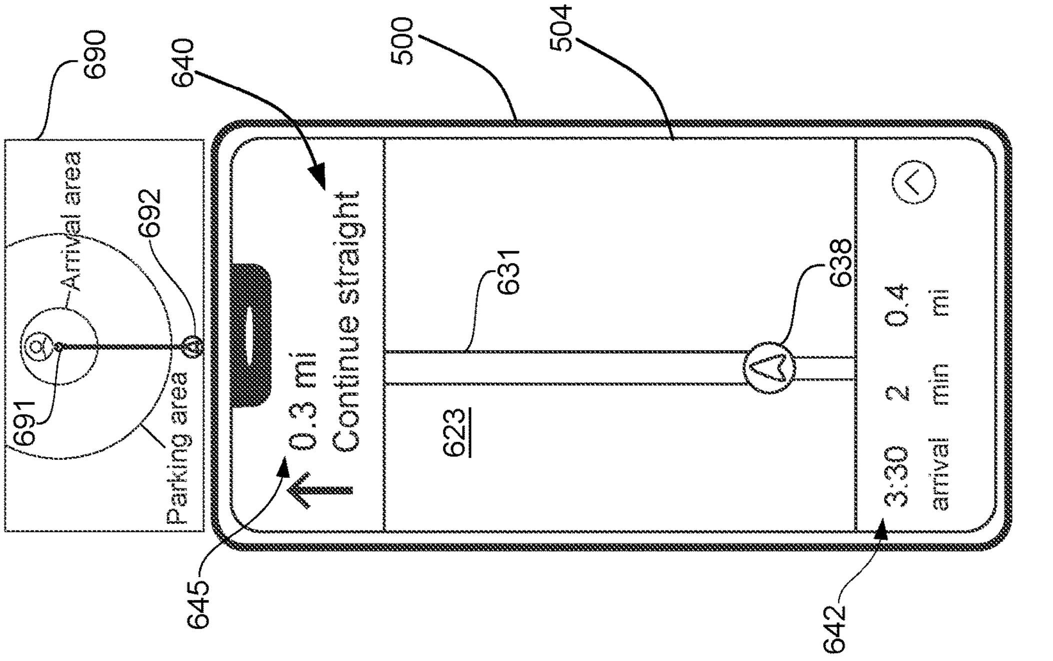

As shown in legend 690 of FIG. 6S, a Parking area and an Arrival area are determined relative to (e.g., centered on) the destination 691 (e.g., the location of the second user). As shown in the legend 690, in the example of FIG. 6S, the current location 692 of the electronic device 500 is outside the Parking area and thus outside the Arrival area. Accordingly, in some embodiments, as shown in FIG. 6S, while navigating to the destination (e.g., the location of the second user), the electronic device 500 continues displaying the navigation user interface 640 that includes the visual navigation instructions discussed above. As shown in the example of FIG. 6S, the electronic device 500 is currently 0.4 miles from the location of the second user, which corresponds to a current travel time of 2 minutes, as indicated in the navigation control region 642.

In FIG. 6T, while navigating to the destination, the electronic device 500 detects the location of the electronic device 500 is within the Parking area, as illustrated in the legend 690. For example, the electronic device 500 detects the location of the electronic device 500 is within the first threshold distance of the destination, while being outside of the second threshold distance of the destination (e.g., outside the Arrival area as shown in the legend 690). In some embodiments, as shown in FIG. 6T, in response to detecting the location 692 of the electronic device 500 within the Parking are as shown in the legend 690, the electronic device 500 displays, via the touchscreen 504, a parking user interface 650. For example, as shown in FIG. 6T, the electronic device 500 replaces display of the navigation user interface 640 of FIG. 6S with the parking user interface 650 that is associated with the maps application. In some embodiments, as shown in FIG. 6T, the parking user interface 650 includes the map 623 discussed above that includes the representation 612-1 of the location of the second user (e.g., the destination) and the visual indication 638 of the current location of the electronic device 500. Additionally, the parking user interface 650 optionally includes a status indication 651 of the navigation to the destination (e.g., Parking). In some embodiments, as shown in FIG. 6T, the parking user interface 650 includes a first option 652-1 and a second option 652-2. In some embodiments, the first option 652-1 is selectable to initiate navigation to the destination in accordance with a second mode of transit. For example, as similarly discussed above, when the parking user interface

650 is displayed, the user is navigating to the destination by driving. In some embodiments, selection of the first option 652-1 initiates navigation to the destination in accordance with walking directions. In some embodiments, as shown in FIG. 6T, the first option 652-1 includes an indication of an estimated travel time (e.g., 2 minutes) to the destination by walking. In some embodiments, the second option 652-2 is selectable to end the navigation to the destination (e.g., cease displaying the parking user interface 650).

Figure 6V:
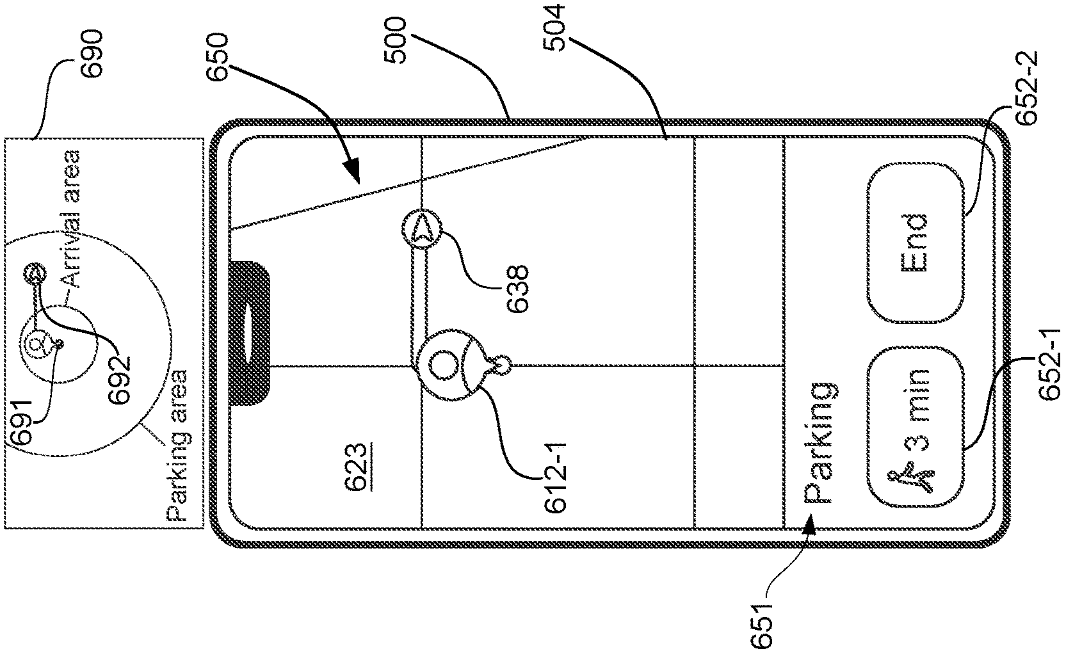
Figure 6U:
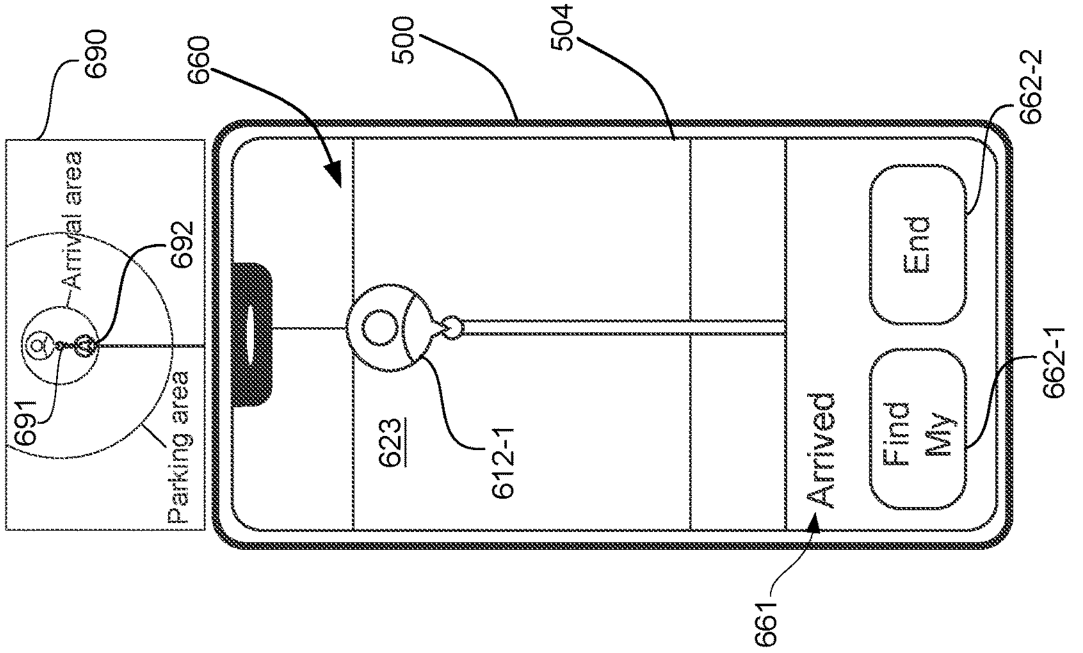

In FIG. 6U, the electronic device 500 detects the location 692 of the electronic device 500 is within the Arrival area as shown in the legend 690. For example, the electronic device 500 detects the location 692 of the electronic device 500 is within the second threshold distance of the destination 691 as shown in the legend 690. In some embodiments, in response to detecting the location of the electronic device 500 within the Arrival area, the electronic device 500 displays, via the touchscreen 504, an arrival user interface 660. For example, as shown in FIG. 6U, the electronic device 500 replaces display of the parking user interface 650 of FIG. 6T with the arrival user interface 660 that is associated with the maps application. In some embodiments, as shown in FIG. 6U, the arrival user interface 660 includes the map 623 and the representation 612-1 of the location of the second user, as similarly discussed above. Additionally, the arrival user interface 660 optionally includes a status indication 661 of the navigation to the destination (e.g., Arrived). In some embodiments, as shown in FIG. 6U, in accordance with a determination that the user has access to the location of the second user (e.g., as discussed above), the arrival user interface 660 includes a first option 662-1. In some embodiments, the first option 662-1 is selectable to display a user interface of the item locating application discussed above to initiate a process to locate the destination using a proximity finding feature, as discussed in more detail below. Additionally, in some embodiments, as shown in FIG. 6U, the arrival user interface 660 includes a second option 662-2 that is selectable to end the navigation to the destination, as similarly discussed above.

In FIG. 6V, the electronic device 500 detects the location 692 of the electronic device 500 is no longer within the Arrival area and is once again in the Parking area as shown in the legend 690. For example, the electronic device 500 detects the location 692 of the electronic device 500 is no longer within the second threshold distance of the destination 691 but is still within the first threshold distance of the destination 691 as shown in the legend 690. Accordingly, as shown in FIG. 6V, the electronic device 500 redisplays the parking user interface 650 discussed above. As shown in FIG. 6V, in some embodiments, when the electronic device 500 redisplays the parking user interface 650, the electronic device 500 updates the visual indication 638 of the current location of the electronic device 500 on the map 623 in accordance with the change in location of the electronic device 500.

Figure 6X:
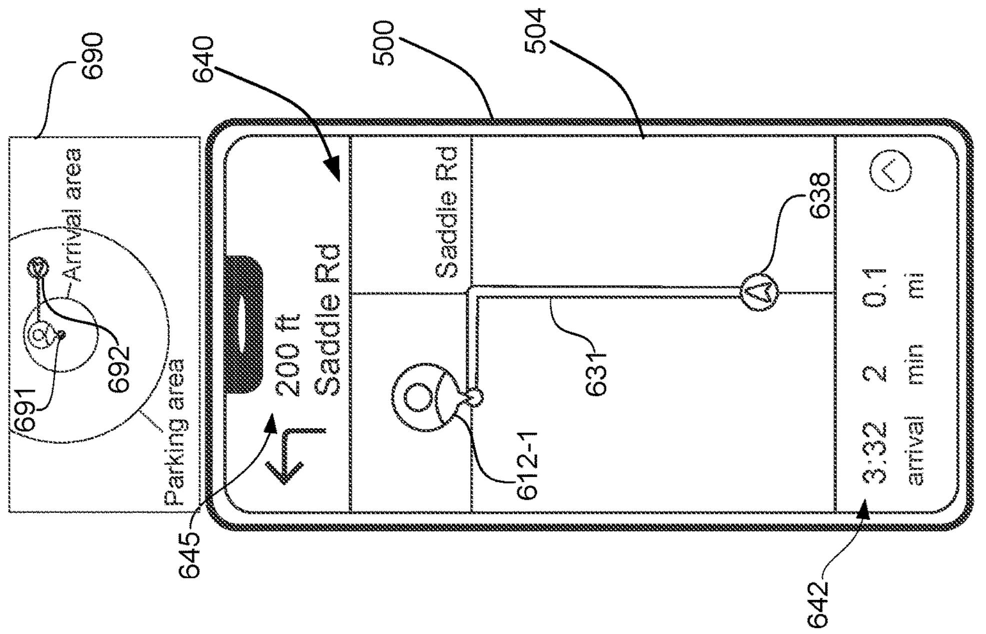
Figure 6W:
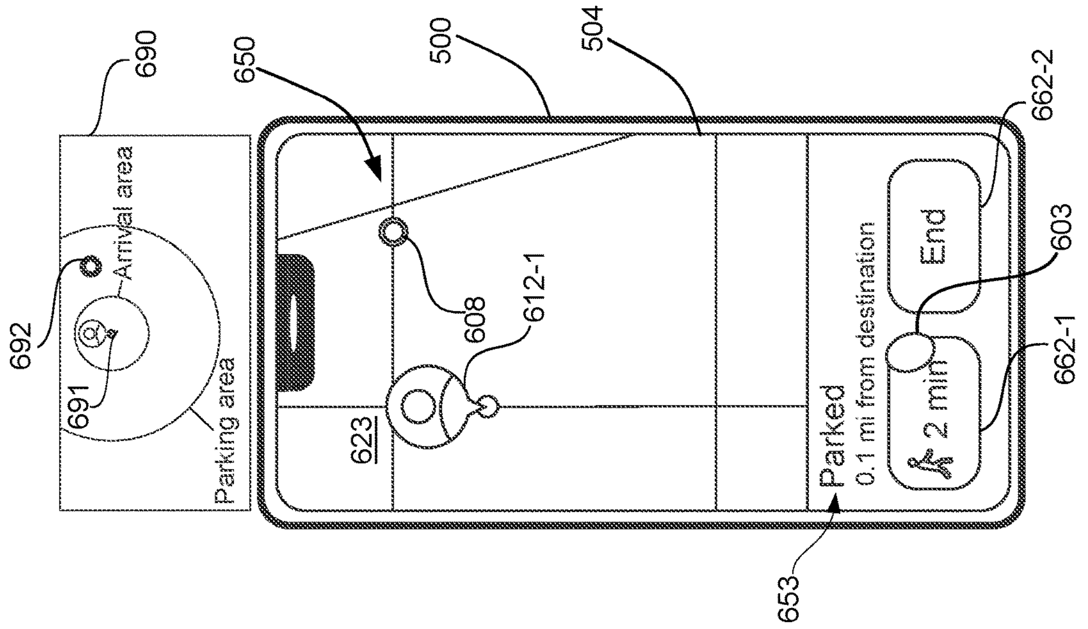

In FIG. 6W, while the location 692 of the electronic device 500 is within the Parking area as shown in the legend 690, the electronic device 500 detects that the user has parked their vehicle (or is no longer riding in a vehicle). For example, via a wired or wireless communications means (e.g., USB, USB-C, Bluetooth, Wi-Fi, etc.) between the electronic device 500 and the vehicle in which the user is riding/driving, the electronic device 500 detects that the user is no longer driving/riding in the vehicle. In some embodiments, in response to detecting that the user has parked their vehicle, because the location 692 of the electronic device 500 is within the Parking area as shown in the legend 690, the electronic device 500 maintains display of the parking user interface 650 discussed above. Additionally, in some embodiments, as shown in FIG. 6W, the electronic device 500 updates the parking user interface 650 to include status indication 653 indicating that the user has parked their vehicle (e.g., Parked).

In FIG. 6W, while displaying the parking user interface 650, the electronic device 500 detects a selection, via a tap of contact 603, directed to the first option 662-1 in the parking user interface 650. In some embodiments, the selection of the first option 662-1 has one or more characteristics of selection inputs discussed previously herein. In some embodiments, in response to detecting the selection of the first option 662-1, the electronic device 500 initiates navigation to the destination in accordance with a walking mode of transit. For example, as shown in FIG. 6X, the electronic device 500 redisplays the navigation user interface 640 discussed above that includes visual navigation instructions for walking to the destination. As shown in FIG. 6X, the indications in the navigation control region 642 are displayed in accordance with the walking mode of transit (e.g., the current ETA (e.g., 3:32) is determined based on an average walking pace of the user of the electronic device 500).

Figure 6Z:
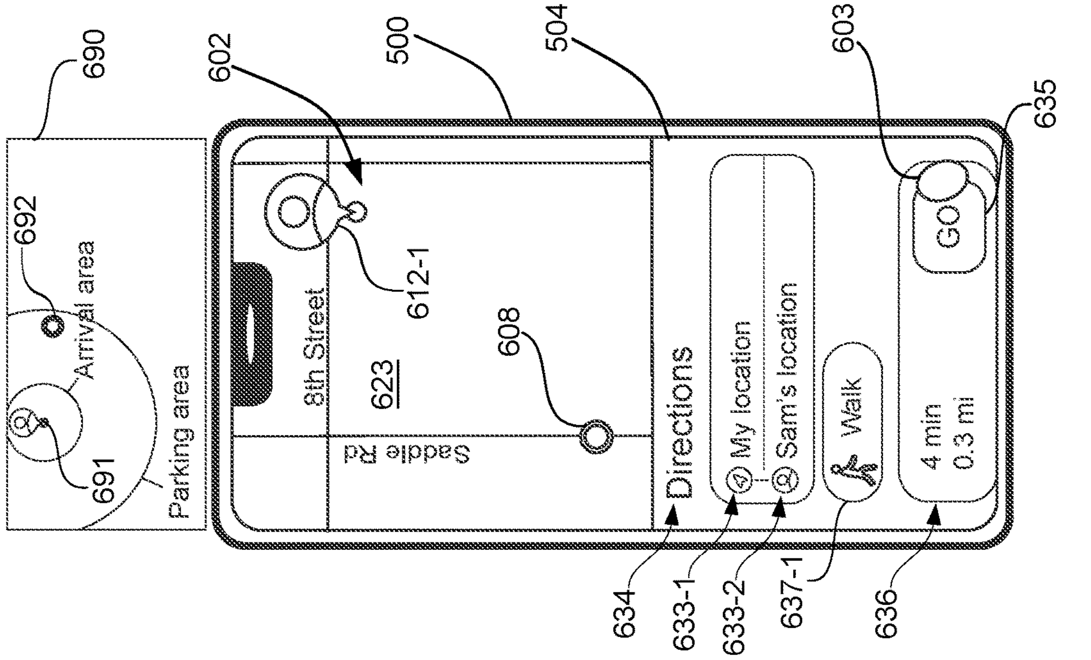
Figure 6Y:
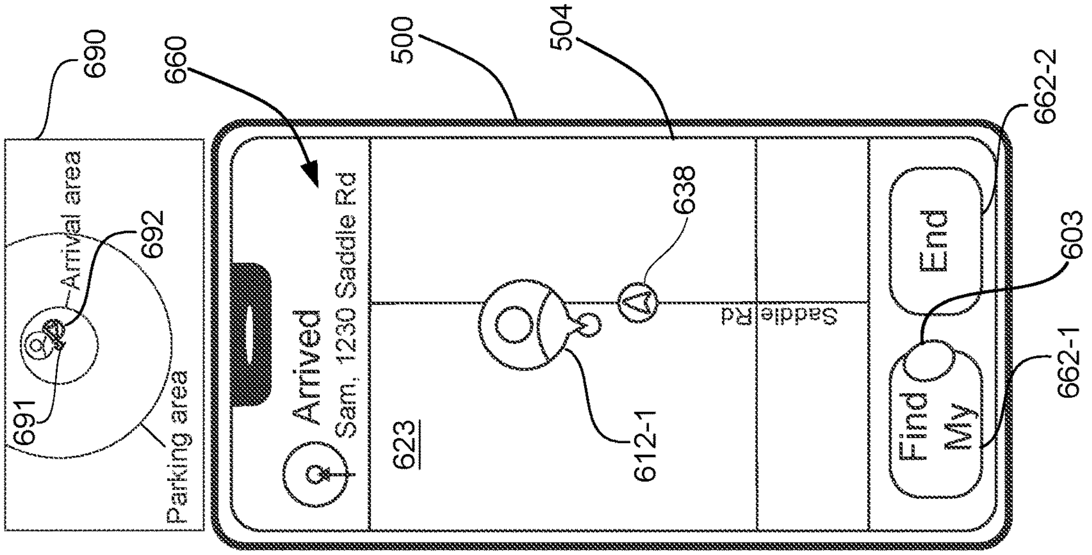
Figure 6A:
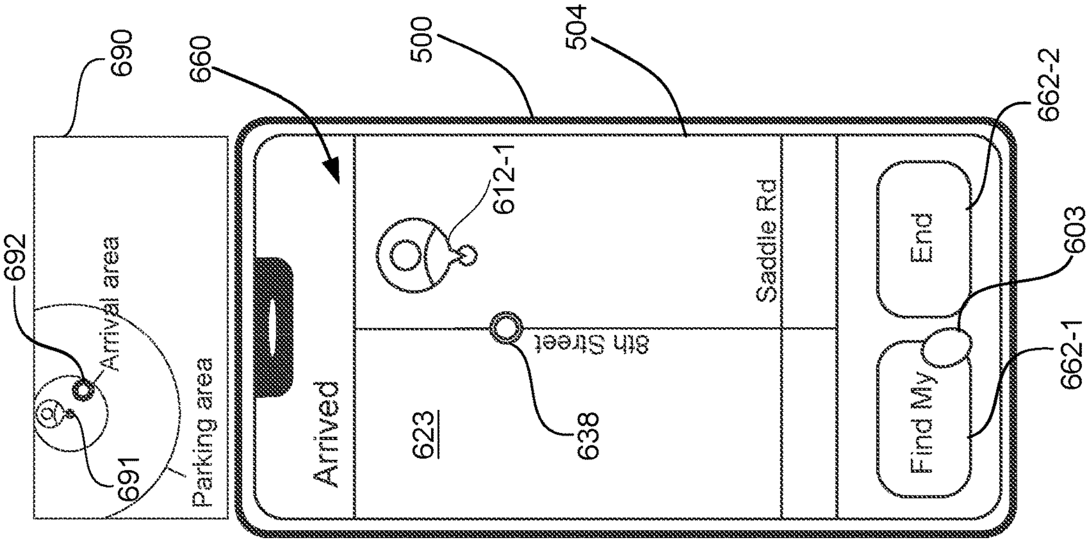
Figure 6B:
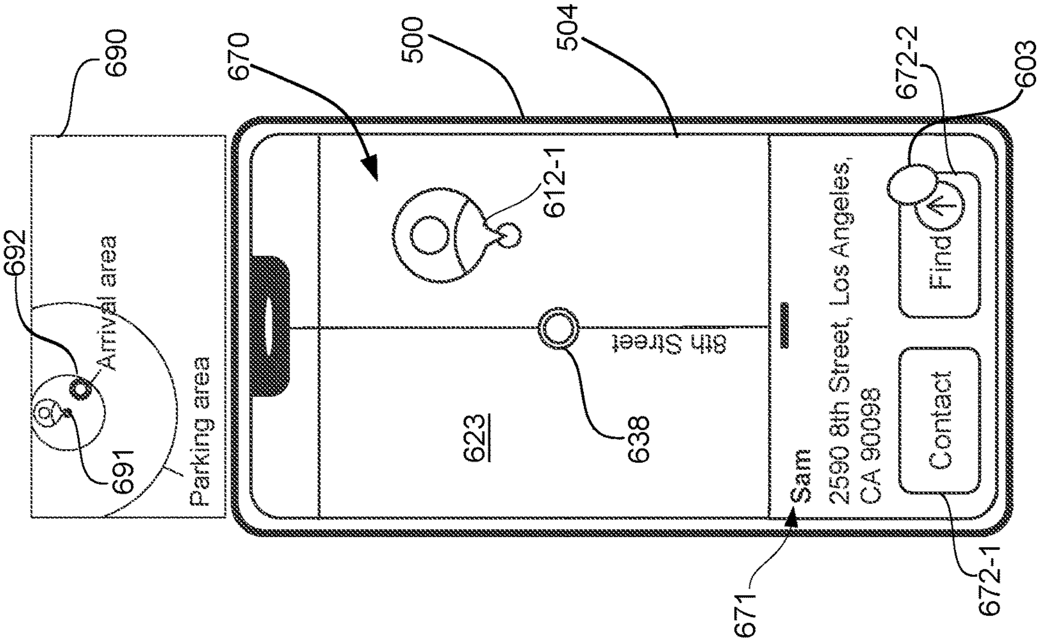
Figure 6C:
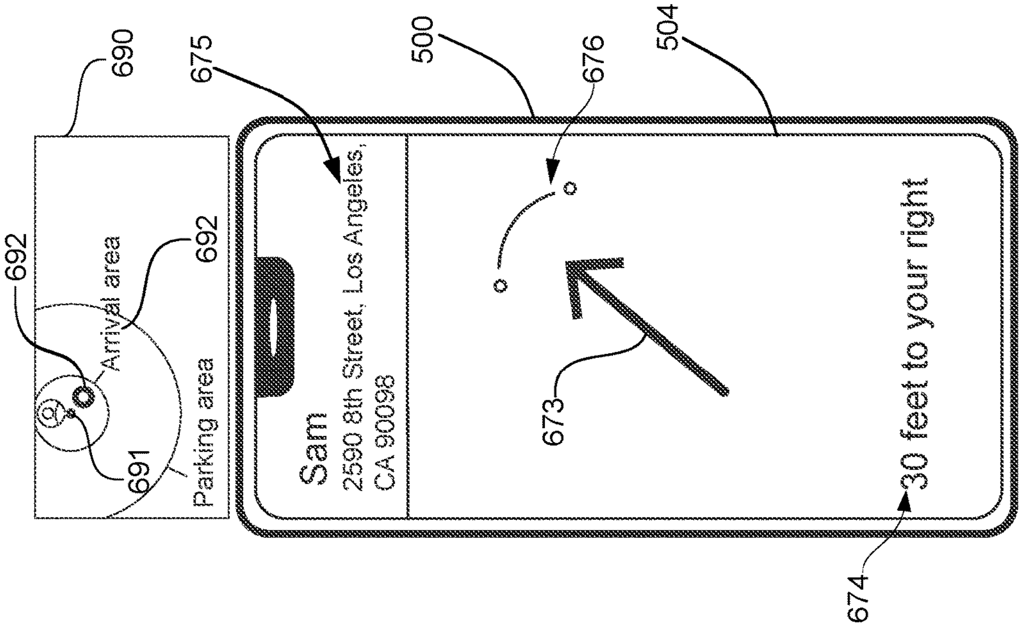
Figure 6D:
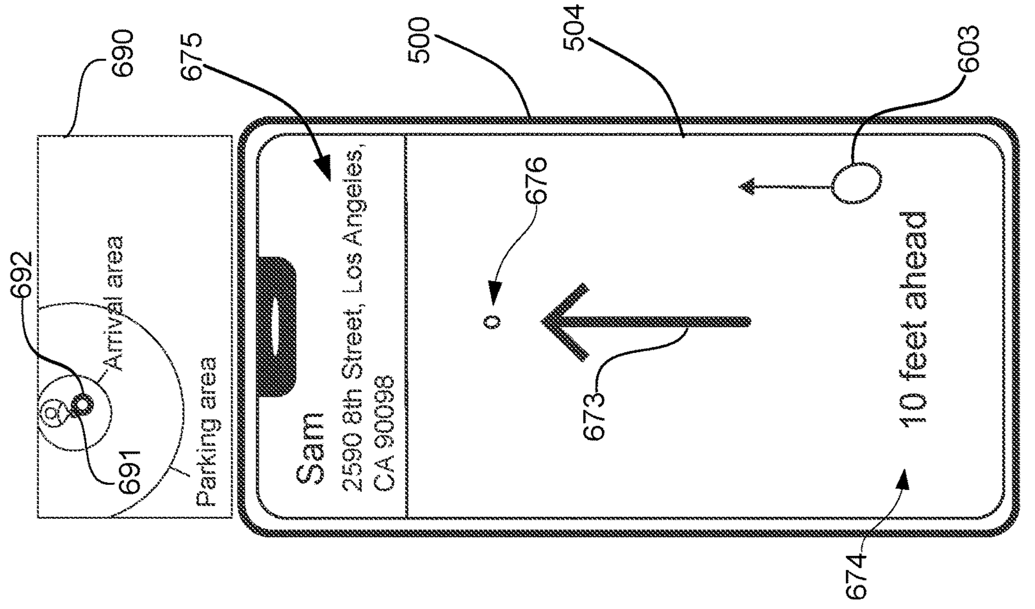
Figure 6E:
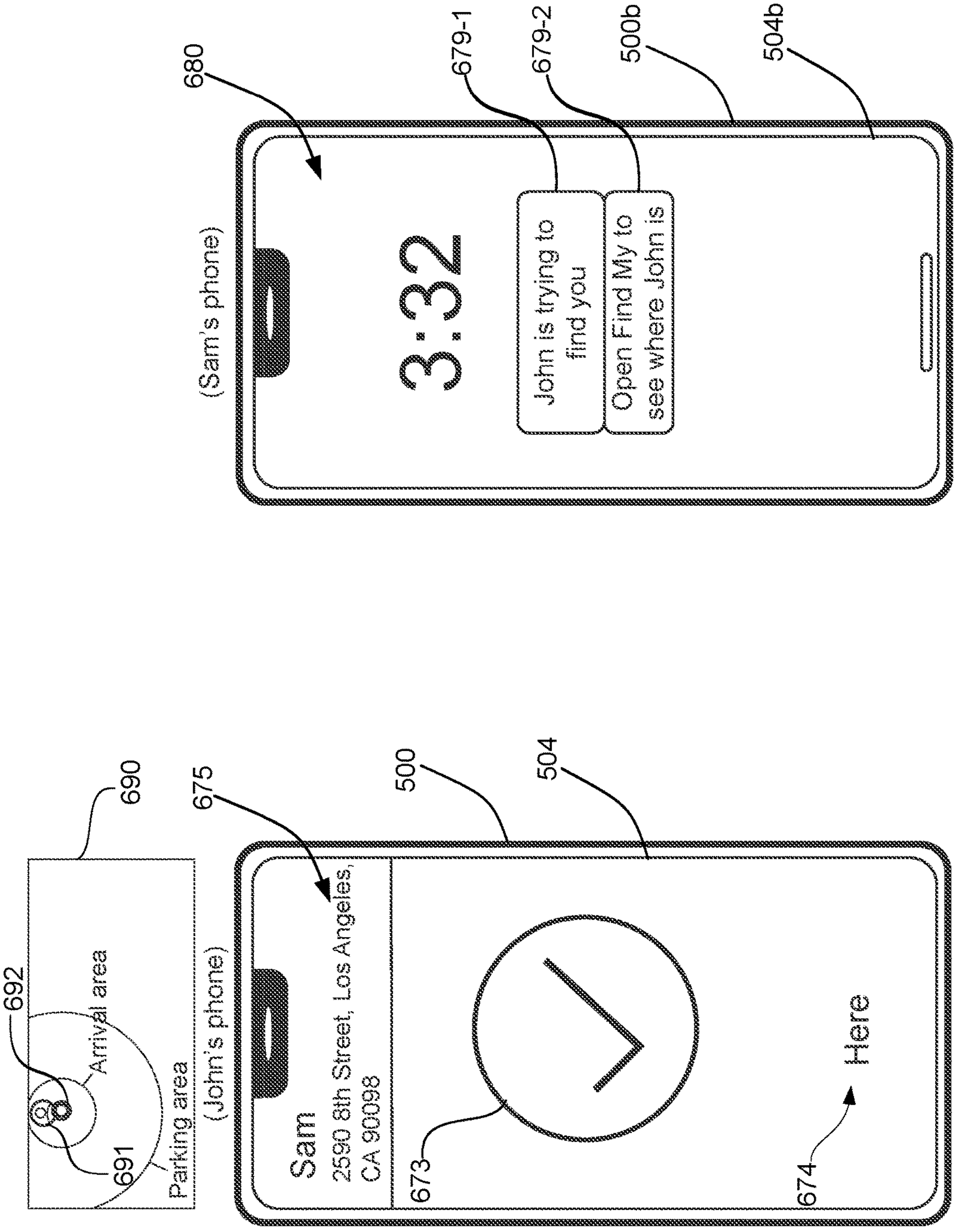
Figure 6F:
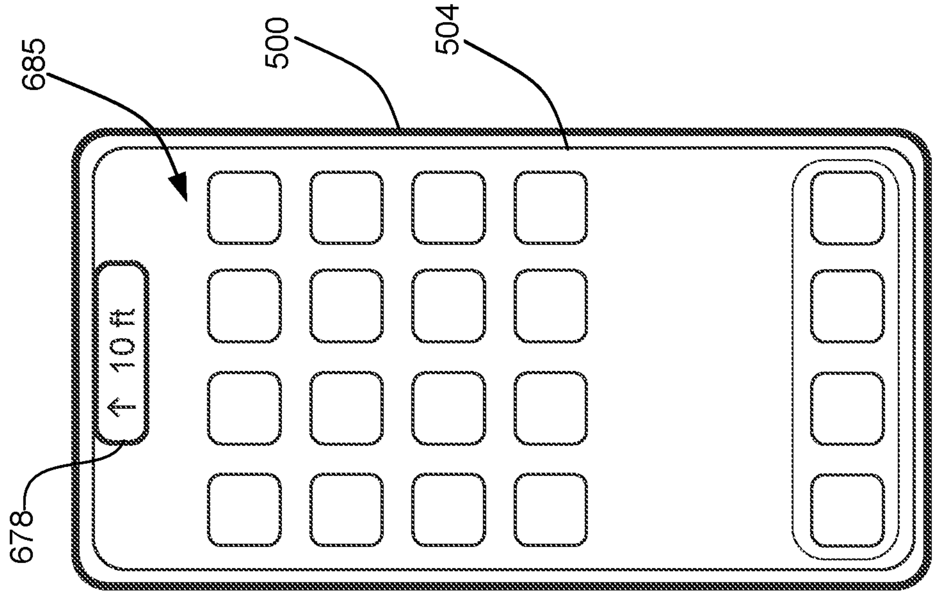
Figure 6G:
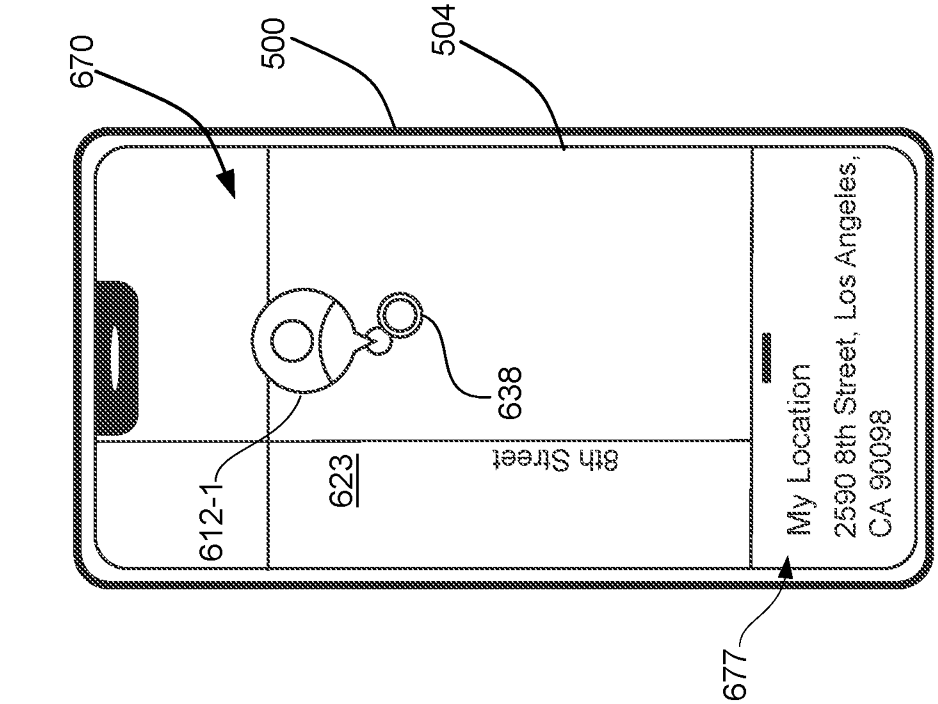
Figure 6H:
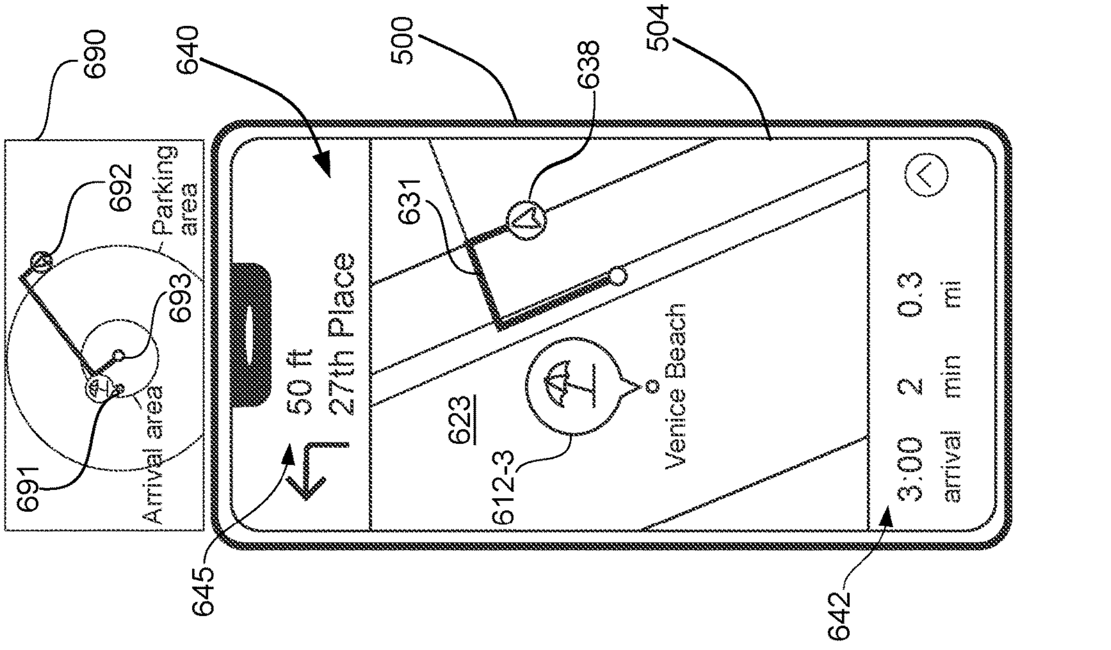
Figure 6I:
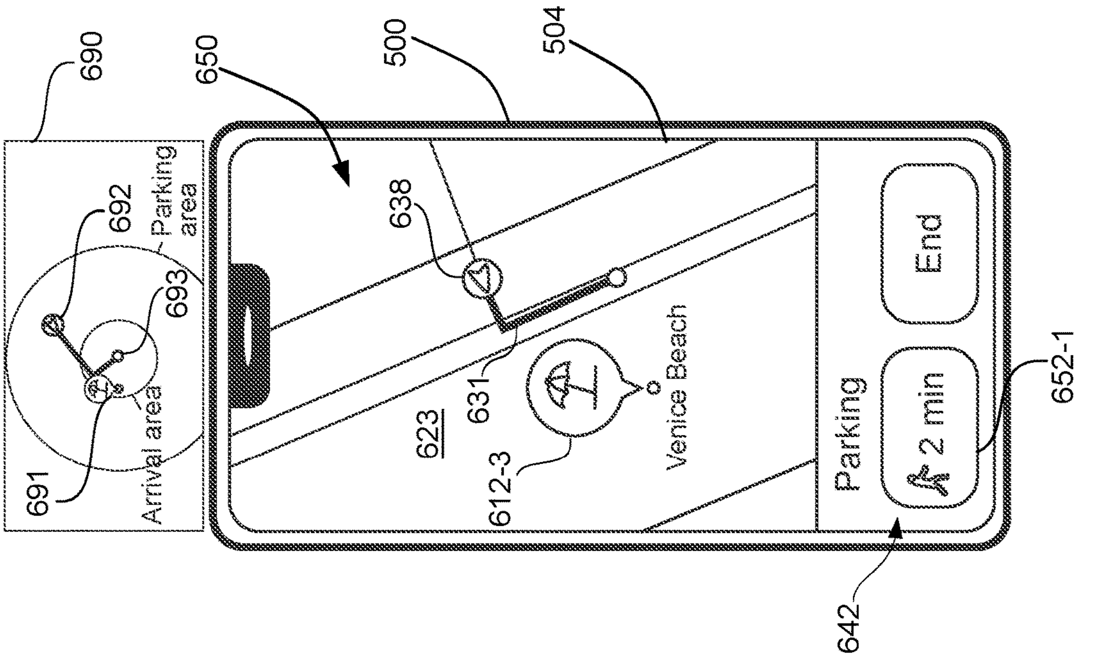
Figure 6J:
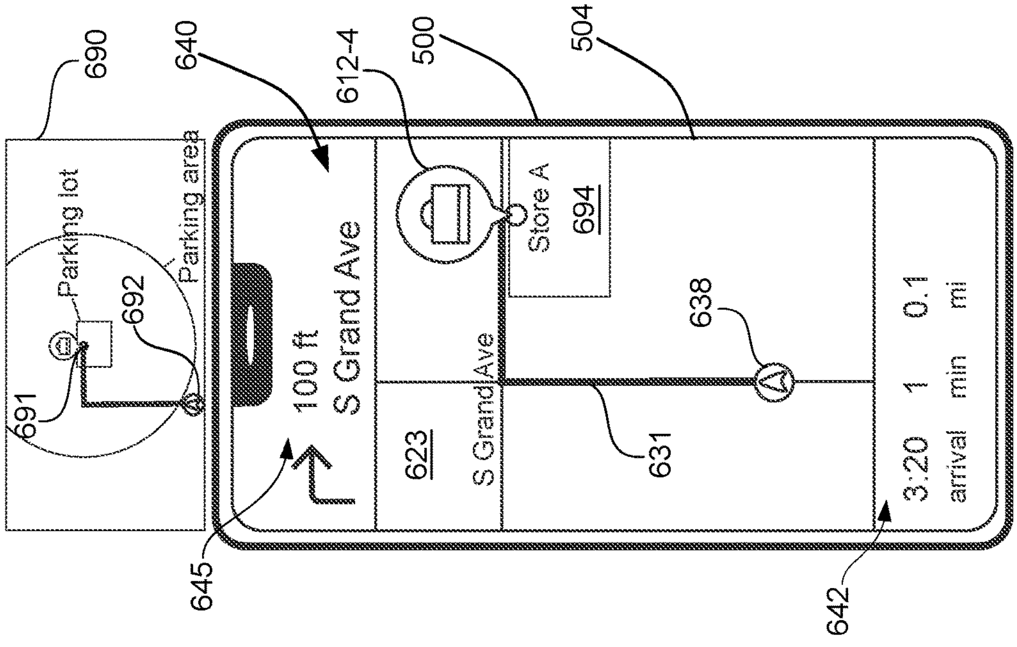
Figure 6K:
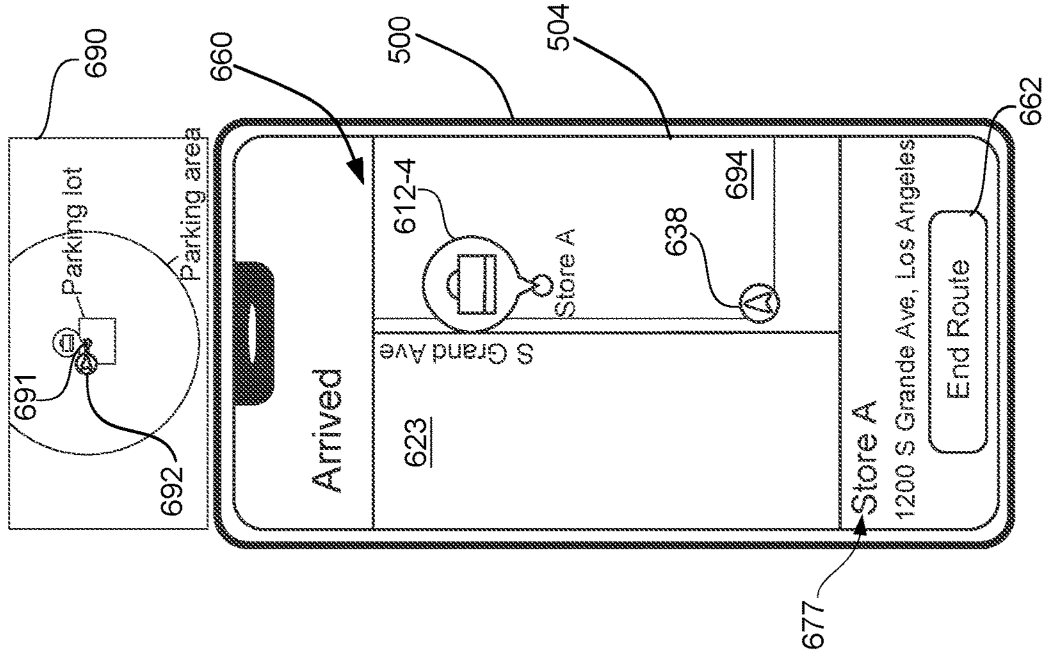

In FIG. 6Y, while navigating to the destination in accordance with the walking mode of transit, the electronic device 500 detects the location 692 of the electronic device 500 within the Arrival area as shown in the legend 690. Accordingly, in some embodiments, as similarly discussed above, the electronic device 500 displays the arrival user interface 660. In FIG. 6Y, while the arrival user interface 660 is displayed, the electronic device 500 detects a selection, via a tap of contact 603, directed to the first option 662-1 discussed previously above.

In some embodiments, when the electronic device 500 detects the selection of the first option 662-1 in the arrival user interface 660, the electronic device 500 determines that the location of the electronic device 500 is no longer within the Arrival area relative to the destination (e.g., the location of the second user). For example, before the electronic device 500 detects the selection of the first option 662-1 in FIG. 6Y, the location of the second user changes (e.g., the second user, and thus the second electronic device, moves from Saddle Road to 8$^{th}$ Street, as indicated on the map 623 in FIG. 6Z). Accordingly, as shown in FIG. 6Z, the location 692 of the electronic device 500 is updated to be within the Parking area, rather than the Arrival area, relative to the destination 691 as shown in the legend 690. In some embodiments, as shown in FIG. 6Z, because the location of the electronic device 500 is no longer within the Arrival area relative to the updated location of the second user, the electronic device 500 redisplays the user interface 602 of the maps application to enable the user of the electronic device 500 to initiate navigation to the updated location of the second user. For example, as shown in FIG. 6Z, the electronic device 500 displays the navigation region 634 discussed previously above. In some embodiments, because the location of the electronic device 500 is within the Parking area as shown in the legend 690, the navigation to the destination will be in accordance with the walking mode of transit, as indicated by the option 637-1.

In FIG. 6Z, while displaying the user interface 602, the electronic device 500 detects a selection, via a tap of contact 603, directed to the navigate option 635. In some embodiments, as similarly discussed above, in response to detecting the selection of the navigate option 635, the electronic device 500 initiates navigation to the destination in accordance with the walking mode of transit. For example, the electronic device 500 displays the navigation user interface 640 as similarly shown in FIG. 6X above.

In FIG. 6AA, while navigating to the destination in accordance with the walking mode of transit, the electronic device 500 detects the location 692 of the electronic device 500 within the Arrival area relative to the updated destination 691 as shown in the legend 690. In some embodiments, as previously discussed above, in response to detecting the location of the electronic device 500 within the Arrival area, the electronic device 500 displays the arrival user interface 660 discussed above. In FIG. 6AA, while displaying the arrival user interface 660, the electronic device 500 detects a selection, via a tap of contact 603, directed to the first option 662-1 in the arrival user interface 660.

In some embodiments, as shown in FIG. 6BB, in response to detecting the selection of the first option 662-1, the electronic device 500 displays a user interface 670 of the item locating application discussed previously above. As shown in FIG. 6BB, in some embodiments, the user interface 670 includes the representation of the map 623 of a physical region surrounding and/or including the location of the user (e.g., John) and/or the electronic device 500. In some embodiments, as similarly discussed above, the map 623 includes a visual indication 638 of the location of the user and/or the electronic device 500 and a representation 612-1 of the second user (e.g., because the user has access to the location of the second user). Additionally, in some embodiments, when the user interface 670 is displayed, the representation 612-1 of the second user is selected (e.g., automatically) by the electronic device 500 because the destination is the location of the second user, as discussed above. As shown in FIG. 6BB, because the representation 612-1 is selected, the user interface 670 also includes region 671 (e.g., a user interface) associated with the second user (e.g., Sam). In some embodiments, as shown in FIG. 6BB, the region 671 includes an indication of the current location of the second user (e.g., 2590 $8^{th}$ Street), a first option 672-1 and a second option 672-2. In some embodiments, the first option 672-1 is selectable to display contact information for the second user in a user interface of a phone calling application, as similarly discussed above. In some embodiments, the second option 672-2 is selectable to activate a proximity finding feature for locating the second user.

In FIG. 6BB, while the user interface 670 of the item locating application is displayed, the electronic device 500 detects a selection, via a tap of contact 603, directed to the second option 672-2. In some embodiments, in response to detecting the selection of the second option 672-2, the electronic device 500 activates the proximity finding feature for locating the second user (e.g., Sam). For example, as shown in FIG. 6CC, the electronic device 500 displays, via the touchscreen 504, a finding user interface 675. In some embodiments, as shown in FIG. 6CC, the finding user interface 675 includes an indication of the current location of the second user (e.g., Sam), as similarly discussed above, a heading indicator 676, an arrow indicator 673, and textual indication 674. In some embodiments, the heading indicator 676, the arrow indicator 673, and the textual indication 674 help guide the user of the electronic device 500 in locating the second user. For example, as shown in FIG. 6CC, the heading indicator 676 indicates a direction relative to the electronic device 500 in which the second electronic device associated with the second user (e.g., Sam) is located and the arrow indicator 673 indicates a direction in which the user of the electronic device 500 should travel (e.g., walk) to reach the second user. In some embodiments, the textual indication 674 indicates a distance and/or direction of the location of the second user relative to the electronic device 500 (e.g., "30 feet to your right").

Additionally or alternatively, in some embodiments, the textual indication 674 provides an indication to the user of the electronic device 500 of whether the second user (e.g., Sam) is located on a different floor or level relative to the user of the electronic device 500. For example, in FIG. 6CC, if the user of the electronic device 500 is located on a first floor (e.g., bottom floor or ground floor) of a building (e.g., office building, apartment building, house, etc.) and the second user is currently located on a second floor above or below the electronic device 500 (e.g., a second story, a basement, a garage, etc.), the textual indication 674 includes an indication that the second user is on a different story/level of the building (e.g., "The person you are finding may be on a different level"). In some embodiments, the electronic device 500 determines that the second user is located on a different floor or level relative to the user of the electronic device 500 based on the direction of the location of the second user relative to the electronic device 500 (e.g., a vertical direction).

Additionally or alternatively, in some embodiments, the textual indication 674 provides an indication to the user of the electronic device 500 of whether the second user (e.g., Sam) is currently moving relative to the user of the electronic device 500. For example, as similarly discussed above, if the electronic device 500 detects that the distance between the electronic device 500 and the location of the second user changes (e.g., due to the distance increasing or decreasing optionally without device 500 moving or without device 500 moving sufficiently to account for the change in distance) and/or that the direction of the location of the second user relative to the electronic device 500 changes (e.g., due to direction or orientation changing optionally without device 500 moving or without device 500 moving sufficiently to account for the change in direction or orientation), the electronic device 500 determines that the second user is moving relative to the electronic device 500 (e.g., independent of whether the location of the electronic device 500 is currently changing, such as due to the user of the electronic device 500 moving). In such an instance, the electronic device 500 optionally updates the textual indication 674 to include an indication that the location of the second user is changing relative to the current location of the electronic device 500 optionally independently of any movement of the electronic device 500 (e.g., "The person you are finding is moving around").

In some embodiments, as the distance between the location of the second user and the electronic device 500 and/or the direction of the location of the second user relative to the electronic device 500 changes, the electronic device 500 updates the finding user interface 675 accordingly. For example, in FIG. 6DD, the location of the second user is now directly ahead of the electronic device 500 and the distance between the electronic device 500 and the second electronic device associated with the second user has decreased. Accordingly, in some embodiments, as shown in FIG. 6DD, the electronic device 500 updates display of the heading indicator 676 and moves the heading indicator 676 in the finding user interface 675 to indicate that the direction of the location of the second user is ahead (e.g., in front of) the electronic device 500. Similarly, as shown in FIG. 6DD, the electronic device 500 optionally changes the orientation of the arrow indication 673 to point upward in the finding user interface 675 indicating that the user should walk straight ahead to reach the location of the second user and updates the textual indication 674 based on the updated distance and/or direction of the location of the second user relative to the electronic device 500 (e.g., "10 feet ahead").

In some embodiments, while the proximity finding feature is active at the electronic device 500, the display of the finding user interface 675 is able to be minimized on the touchscreen 504 without ending (e.g., deactivating) the proximity finding (e.g., to allow the user to interact with and/or view other user interfaces associated with other applications on the electronic device 500 without ending the proximity finding). For example, in FIG. 6DD, the electronic device 500 detects movement of contact 603 (e.g., an upward swipe of the contact 603) on the touchscreen 504 while the finding user interface 675 is displayed. In some embodiments, as shown in FIG. 6FF, in response to detecting the movement of the contact 603, the electronic device 500 minimizes display of the finding user interface 675. In some embodiments, minimizing display of the finding user interface 675 includes ceasing display of the finding user interface 675, as shown in FIG. 6FF, and displaying one or more user interface elements of the finding user interface 675 in a predetermined region of the touchscreen 504. For example, as shown in FIG. 6FF, the electronic device 500 ceases displaying the finding user interface 675 and displays home screen user interface 685 (e.g., corresponding to user interface 400 in FIG. 4A), and displays user interface object 678 that includes the arrow indication and textual indication of the finding user interface 675 discussed above. In some embodiments, as shown in FIG. 6FF, the predetermined region of the touchscreen 504 is a top center portion of the touchscreen 504, though other regions are possible.

In some embodiments, as shown in FIG. 6EE, in accordance with a determination that the location 692 of the electronic device 500 corresponds to the location of the second user (e.g., the user of the electronic device 500 has reached the destination 691) as shown in the legend 690, the electronic device 500 updates the finding user interface 675 to replace the arrow indicator 673 with a confirmation indicator (e.g., a checkmark) and updates the textual indication to indicate that the user (e.g., John) has reached the destination (e.g., "Here"). In some embodiments, the electronic device 500 determines that the user of the electronic device 500 has reached the location of the second user in accordance with a determination that the electronic device 500 is within a respective threshold distance (e.g., 1 foot, 2 feet, 3 feet, 4 feet, etc.) of the second electronic device 500*b* associated with the second user. In some embodiments, the respective threshold used to determine whether the electronic device 500 has reached a particular destination varies based on the destination type. For example, the respective threshold is different when the destination corresponds to a location of another user (e.g., such as the second user) or a business or residence than when the destination corresponds to a location of a companion device of the electronic device 500, such as a remote locator object (e.g., a dedicated tracker or location-transmitting device) or another electronic device associated with the user of the electronic device 500 (e.g., an electronic device associated with the same user account as the electronic device 500). In some embodiments, the respective threshold used to determine whether the electronic device 500 has reached a particular destination is larger in the case of the destination corresponding to a location of another user (e.g., such as the second user) or a business or residence than when the destination corresponds to a location of a companion device of the electronic device 500, such as a remote locator object (e.g., a dedicated tracker or location-transmitting device) or another electronic device associated with the user of the electronic device 500. In some embodiments, when the proximity finding feature discussed above is activated, the electronic device 500 transmits data to the second electronic device 500*b* associated with the second user (e.g., Sam) that the electronic device 500 is finding (e.g., tracking) the location of the second electronic device 500*b*. For example, as shown in FIG. 6EE, when the second electronic device 500*b* receives the data, the second electronic device 500*b* generates one or more notifications indicating that the user (e.g., John) is attempting to locate the second user (e.g., Sam). In some embodiments, as shown in FIG. 6EE, the second electronic device 500*b* displays, via touchscreen 504*b*, a first notification 679-1 and/or a second notification 679-2 on lock screen user interface 680 of the second electronic device 500*b* that notify the second user (e.g., Sam) that the user (e.g., John) is trying to find the second user and/or facilitates finding of the user via the item locating application discussed above on the second electronic device 500*b*.

In FIG. 6GG, after the user of the electronic device 500 arrives at the destination (e.g., locates the second user), the electronic device 500 deactivates the proximity finding feature discussed above. For example, the electronic device 500 ceases displaying the finding user interface 675 in response to detecting an input corresponding to a request to end the proximity finding and/or ceases displaying the finding user interface 675 automatically (e.g., after detecting the location of the electronic device 500 corresponds to the location of the second user). In some embodiments, as shown in FIG. 6GG, when the electronic device 500 deactivates the proximity finding feature, the electronic device 500 redisplays the user interface 670 of the item locating application discussed above. In some embodiments, as shown in FIG. 6GG, because the location of the electronic device 500 corresponds to the location of the second electronic device 500*b* associated with the second user, the visual indication 638 of the current location of the electronic device 500 is overlaid at least partially on the representation 612-1 of the second user on the map 623. Additionally, as shown in FIG. 6GG, the user interface 670 includes an indication 677 of the current location of the electronic device 500 (e.g., 2590 $8^{th}$ Street), which is optionally the same as the location of the second user as discussed above.

It should be understood that, in some embodiments, the above-described approach of navigating to the location of the second user is similarly applied for destinations corresponding to locations of other users (e.g., such as the third user Jane discussed above) and/or locations of businesses or other points of interest (e.g., restaurants, shopping malls, coffee shops, landmarks, hiking trailheads, movie theaters, etc.).

In some embodiments, a destination is associated with an arrival region. In some embodiments, the arrival region encompasses a portion of the route to the destination that requires the user of the electronic device 500 to change the mode of transit of the navigation to arrive at the destination. As an example, in FIG. 6HH, the electronic device 500 is navigating to a beach destination (e.g., Venice Beach) in accordance with a driving mode of transit. Accordingly, as shown in FIG. 6HH, the electronic device 500 is displaying the navigation user interface 640 discussed previously above that includes the visual navigation instructions (e.g., textual directions 645 and representation of the route 631) for navigating to the destination, represented by representation 612-3 (e.g., an icon including a graphic or image) corresponding to Venice Beach on the map 623. In some embodiments, in FIG. 6HH, the destination is associated with an arrival region, such as a beachfront, pier, or walking trail associated with Venice Beach. In some embodiments in which the destination is associated with an arrival region, the Parking area and Arrival area discussed previously above are determined relative to the arrival region rather than the destination. For example, as shown in the legend 690 in FIG. 6HH, the Parking area and the Arrival area are centered around arrival region entrance 693 (e.g., corresponding to an entrance/beginning of the beachfront, pier, or walking trail associated with Venice Beach) rather than the destination 691. As shown in FIG. 6HH, the location 692 of the electronic device 500 is optionally outside the Parking area as shown in the legend 690, so the electronic device 500 is displaying the navigation user interface 640 as discussed above.

In FIG. 6II, the electronic device 500 detects that the location of the electronic device 500 is within the Parking area. For example, as shown in the legend 690 in FIG. 6II, the location 692 of the electronic device 500 has reached the Parking area relative to the arrival region entrance 693. In some embodiments, as similarly discussed above, in response to detecting the location of the electronic device 500 within the Parking area, the electronic device 500 displays, via the touchscreen 504, the parking user interface 650 discussed previously above. Particularly, as shown in FIG. 6II, the electronic device 500 optionally displays the first option 652-1 that is selectable to initiate navigation to the arrival region associated with the destination in accordance with the walking mode of transit, as similarly discussed above.

In some embodiments, a destination is associated with a pre-arrival region. In some embodiments, the pre-arrival region corresponds to a known and/or designated parking region for the destination. As an example, in FIG. 6JJ, the electronic device 500 is navigating to a store destination (e.g., Store A) in accordance with a driving mode of transit. Accordingly, as shown in FIG. 6JJ, the electronic device 500 is displaying the navigation user interface 640 discussed previously above that includes the visual navigation instructions (e.g., textual directions 645 and representation of the route 631) for navigating to the destination, represented by representation 612-4 (e.g., an icon including a graphic or image) corresponding to Store A on the map 623. In some embodiments, in FIG. 6JJ, the destination is associated with a pre-arrival region, such as a parking region (e.g., a parking lot, a parking structure, a valet drop-off, etc.), represented by parking region 694 on the map 623. In some embodiments in which the destination is associated with a pre-arrival region, the Parking area discussed previously above is determined relative to the pre-arrival region rather than the destination, and without determining/establishing the Arrival area. For example, as shown in the legend 690 in FIG. 6JJ, the Parking area is centered around an entrance/starting point of Parking lot (e.g., corresponding to an entrance/beginning of the parking region 694 associated with Store A) rather than the destination 691. Additionally, as shown in the legend 690 in FIG. 6JJ, the electronic device 500 forgoes determining the Arrival area in accordance with the determination that the destination is associated with a pre-arrival region. As shown in FIG. 6JJ, the location 692 of the electronic device 500 is optionally outside the Parking area as shown in the legend 690, so the electronic device 500 is displaying the navigation user interface 640 as discussed above.

In FIG. 6KK, the electronic device 500 detects that the location of the electronic device 500 is within the parking region 694 of Store A. For example, as shown in the legend 690 in FIG. 6KK, the location 692 of the electronic device 500 has reached the Parking lot associated with the destination 691. In some embodiments, as shown in FIG. 6KK, in response to detecting the location of the electronic device 500 within the Parking lot, the electronic device 500 displays, via the touchscreen 504, the arrival user interface 660 discussed previously above. Particularly, as shown in FIG. 6KK, the electronic device 500 optionally displays an indication of an address associated with the destination (e.g., an address of Store A) and option 662 that is selectable to end the navigation to the destination, as similarly discussed above.

FIG. 7 is a flow diagram illustrating a method of facilitating navigation to a location of one or more second electronic devices based on location information of the one or more second electronic devices, in accordance with some embodiments of the disclosure, such as in FIGS. 6A-6KK. The method 700 is optionally performed at an electronic device such as device 100, device 300, device 500 as described above with reference to FIGS. 1A-1B, 2-3, 4A-4B and 5A-5H. Some operations in method 700 are, optionally combined and/or the order of some operations is, optionally, changed.

As described below, the method 700 provides ways to facilitate navigation to a location of a second electronic device based on location information of the second electronic device that is shared with a user of the electronic device. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., electronic device 500) in communication with a display generation component and one or more input devices (e.g., touch screen 504). For example, the electronic device is a mobile device (e.g., a tablet, a smartphone, a media player, or a wearable device) including wireless communication circuitry, or an automobile device optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, method 700 is performed at or by an automobile (e.g., at an infotainment system of an automobile having or in communication with one or more display generation components and/or input devices).

In some embodiments, while navigating to a first destination via a maps application (e.g., running on the electronic device), including displaying, via the display generation component, a user interface associated with the maps application (e.g., user interface 640 in FIG. 6S), the electronic device detects (702) a location of the electronic device within a first threshold distance (e.g., 0.15, 0.25, 0.3, 0.4, 0.5, 0.75, 1, 1.5, 2, or 5 miles) of the first destination (e.g., Parking area in legend 692), wherein the navigation to the first destination is in accordance with a first mode of transit (e.g., driving in a vehicle that is in communication with the electronic device), such as detecting the location 692 of the electronic device 500 within the Parking area as shown in the legend 690 in FIG. 6T. In some embodiments, the first destination corresponds to a location of a physical place or business (e.g., a restaurant, grocery store, shopping center, clothing store, theater, coffee shop, barber shop, hair salon, etc.). In some embodiments, the first destination corresponds to a location of a second user, different from a user of the electronic device. For example, the first destination corresponds to a current location of a second electronic device that is associated with (e.g., owned and/or operated by) the second user. In some embodiments, the current location of the second user is shared with the user of the electronic device (e.g., the second electronic device transmits location data (e.g., directly or indirectly via a server (e.g., a wireless communications terminal) in communication with the second electronic device) of the second electronic device to the electronic device, such that the location of the second user is accessible by the user of the electronic device). In some embodiments, the first destination corresponds to a location that is associated with the second user, such as a home address, work address, or other address at which the second user is currently located. In some embodiments, as discussed in more detail below, the electronic device navigates to the first destination in response to user input detected by the electronic device (e.g., via the one or more input devices) in the maps application (e.g., in a user interface of the maps application). In some embodiments, navigating to the first destination includes displaying visual instructions in a user interface of the maps application for guiding the user to the first destination in accordance with the first mode of transit. For example, while navigating to the first destination, the user interface of the maps application includes textual instructions (e.g., "turn left" or "turn right in 500 feet") overlaid on a visual representation of a portion of a current route to the first destination relative to the current location of the electronic device (e.g., which includes a map corresponding to portions of the physical environment surrounding the current location of the electronic device and a heading user interface element (e.g., an arrow) that corresponds to the current location of the electronic device on the route), and is optionally presented with audio corresponding to the navigation instructions (e.g., audio outputted using a voice of a virtual assistant associated with an operating system of the electronic device). In some embodiments, the visual navigation instructions and the visual representation of the portion of the current route to the first destination update dynamically in response to changes in distance between the current location of the electronic device and the first destination during the navigation. Additionally, in some embodiments, if the selected mode of transit changes (e.g., in response to receiving user input to change the mode of transit for the current navigation), the visual navigation instructions change (e.g., in appearance and/or include alternative information) based on the updated mode of transit, as similarly discussed herein later. In some embodiments the user interface of the maps application includes one or more indications of an estimated time of arrival (ETA) at the first destination from the current location of the electronic device, an amount of time remaining until the arrival at the first destination (e.g., 5 minutes, 20 minutes, 1 hour, etc.), and/or a distance between the current location of the electronic device and the first destination (e.g., 0.5 miles, 1.2 miles, etc.). In some embodiments, the display generation component is integrated with the electronic device (e.g., is a touch screen or other integrated display of the electronic device). In some embodiments, the display generation component is integrated with the vehicle in which the user of the electronic device is riding (e.g., driving or riding as a passenger). In some embodiments, the first mode of transit includes public transit, such as bus transit or train transit. In some embodiments, the first mode of transit includes cycling or scooter-based transit.

In some embodiments, while the location of the electronic device is within the first threshold distance of the first destination, the electronic device detects (704) an indication that a user of the electronic device is no longer utilizing the first mode of transit to the first destination, such as the indication that the user of the electronic device 500 has parked the user's vehicle, as described with reference to FIG. 6W. For example, if the first mode of transit corresponds to driving and/or riding in a vehicle, detecting the indication that the user of the electronic device is no longer utilizing the first mode of transit to the first destination includes detecting that the vehicle has parked and/or detecting that the electronic device has exited the vehicle. In some embodiments, the electronic device detects that the vehicle in which the user is riding (e.g., driving or riding as a passenger) has parked by detecting a disconnection between the vehicle and the electronic device. For example, as mentioned above, while navigating to the first destination, the electronic device is in communication with the vehicle (e.g., wireless connection, such as via Bluetooth or Wi-Fi, or a wired connection). Accordingly, detecting that the user of the electronic device is no longer utilizing the first mode of transit to the first destination includes detecting that the electronic device is no longer in communication with the vehicle. In some embodiments, the electronic device detects the indication that the user of the electronic device is no longer utilizing the first mode of transit to the first destination based on a speed of motion/movement of the electronic device. For example, the electronic device determines that the user has parked the vehicle and/or that the user is no longer riding in the vehicle (e.g., or bus or train or bicycle) in response to detecting that the electronic device is no longer moving and/or is moving below a speed threshold (e.g., 0.1 miles per hour, 0.5 mph, 1 mph, 3 mph, or 10 mph), optionally for a threshold amount of time (e.g., 1, 2, 5, 10, 15, 30, 60, 120, 180, 240, etc. seconds). In some embodiments, detecting the indication that the user of the electronic device is no longer utilizing the first mode of transit to the first destination is based on the current location of the electronic device. For example, the electronic device determines that the user has parked the vehicle (e.g., in part) by determining that the current location of the electronic device corresponds to a parking lot, a parking structure, a parking garage, or other dedicated parking area and optionally that the electronic device is moving at a speed less than the speed threshold above. As another example, the electronic device determines that the user is no longer riding in a vehicle (or on a bus or a train) by determining that the current location of the electronic device corresponds to a sidewalk, a bus stop, a train platform, etc. In some embodiments, detecting the indication includes detecting input provided by the user of the electronic device that indicates the user is no longer navigating to the first destination in accordance with the first mode of transit. For example, the user interface associated with the maps application includes one or more selectable options for (e.g., manually) indicating an end (e.g., or a transition away from) navigating to the first destination by vehicle (or bus, train, bicycle, etc.).

In some embodiments, in response to detecting the indication (706), in accordance with a determination that the indication is detected while the location of the electronic device is outside a second threshold distance (e.g., 50, 75, 100, 125, 150, 200, 250, 275, 300, 400, etc. feet), less than the first threshold distance (e.g., but still within the first threshold distance), from the first destination, (e.g., automatically (e.g., without user input)) the electronic device displays (708), via the display generation component, a first option (e.g., first option 662-1 in parking user interface 650 as shown in FIG. 6W) in the user interface that is selectable to initiate navigation to the first destination via the maps application in accordance with a second mode of transit (e.g., walking mode of transit), different from the first mode of transit. For example, while the current location of the electronic device is within the first threshold distance from the first destination, if the electronic device detects the indication discussed above (e.g., the user has parked their vehicle or is no longer riding in the vehicle) while the electronic device is also outside the second threshold distance from the first destination, the electronic device displays a user interface for transitioning to navigating to the first destination by way of the second mode of transit (e.g., in place of or as an update to the user interface of the maps application discussed above). In some embodiments, the user interface includes the first option discussed above. In some embodiments, in response to detecting selection of the first option, the electronic device updates the user interface of the maps application such that the visual navigation instructions are specific to the second mode of transit (e.g., the electronic device provides walking instructions to the user that guide the user to the first destination along sidewalks and crosswalks), as discussed in more detail below. In some embodiments, the user interface for transitioning to navigating to the first destination by way of the second mode of transit includes a second option that is selectable to end (e.g., exit) the navigation to the first destination. For example, in response to detecting selection of the second option, the electronic device ceases displaying the visual instructions for guiding the user to the first destination and the visual representation of the current route to the first destination in the user interface of the maps application.

In some embodiments, in accordance with a determination that the indication is detected while the location of the electronic device is within the second threshold distance from the first destination, the electronic device displays (710), via the display generation component, an arrival user interface associated with the maps application for the first destination (e.g., and without displaying the first option that is selectable to initiate navigation to the first destination via the maps application in accordance with the second mode of transit), such as arrival user interface 660 as shown in FIG. 6Y. For example, if the electronic device detects that the user has parked the vehicle and/or that the user is no longer riding in the vehicle (e.g., or on the bus or train) while the current location of the electronic device is within the second threshold distance discussed above from the first destination, the electronic device displays an arrival user interface in the maps application. In some embodiments, the arrival user interface includes a selectable option that is selectable to end (e.g., exit) the navigation to the first destination as similarly discussed above. In some embodiments, the arrival user interface includes an indication of a distance between the current location of the electronic device and the first destination and/or an indication of where the first destination is located relative to the current location of the electronic device (e.g., on a map of the maps application and/or on a visual representation of the current route to the first destination). Displaying an option that is selectable to transition to navigating to a destination in accordance with a second mode of transit in response to detecting that the electronic device is no longer utilizing a first mode of transit to the destination while a current location of the electronic device is within a threshold distance from the destination reduces the number of inputs needed to utilize the second mode of transit to navigate to the destination and/or enables the mode of transit to be changed automatically, thereby improving user-device interaction.

In some embodiments, in response to (and/or optionally while) detecting the location of the electronic device within the first threshold distance (e.g., 0.15, 0.25, 0.3, 0.4, 0.5, 0.75, 1, 1.5, 2, or 5 miles) of the first destination, the electronic device displays, via the display generation component, a user interface for changing a mode of transit for the navigation to the first destination, such as parking user interface 650 in FIG. 6W. For example, as similarly discussed above, the electronic device displays a "parking" or "parked" user interface that enables the user of the electronic device to transition from navigating to the first destination via the first mode of transit (e.g., driving, carpooling, train, cycling, etc.) to navigating via the second mode of transit (e.g., walking). In some embodiments, as discussed below, the user interface includes a selectable option that is selectable to change the mode of transit from the first mode to the second mode. In some embodiments, the user interface also includes an option for terminating/ceasing navigation to the first destination (e.g., irrespective of a current mode of transit). For example, if the electronic device detects a selection of the option for terminating the navigation, the electronic device ceases displaying the user interface for changing the mode of transit for the navigation to the first destination and redisplays the user interface associated with the maps application discussed above. In some such embodiments, because the navigation has ended, the user interface associated with the maps application no longer includes the user interface elements for guiding the user to the first destination discussed previously above. In some embodiments, the electronic device maintains display of the user interface for changing the mode of transit while the location of the electronic device remains within the first threshold distance of the first destination and outside the second threshold distance discussed above of the first destination. For example, as similarly discussed above, if the electronic device detects that the user has parked (e.g., or is otherwise no longer driving or riding as a passenger), but the location of the electronic device is outside the second threshold distance of the first destination, the electronic device maintains display of the user interface for changing he mode of transit for the navigation to the first destination (e.g., but updates a heading within the user interface from "Parking" to "Parked"). Displaying a user interface for transitioning to navigating to a destination in accordance with a second mode of transit in response to detecting that the electronic device is within a first threshold distance of the destination reduces the number of inputs needed to utilize the second mode of transit to navigate to the destination and/or enables the mode of transit to be changed automatically, thereby improving user-device interaction.

In some embodiments, the user interface for changing the mode of transit for the navigation to the first destination includes a selectable option that is selectable to change the mode of transit from the first mode of transit to the second mode of transit (e.g., as similarly discussed above), such as first option 662-1 in the parking user interface 650 as shown in FIG. 6W. In some embodiments, selecting the selectable option causes the electronic device to navigate to the first destination via the second mode of transit (e.g., walking). In some embodiments, navigating to the first destination via the second mode of transit includes displaying visual instructions in the user interface of the maps application for guiding the user to the first destination in accordance with the second mode of transit. For example, while navigating to the first destination, the user interface of the maps application includes textual instructions (e.g., "turn left" or "turn right in 25 feet") overlaid on the visual representation of a portion of a current route to the first destination relative to the current location of the electronic device (e.g., which includes the map corresponding to portions of the physical environment surrounding the current location of the electronic device and a heading user interface element (e.g., an arrow) that corresponds to the current location of the electronic device on the route), and is optionally presented with audio corresponding to the navigation instructions (e.g., audio outputted using a voice of a virtual assistant associated with an operating system of the electronic device). In some embodiments, the visual navigation instructions and the visual representation of the portion of the current route to the first destination update dynamically in response to changes in distance between the current location of the electronic device and the first destination during the navigation, as similarly discussed above. In some embodiments the user interface of the maps application includes one or more indications of an estimated time of arrival (ETA) at the first destination from the current location of the electronic device based on the second mode of transit (e.g., how fast the user is walking and/or based on an average walking speed of the user and/or other users), an amount of time remaining until the arrival at the first destination (e.g., 1 minute, 2 minutes, 5 minutes, etc.), and/or a distance between the current location of the electronic device and the first destination (e.g., 100 feet, 0.2 miles, 0.5 miles, etc.). In some embodiments, the electronic device initiates navigation to the first destination via the second mode of transit (e.g., walking) in accordance with a determination that the first destination is at least a minimum distance (e.g., 10, 15, 30, 50, 100 feet) from the current location of the electronic device. In some embodiments, the electronic device initiates navigation to the first destination via the second mode of transit in accordance with a determination that the location of the first destination is a known/recognized location and/or is able to be travelled to via the second mode of transit (e.g., above a threshold confidence, such as 80, 85, 90, etc. percent). In some embodiments, the electronic device displays the selectable option in the user interface of the maps application in accordance with a determination that the current location of the electronic device is outside the second threshold distance of the first destination. Displaying an option in a user interface that is selectable to transition to navigating to a destination in accordance with a second mode of transit in response to detecting that the electronic device is within a first threshold distance of the destination while the electronic device is navigating in accordance with a first mode of transit reduces the number of inputs needed to utilize the second mode of transit to navigate to the destination and/or enables the mode of transit to be changed automatically, thereby improving user-device interaction.

In some embodiments, before navigating to the first destination via the maps application (e.g., running on the electronic device), and while displaying the user interface associated with the maps application, the electronic device receives, via the one or more input devices, a sequence of one or more inputs directed to the user interface associated with the maps application corresponding to a request to navigate to the first destination, such as selection via contact 603 directed to representation 612-1 on map 623 of user interface 602 as shown in FIG. 6B. For example, as discussed below, the electronic device receives a sequence of one or more inputs directed to the user interface of the maps application that causes the electronic device to navigate to the first destination via the first mode of transit. For example, the sequence of one or more inputs includes an input provided by the user designating the first destination as the destination for the navigation, such as searching (e.g., via text inputted into a search field of the user interface) for an address associated with the first destination, a name associated with the first destination, a type (e.g., location type, such as a restaurant, shopping mall, movie theater, coffee shop, etc.) of the first destination, etc. In some embodiments, the sequence of one or more inputs includes an input selecting an option to initiate navigation to the first destination (e.g., after the first destination is designated as the destination for the navigation). For example, as discussed below, the option is displayed in a page or virtual card that is associated with the first destination. In some embodiments, the sequence of one or more inputs includes an input designating the first mode of transit as the mode of transit for navigation to the first destination. For example, the first mode of transit is selected from a list of mode of transits within the page or virtual card that is associated with the first destination.

In some embodiments, in response to receiving the sequence of one or more inputs, the electronic device initiates a process to navigate to the first destination via the maps application (e.g., as similarly discussed above), such as displaying the navigation user interface 640 as shown in FIG. 6L. Initiating navigation to a destination via a user interface of a maps application running on an electronic device in accordance with a first mode of transit, where during the navigation, the electronic device displays an option that is selectable to transition to navigating to the destination in accordance with a second mode of transit in response to detecting that the electronic device is within a first threshold distance of the destination, reduces the number of total inputs needed to navigate to the destination via different modes of transit and/or enables the mode of transit to be changed automatically after navigation has already begun, thereby improving user-device interaction.

In some embodiments, the first destination corresponds to a location of a second electronic device, different from the electronic device, that is associated with a second user, different from a user of the electronic device (e.g., as similarly discussed above), such as second user Sam as indicated in the user interface 602 as shown in FIG. 6C. In some embodiments, if the electronic device does not have access to the location of the second electronic device (e.g., because the second user has not granted authorization to the user of the electronic device to access the location of the second electronic device), the first destination is not necessarily the location of the second electronic device. For example, the first destination is a home address or work address (or other address) associated with the second user and the second electronic device is or is not located at such an address. Initiating navigation to a location of another user via a user interface of a maps application running on an electronic device in accordance with a first mode of transit, where during the navigation, the electronic device displays an option that is selectable to transition to navigating to the location of the other user in accordance with a second mode of transit in response to detecting that the electronic device is within a first threshold distance of the location, reduces the number of total inputs needed to navigate to the location of the other user via different modes of transit and/or enables the mode of transit to be changed automatically after navigation has already begun, thereby improving user-device interaction.

In some embodiments, the sequence of one or more inputs directed to the user interface associated with the maps application includes respective input directed to a user interface for the second user (e.g., a virtual contact card for the second user that is a user interface of the maps application), such as region 614 associated with the second user Sam as shown in FIG. 6D. In some embodiments, as similarly discussed above, the user interface for the second user includes an option that is selectable to navigate to the location associated with the second user (e.g., the current location of the second user (e.g., the current location of the second electronic device), an address associated with the second user (e.g., a home address, a work address, etc. that is saved to/stored by the electronic device, etc. In some embodiments, the user interface for the second user includes information corresponding to the second user, as discussed in more detail below. For example, the user interface for the second user includes an indication of a current location of the second user (e.g., current location of the second electronic device), a name of the second user, one or more addresses associated with the second user (e.g., home or work address), contact information for the second user (e.g., one or more telephone numbers for the second user, such as cellphone or home phone numbers, an email address of the second user, etc.), etc. In some embodiments, the user interface for the second user is displayed in response to detecting selection of a representation of a location of the second user (e.g., a location of the second electronic device that is owned by the second user) that is displayed overlaid on the map in the user interface of the maps application. For example, the representation of the location of the second user is displayed on a location of the map that corresponds to a current location of the second user (e.g., the second electronic device) in the physical environment represented by the map. In some embodiments, as similarly discussed above, the user interface for the second user is displayed in response to receiving a query in a search field of the user interface of the maps application. For example, the electronic device detects selection of one or more keys of a keyboard (e.g., a virtual keyboard displayed overlaid on the user interface of the maps application that is a system keyboard of the electronic device or a physical keyboard that is in communication with the electronic device) for inputting text into the search field that includes an address of the second user, a name of the second user, a number (e.g., phone number) of the second user, etc. In some embodiments, the user interface for the second user is displayed in response to detecting a selection of a suggestion element associated with the second user that is displayed in the user interface of the maps application. For example, the electronic device displays the suggestion element associated with the second user based on recent user activity, such as the user of the electronic device recently (e.g., within a threshold amount of time, such as 15 minutes, 30 minutes, 1 hour, 2 hours, 6 hours, 1 day, 3 days, etc.) communicating with the second user (e.g., via text messaging, email, phone call, etc.), the second user recently sharing their location (e.g., location information corresponding to the second electronic device) with the user of the electronic device (e.g., via an item locating application, discussed in more detail below), generation of a calendar event that includes the second user, among other possibilities. Initiating navigation to a location of another user via a user interface for the user in accordance with a first mode of transit, where during the navigation, the electronic device displays an option that is selectable to transition to navigating to the location of the other user in accordance with a second mode of transit in response to detecting that the electronic device is within a first threshold distance of the location, reduces the number of total inputs needed to navigate to the location of the other user via different modes of transit and/or enables the mode of transit to be changed automatically after navigation has already begun, thereby improving user-device interaction.

In some embodiments, the user interface for the second user includes, in accordance with a determination that the user of the electronic device has access to the location of the second electronic device that is associated with the second user, a second option that is selectable to display a user interface of an item locating application, such as second option 613-2 as shown in FIG. 6C. For example, the second user who owns the second electronic device has previously (e.g., prior to displaying the user interface for the second user at the electronic device) granted the user of the electronic device access to the location of the second electronic device. Accordingly, in some embodiments, the location of the second electronic device is viewable by the electronic device (e.g., via an item locating application running on the electronic device, as discussed in more detail later). In some embodiments, the second electronic device transmits location data of the second electronic device to the electronic device wirelessly, such as over Bluetooth, RF, IR, NFC, or Wi-Fi (e.g., directly or indirectly using a server in communication with the electronic device and the second electronic device). In some embodiments, selection of the second option causes the electronic device to automatically launch and display the user interface of the item locating application (e.g., and cease display of the user interface of the maps application). In some embodiments, the item locating application is an application that displays one or more representations of one or more findable items and/or users (e.g., including the second user) along with indications of the locations of the one or more findable items and/or users. In some embodiments, the user opens the item locating application to view locations of one or more users, such as the second user, of whom the user has gained access to via invitation and/or request. In some embodiments, the user selects one or more of the items or users to locate, and in response, the item locating application optionally displays to the user an indication of the location of the selected one or more items or users (e.g., on a map). In some embodiments, in response to detecting selection of the second option, the electronic device initiates a process to locate/find the location of the second electronic device. For example, the electronic device selects/highlights the representation of the second user on the map and displays an indication of a current location of the second electronic device, as discussed below.

In some embodiments, the electronic device displays an indication of a current location of the second electronic device that is associated with the second user, such as indication of the location of the second user Sam as shown in the region 614 in FIG. 6C. For example, the user interface for the second user includes a textual indication of the current location of the second electronic device, such as a current address the second electronic device is located at. In some embodiments, the indication of the current location of the second electronic device includes a distance indication (100 feet, 1 mile, 5 miles, 20 miles, etc.) that indicate the distance the second electronic device is from the electronic device. This distance indication is optionally accompanied by a time indication (e.g., Now, 2 seconds ago, 1 minute ago, 1 hour ago, or 5 hours ago) that indicates when the distance indication was last updated. For instance, the user interface for the second user optionally indicates the distance the second electronic device is from the electronic device and/or the user along with a time indication indicating how long it has been since this distance was updated. Displaying an option that is selectable to display a user interface of an item locating application in a user interface for another user if the electronic device has access to the location of the other user provides a visual reminder for the user that the user has access to the location of the other user and/or reduces the number of inputs needed to locate the user via the item locating application, thereby improving user-device interaction.

In some embodiments, the user interface for the second user includes, in accordance with a determination that the user of the electronic device does not have access to the location of the second electronic device that is associated with the second user, a third option that is selectable to initiate a process to request access to the location of the second electronic device from the second user, such as option 619-2 as shown in FIG. 6H. For example, the second user who owns the second electronic device has previously (e.g., prior to displaying the user interface for the second user at the electronic device) not granted the user of the electronic device access to the location of the second electronic device. Accordingly, in some embodiments, the location of the second electronic device is not viewable by the electronic device (e.g., via an item locating application running on the electronic device, as discussed in more detail later). In some embodiments, if the electronic device detects selection of the third option, the electronic device initiates a process to transmit the request to the second user. In some embodiments, the electronic device transmits the request via a messaging application (e.g., in a form of a text message, an email, or other message) running on the electronic device (e.g., different from the maps application). For example, the request is transmitted as a message bubble in a text message conversation with the second user at the electronic device. Additionally, in some embodiments, because the user of the electronic device does not have access to the location of the second electronic device that is associated with the user, the user interface for the second user does not include the indication of a current location of the second electronic device that is associated with the second user discussed above. In some embodiments, if the request to access the location of the second electronic device is granted by the user, the location of the second electronic device becomes viewable by the electronic device such that when the user interface for the second user is redisplayed, the user interface is updated to include the second option discussed above and the indication of the current location of the second electronic device. Displaying an option that is selectable to request access to a location of another user at an electronic device if the electronic device does not have access to the location of the other user provides a visual indication for the user that the user does not have access to the location of the other user and/or reduces the number of inputs needed to request access to the location of the other user for locating the user via an item locating application, thereby improving user-device interaction.

In some embodiments, the user interface for the second user includes an indication of a current location of the second electronic device that is associated with the second user (e.g., as similarly discussed above), such as indication 615-1 of the location of the second user Sam as shown in FIG. 6D, information indicating one or more addresses associated with the second user, such as information in selectable indications 615-2 and 615-4 indicating a home address and a work address of the second user Sam as shown in FIG. 6D. For example, the one or more addresses are (optionally) different from the current location of the second electronic device that is associated with the second user. In some embodiments, the one or more addresses include a home address for the second user, a work address for the second user, among other possibilities. In some embodiments, the second user is located at one of the one or more addresses when the input for initiating navigation to the location of the second user is detected (e.g., as indicated by the indication discussed above). In some embodiments, the information indicating the one or more addresses associated with the second user is provided in the user interface for the second user using information gathered from a contacts list of a phone calling application running on the electronic device. For example, a contact card for the second user associated with the contacts list of the phone calling application includes the one or more addresses associated with the second user (e.g., because the user of the electronic device entered those addresses into the contact card for the second user).

In some embodiments, the user interface for the second user includes one or more options associated with the one or more addresses, such as selectable indications 615-2 and 615-4 as shown in FIG. 6D, wherein the one or more options are selectable to initiate a process to navigate to a selected address of the one or more addresses. For example, each address listed in the information discussed above is displayed with an option (e.g., a "go" option or other navigation option) that is selectable to initiate a process to navigate to the associated address. In some embodiments, the input discussed above for initiating navigation to the first destination (e.g., the location of the second user) corresponds to selection of one of the one or more options associated with the one or more addresses in the user interface for the second user. As an example, selecting the option that is associated with a home address of the second user causes the home address to become the location of the second electronic device that is associated with the second user (as used herein) and the electronic device initiates navigation to the home address of the second user (e.g., which is the first destination). Initiating navigation to a location of another user via a user interface for the other user that includes information identifying one or more addresses associated with the user in response to detecting a selection associated with one of the one or more addresses reduces the number of total inputs needed to navigate to the location of the other user via the maps application and/or facilitates discovery that a current location of the other user does or does not correspond to one of the one or more addresses, which helps inform the user's navigation decision, thereby improving user-device interaction.

In some embodiments, the first destination corresponds to a location of a business (e.g., or any point of interest as similarly discussed above), such as Store A as shown in navigation user interface 640 in FIG. 6JJ. For example, the first destination is a restaurant, a store or shopping mall, a coffee shop, a landmark, a hiking trailhead, etc. In some embodiments, the location of the business is a known location that is identifiable and accessible via the maps application in one or more of the ways discussed above. In some embodiments, the first destination corresponds to a location defined by a user-defined pin dropped on the map of the user interface of the maps application. Initiating navigation to a location of a business via a user interface of a maps application running on an electronic device in accordance with a first mode of transit, where during the navigation, the electronic device displays an option that is selectable to transition to navigating to the location of the other user in accordance with a second mode of transit in response to detecting that the electronic device is within a first threshold distance of the location, reduces the number of total inputs needed to navigate to the location of the other user via different modes of transit and/or enables the mode of transit to be changed automatically after navigation has already begun, thereby improving user-device interaction.

In some embodiments, while navigating along a route including the first destination, in accordance with a determination that the first destination is associated with a location of a second electronic device, different from the electronic device, that is associated with a second user, different from a user of the electronic device, such as the second user Sam as indicated by indication 633-3 as shown in FIG. 6K, the user interface associated with the maps application includes a selectable indication for sharing an estimated time of arrival (ETA) at the first destination with the second user, such as selectable indication 643 as shown in FIG. 6L. For example, if the first destination corresponds to a location of another user (e.g., the first destination is a current location of the second user or is an address (e.g., a home address or work address) associated with the second user), when displaying the visual navigation directions in the user interface of the maps application, the electronic device displays the selectable indication (e.g., a selectable suggestion) in the user interface. In some embodiments, in response to receiving a selection of the selectable indication, the electronic device shares the ETA at the first destination with the first user. For example, the electronic device transmits location information of the electronic device to the second electronic device that causes the second electronic device to display a visual indication (e.g., a notification) indicating the user's ETA at the first destination. Additionally, in some embodiments, sharing the ETA at the second electronic device with the second user allows the second user to follow the user's route to the first destination (e.g., the second electronic device is able to find the location of the electronic device while the ETA is shared with the second user).

In some embodiments, the first destination is an intervening destination of one or more intervening destinations between the current location of the electronic device and a final destination (e.g., a second destination, different from the first destination). For example, while navigating to the second destination via the maps application (e.g., running on the electronic device) in accordance with the first mode of transit and while displaying the user interface associated with the maps application, the electronic device receives, via the one or more input devices, a sequence of one or more inputs corresponding to a request to navigate to the first destination (e.g., a request to add a stop to the current navigation), wherein the first destination is an intermediate destination for the navigation to the final destination. In some embodiments, the sequence of one or more inputs includes a selection of an option in the user interface of the maps application that is selectable to initiate a process to add a stop to the current navigation. For example, selection of the option causes the electronic device to display a user interface associated with the maps application for adding a stop (e.g., while navigation to the first destination is still ongoing). In some embodiments, the user interface for adding the stop includes a search field (e.g., a text-entry field), one or more suggested destinations (e.g., suggested based on user activity, as discussed herein, such as recent destinations/locations), user-favorited locations (e.g., a home location or work location of the user of the electronic device), etc. In some embodiments, the sequence of one or more inputs includes an input designating the first destination as a stop during the navigation to the second destination. For example, the electronic device detects a selection directed to the search field that enables the user to input text (e.g., via input detected via a virtual keyboard or physical keyboard, as previously discussed above) to search for the second destination and subsequently add the first destination as a stop for the navigation to the second destination. As another example, the electronic device detects a selection of a suggested destination or a user-favorited destination in the user interface for adding a stop.

In some embodiments, in response to receiving the sequence of one or more inputs, the electronic device initiates navigation to the second destination via the maps application in accordance with the first mode of transit. For example, the electronic device updates the user interface of the maps application based on the navigation to the second destination. In some embodiments, the visual navigation directions discussed previously above are updated to now provide visual instructions to guide the user to the second destination, instead of the first destination. However, it should be understood that, because the second destination is a stop for the current navigation, the electronic device optionally (e.g., automatically) resumes navigation to the first destination when the user of the electronic device arrives at the second destination. Additionally, in some embodiments, the user interface of the maps application is updated to include one or more indications of an ETA at the second destination from the current location of the electronic device, an amount of time remaining until the arrival at the second destination (e.g., 3 minutes, 10 minutes, 30 minutes, 1 hour, etc.), and/or a distance between the current location of the electronic device and the second destination (e.g., 0.5 miles, 1 mile, 2 miles, etc.).

In some embodiments, in accordance with a determination that the first destination is not associated with the location of the second electronic device that is associated with the second user (e.g., the first destination corresponds to a location of a business and does not correspond to a location of another user), the electronic device forgoes displaying the selectable indication. In some embodiments, the user interface of the maps application alternatively includes a selectable option that is selectable to share the ETA at the first destination with one or more users other than the user of the electronic device, but not specifically the second user of the second electronic device. For example, if the user provides an input selecting the selectable option, the electronic device displays a list of users with whom the ETA can be shared, and a search field via which the user of the electronic device is able to search for a particular user, such as the second user discussed above. While navigating to a stop during navigation to a destination, displaying an option that is selectable to share an ETA at the stop with another user if the stop corresponds to a location associated with the other user reduces the number of inputs needed to share the ETA at the stop with the other user and/or facilitates discovery that the ETA can be shared with the other user, thereby improving user-device interaction.

In some embodiments, the first destination corresponds to a final destination of the route (e.g., as similarly discussed above), as indicated by indication 639-2 in FIG. 6Q. While navigating to a stop during navigation to a destination, displaying an option that is selectable to share an ETA at the stop with another user if the stop corresponds to a location of the other reduces the number of inputs needed to share the ETA at the stop with the other user and/or facilitates discovery that the ETA can be shared with the other user, thereby improving user-device interaction.

In some embodiments, the first destination corresponds to a location of a third electronic device, different from the electronic device and the second electronic device, that is associated with a third user, different from the user of the electronic device and the second user, such as a location of third user Jane as indicated by indication 639-1 in FIG. 6Q. For example, when the electronic device receives the sequence of one or more inputs discussed above for adding a stop to the current navigation, the electronic device is navigating to the location of a third user (e.g., a current location of the third user or a location associated with the third user, such as a home address or work address), as similarly discussed herein.

In some embodiments, in accordance with the determination that the route includes a second destination that is associated with the location of the second electronic device that is associated with the second user (e.g., as discussed above), the selectable indication is selectable to initiate a process for sharing the ETA at the second destination with one or more of a plurality of users, including the second user and the third user, such as sharing the ETA with one or more users 649-1 to 649-4 as shown in FIG. 6R. For example, because multiple users (e.g., the second user and the third user) are involved in the current navigation (e.g., as destinations during the navigation), the selectable indication enables the user to share the ETA at the second destination with one or more of the plurality of users, including the second user and the third user. In some embodiments, if the electronic device detects a selection of the selectable indication, the electronic device displays a list of the plurality of users that is selectable to share the ETA at the second destination. For example, the list of the plurality of users includes the second user and the third user, and selection of either or both of the second user and the third user causes the electronic device to transmit location information, including the ETA, corresponding to the electronic device to the second electronic device and/or the third electronic device in accordance with the selection. In some embodiments, the second user is displayed at a top of the list of the plurality of users because the location of the second user was most recently added as a stop for the current navigation. While navigating to a location of a second user during navigation to a location of a first user, displaying an option that is selectable to initiate a process to share an ETA at the location of the second user with one or more users, including the second user and the first user, reduces the number of inputs needed to share the ETA with the one or more users and/or facilitates discovery that the ETA can be shared with the one or more users, thereby improving user-device interaction.

In some embodiments, while displaying the first option in the user interface in accordance with the determination that the indication is detected while the location of the electronic device is outside the second threshold distance (e.g., 50, 75, 100, 125, 150, 200, 250, 275, 300, 400, etc. feet) from the first destination in response to detecting the indication, the electronic device receives, via the one or more input devices, a selection of the first option, such as selection via contact 603 of first option 662-1 as shown in FIG. 6W. For example, after the user of the electronic device has parked their vehicle and/or is no longer riding in the vehicle (or bus, train, etc.), the electronic device detects a selection of the first option that is selectable to initiate navigation to the first destination via the maps application in accordance with the second mode of transit (e.g., walking mode of transit). In some embodiments, the selection of the first option corresponds to a tap or touch provided by a contact (e.g., a fingertip of a hand of the user or a tip of a stylus) detected on a touch-sensitive surface of the electronic device. For example, the electronic device detects a tap of the fingertip at a location on a touchscreen of the electronic device corresponding to the location of the first option in the user interface. In some embodiments, the selection of the first option corresponds to a selection of a physical button of a hardware input device (e.g., a remote controller) in communication with the electronic device. In some embodiments, the selection of the first option corresponds to an air gesture (e.g., an air pinch gesture provided by the hand of the user in which an index finger and thumb of the hand come together to make contact) detected via one or more cameras of the electronic device.

In some embodiments, in response to detecting the selection of the first option, the electronic device initiates navigation to the first destination via the maps application in accordance with the second mode of transit, including updating display of the user interface associated with the maps application in accordance with the navigation, such as displaying navigation user interface 640 that includes walking directions as shown in FIG. 6X. For example, as similarly discussed above, the electronic device displays visual instructions in the user interface of the maps application for guiding the user to the first destination in accordance with the second mode of transit. In some embodiments, while navigating to the first destination, the user interface of the maps application includes textual instructions (e.g., "turn left" or "turn right in 25 feet") overlaid on the visual representation of a portion of a current route to the first destination relative to the current location of the electronic device (e.g., which includes the map corresponding to portions of the physical environment surrounding the current location of the electronic device and a heading user interface element (e.g., an arrow) that corresponds to the current location of the electronic device on the route), and is optionally presented with audio corresponding to the navigation instructions (e.g., audio outputted using a voice of a virtual assistant associated with an operating system of the electronic device). In some embodiments, the user interface of the maps application includes one or more indications of an estimated time of arrival (ETA) at the first destination from the current location of the electronic device based on the second mode of transit (e.g., how fast the user is walking and/or based on an average walking speed of the user and/or other users), an amount of time remaining until the arrival at the first destination (e.g., 1 minute, 2 minutes, 5 minutes, etc.), and/or a distance between the current location of the electronic device and the first destination (e.g., 100 feet, 0.2 miles, 0.5 miles, etc.). Transitioning to navigation to a destination in accordance with a second mode of transit in response to detecting selection of an option in a user interface while the electronic device is within a first threshold distance of the destination while the electronic device is navigating in accordance with a first mode of transit reduces the number of inputs needed to utilize the second mode of transit to navigate to the destination and/or enables the mode of transit to be changed automatically, thereby improving user-device interaction.

In some embodiments, while navigating to the first destination via the maps application in accordance with the second mode of transit, the electronic device detects the location of the electronic device within the second threshold distance (e.g., 50, 75, 100, 125, 150, 200, 250, 275, 300, 400, etc. feet) of the first destination, such as detecting the location 692 of the electronic device 500 within the Arrival area as shown in the legend 690 in FIG. 6Y. For example, while the user is walking to the first destination by following the visual navigation instructions provided by the electronic device, the electronic device detects the location of the electronic device within he second threshold distance of the first destination.

In some embodiments, in response to detecting the location of the electronic device within the second threshold distance of the first destination, the electronic device displays, via the display generation component, the arrival user interface (e.g., arrival user interface 660 as shown in FIG. 6Y) associated with the maps application for the first destination (e.g., as similarly discussed above). Displaying an arrival user interface for a destination while navigating to the destination in accordance with a second mode of transit in response to detecting the electronic device is within a second threshold distance of the destination facilitates discovery that the user of the electronic device is approaching the destination and/or enables the arrival user interface, which enables the navigation to be ended, automatically, thereby improving user-device interaction.

In some embodiments, the first destination corresponds to a location of a second electronic device, different from the electronic device, that is associated with a second user, different from a user of the electronic device (e.g., as similarly discussed above), such as the second user Sam as indicated in indication 633-2 in FIG. 6K, and the arrival user interface associated with the maps application for the first destination includes a selectable option (e.g., first option 662-1 as shown in FIG. 6AA) that is selectable to display a user interface of an item locating application (e.g., the user interface of the item locating application discussed above). In some embodiments, while displaying the arrival user interface that includes the selectable option in accordance with the determination that the indication is detected while the location of the electronic device is within the second threshold distance (e.g., 50, 75, 100, 125, 150, 200, 250, 275, 300, 400, etc. feet) from the first destination in response to detecting the indication, the electronic device receives, via the one or more input devices, a selection of the selectable option in the arrival user interface, such as a selection via contact 603 of the first option 662-1 as shown in FIG. 6AA. For example, the electronic device receives an input similar or corresponding to one of the selection inputs discussed previously above.

In some embodiments, in response to receiving the selection of the selectable option, the electronic device displays, via the display generation component, the user interface of the item locating application (e.g., user interface 670 as shown in FIG. 6BB), wherein the user interface includes information corresponding to the second user, such as a current location of the second user Sam as indicated in the region 671 in FIG. 6BB. In some embodiments, as similarly discussed above, the user interface of the item locating application includes one or more representations of one or more findable items and/or users (e.g., including the second user) overlaid on a map in the user interface along with indications of the locations of the one or more findable items and/or users. In some embodiments, the map corresponds to a physical region surrounding the location of the second user. In some embodiments, because the user of the electronic device is within the second threshold distance of the location of the second user, the user interface of the item locating application includes a visual indication of the current location of the electronic device (e.g., corresponding to the location of the user of the electronic device). In some embodiments the information corresponding to the second user includes an indication of the current location of the second user, as well as a time indication corresponding to when the indication of the current location of the second user was last updated, as similarly discussed above with reference to the item locating application. For example, the time indication indicates "Now, 1 minute ago, 5 minutes ago, 1 hour ago, etc." as similarly discussed herein. In some embodiments, as previously discussed above, the user interface of the item locating application includes a representation of the second user and an indication of the current location of the second user because the user of the electronic device has been granted access to the location of the second user (e.g., the location of the second electronic device) by the second user. In some embodiments, the information corresponding to the user is displayed in a user interface (e.g., a virtual card or page) for the second user that is associated with the item locating application. Displaying a user interface of an item locating application while navigating to a location of another user in accordance with a second mode of transit in response to detecting selection of an option for displaying the user interface of the item locating application facilitates discovery that the user of the electronic device has access to a current location of the other user, and/or reduces the number of inputs needed to locate the other user via the item locating application, which helps improve accuracy for locating the other user, thereby improving user-device interaction.

In some embodiments, the information corresponding to the user includes a selectable option that is selectable to display a user interface for locating the first destination (e.g., a user interface associated with a proximity finding feature that is enabled for the second electronic device (e.g., because the user of the electronic device has access to the location of the second electronic device that is associated with the second user) that is associated with the item locating application discussed above), such as second option 672-2 as shown in FIG. 6BB. In some embodiments, while displaying the user interface of the item locating application including the selectable option, the electronic device receives, via the one or more input devices, a selection of the selectable option, such as a selection via contact 603 directed to the second option 672-2 as shown in FIG. 6BB. For example, the electronic device receives an input similar or corresponding to one of the selection inputs discussed previously above.

In some embodiments, in response to receiving the selection of the selectable option, in accordance with a determination that the location of the electronic device is still within the second threshold distance of the first destination (e.g., the location of the second electronic device that is associated with the second user as previously discussed above), the electronic device displays, via the display generation component, the user interface for locating the first destination, such as finding user interface 675 in FIG. 6CC. For example, the electronic device replaces display of the user interface of the item locating application with the user interface associated with the proximity finding feature for locating the first destination (e.g., while the location of the user is within the second threshold distance of the location of the second electronic device that is associated with the second user). Additional details regarding the user interface for locating the first destination are provided below. Displaying a user interface associated with a proximity finding feature for an electronic device in response to detecting selection of an option for displaying the user interface while navigating to a location of the electronic device enables the user to efficiently find the location of a user of the electronic device for locating the user, thereby improving user-device interaction.

In some embodiments, displaying the user interface for locating the first destination includes displaying, via the display generation component, a first visual indicator that indicates a direction in which the first destination is located relative to the electronic device, such as arrow indicator 673 as shown in FIG. 6CC. For example, the user interface that is associated with the proximity finding feature for locating the first destination (e.g., the location of the second user) includes a first visual indicator (e.g., an arrow) that indicates a direction in which the second electronic device (e.g., associated with the second user) is located relative to the electronic device (e.g., the electronic device displays an arrow pointed in the direction where the second user is determined to be located relative to the electronic device based on location information provided by the second electronic device and/or a server in communication with the second electronic device). In some embodiments, a second indicator (e.g., a dot) is displayed that corresponds to the forward direction (e.g., relative to the front of the electronic device). In some embodiments, the first indicator (e.g., the arrow) is displayed that corresponds to the direction of the first destination (e.g., relative to the center of the display). In some embodiments, the arrow points from the center of the display towards the second indicator (e.g., thus pointing towards the first destination). In some embodiments, an arc is displayed between the first and second indicator to indicate to the user of the electronic device the direction to turn the electronic device to align the second electronic device to the front of the electronic device (e.g., to rotate the electronic device in the direction of the arc to cause alignment of the first indicator with the second indicator). In some embodiments, while displaying the first visual indicator, if the electronic device detects (e.g., using one or more sensors, such as an accelerometer, a gyroscope, or a GPS sensor) a change in orientation of the electronic device (e.g., detects a rotation of the electronic device towards or away from the second electronic device), the electronic device changes an appearance of the first visual indicator (e.g., rotating the arrow) to indicate a direction in which the second electronic device is located relative to the electronic device (e.g., as the electronic device is rotated towards or away from the direction of the second electronic device, the display is updated to reflect the change in the direction of the second electronic device relative to the electronic device). For example, when the device rotates towards the second electronic device (e.g., the front of the electronic device is rotated towards the second electronic device), the arrow rotates to point towards the top of the electronic device (e.g., in accordance with the position of the second user) and/or the first indicator moves towards the first indicator (e.g., in accordance with the position of the second user). Thus, the first indicator (e.g., the arrow) are updated “live” to be pointed towards the location corresponding to the second user. Displaying a user interface associated with a proximity finding feature for an electronic device that includes a first visual indicator in response to detecting selection of an option for displaying the user interface while navigating to a location of the electronic device enables the user to efficiently find the location of a user of the electronic device for locating the user, thereby improving user-device interaction.

In some embodiments, displaying the user interface for locating the first destination includes displaying, via the display generation component, an indication of a distance to the first destination relative to the electronic device, such as textual indication 674 as shown in FIG. 6CC. For example, the electronic device displays, below or above the first visual indicator discussed above, an indication of a distance (e.g., 1 foot, 5 feet, 20 feet, 50 feet, 100 feet, etc.) between the electronic device and the location corresponding to the second user (e.g., the location of the second electronic device). In some embodiments, the indication of the distance to the first destination relative to the electronic device is updated based on changes in the distance between the electronic device and the first destination. For example, while the user interface associated with the proximity finding feature for locating the second electronic device is displayed, as the user of the electronic device moves closer to the location corresponding to the second user, the indication of the distance decreases because the distance between the electronic device and the second electronic device decreases in accordance with the movement of the user. As another example, the indication of the distance to the first destination relative to the electronic device optionally changes based on movement of the second user (e.g., which causes the location of the second electronic device to change). For example, while the user of the electronic device is moving toward the location corresponding to the second user, if the location of the second electronic device changes based on movement of the second user, the indication of the distance to the location of the second electronic device relative to the electronic device increases or decreases based on a net (e.g., sum or difference) change in distance between the electronic device and the second electronic device. Displaying a user interface associated with a proximity finding feature for an electronic device that includes an indication of a distance to the location of the electronic device in response to detecting selection of an option for displaying the user interface while navigating to a location of the electronic device enables the user to efficiently find the location of a user of the electronic device for locating the user, thereby improving user-device interaction.

In some embodiments, in response to receiving the selection of the selectable option, the electronic device initiates a process to transmit (e.g., directly or indirectly via a server (e.g., a wireless communications terminal) that is in communication with the electronic device and the second electronic device) an indication to the second electronic device that is associated with the second user that notifies the second user that the user of the electronic device is attempting to locate the second electronic device associated with the second user, as similarly described with reference to FIG. 6EE. For example, when the electronic device displays the user interface associated with the proximity finding feature for locating the second electronic device, the electronic device transmits an indication to the second electronic device that causes the second electronic device to generate a notification (or other visual, haptic, or audio alert) that informs the second user of the second electronic device that the user of the electronic device is currently finding and/or locating the second user (e.g., the second electronic device). In some embodiments, while the notification (or other alert) is presented at the second electronic device (e.g., displaying the notification on a lock screen or home screen user interface of the second electronic device), if the second user provides input directed to the notification (e.g., input selecting the notification), the second electronic device launches the item locating application at the second electronic device and displays the user interface of the item locating application previously discussed above. In some embodiments, the user interface of the item locating application at the second electronic device includes location information, such as the current location of the user of the electronic device, corresponding to the user of the electronic device which indicates to the second user a relative distance between the second electronic device and the electronic device and informs the second user that the user of the electronic device will be arriving at the location of the second user momentarily (e.g., within the next 30 seconds, 1 minute, 3 minutes, etc.). Transmitting an indication to a second electronic device, when displaying a user interface associated with a proximity finding feature for locating the second electronic device, that causes the second electronic device to generate a notification corresponding to the locating of the second electronic device facilitates discovery for the second user that the user of the first electronic device is approaching and/or further helps the user of the first electronic device locate the location of the second user of the second electronic device, thereby improving user-device interaction.

In some embodiments, while displaying the user interface for locating the first destination, the electronic device receives, via the one or more input devices, an input corresponding to a request to minimize display of the user interface for locating the first destination, such as upward swipe of contact 603 directed to the finding user interface 675 as shown in FIG. 6DD. For example, the electronic device receives an input corresponding to a swipe or dismiss gesture. In some embodiments, the input includes a swipe of a contact (e.g., a finger of a hand of the user or a tip of a stylus) on a touch-sensitive surface of the electronic device, such as a touchscreen of the electronic device or a touchpad in communication with the electronic device, in a respective direction (e.g., upward or downward on the touch-sensitive surface). In some embodiments, the input includes selection of a button, such as a home button (e.g., soft or physical), of the electronic device or on a hardware input device (e.g., a remote controller) in communication with the electronic device.

In some embodiments, in response to receiving the input, the electronic device minimizes, via the display generation component, the display of the user interface, including displaying at least a subset of information associated with locating the first destination in a predetermined region of the display generation component, such as displaying user interface object 678 that includes the arrow indication and textual indication of the finding user interface 675 as shown in FIG. 6FF. For example, the electronic device ceases displaying the user interface associated with the proximity finding feature for locating the second electronic device and displays one or more user interface elements corresponding to the user interface in the predetermined region of the display generation component (e.g., the touch screen of the electronic device). In some embodiments, the at least the subset of the information associated with locating the first destination includes the first visual indication (e.g., the arrow configured to point in the direction of the second electronic device relative to the electronic device) discussed previously above. In some embodiments, the at least the subset of the information includes the indication of the distance to the location of the second electronic device relative to the electronic device discussed previously above. For example, the locating the first destination continues even though the user interface has been minimized by the electronic device. In some embodiments, when the display of the user interface is minimized, the electronic device displays a home screen user interface for the electronic device (e.g., a user interface that includes a plurality of selectable user interface objects (e.g., icons) associated with respective applications). In some embodiments, while the home screen user interface (or other user interface) is displayed, the electronic device continues to update the at least the subset of the information associated with locating the first destination in the predetermined region of the display generation component. For example, as similarly discussed above, the electronic device updates display of the first visual indication and/or the indication of the distance to the location of the second electronic device relative to the electronic device in the predetermined region of the touch screen based on detected changes in the distance to the location of the second electronic device relative to the electronic device and/or the orientation of the second electronic device relative to the electronic device (e.g., as the electronic device is moved). In some embodiments, the predetermined region of the display generation component corresponds to a top (e.g., center) region of the display generation component. In some embodiments, the predetermined region of the display generation component corresponds to a bottom or side region of the display generation component, or any other suitable region of the display generation component. Displaying one or more user interface elements corresponding to a user interface associated with a proximity finding feature for locating a second electronic device when the display of the user interface is minimized at a first electronic device while navigating to a location of the second electronic device enables the user to view and/or interact with other user interface objects of the first electronic device, while still enabling the user to efficiently find the location of a user of the second electronic device, thereby improving user-device interaction.

In some embodiments, in response to receiving the selection of the selectable option, in accordance with a determination that the location of the electronic device is no longer within the second threshold distance of the first destination (e.g., is outside of the second threshold distance of the first destination but still within the first threshold distance of the first destination), such as the location 692 being within the Parking area as shown in the legend 690 in FIG. 6Z when the selection of the first option 662-1 is detected in FIG. 6Y, the electronic device displays, via the display generation component, the user interface associated with the maps application, including initiating navigation to the first destination via the second mode of transit, such as displaying user interface 602 as shown in FIG. 6Z. For example, the location of the electronic device is no longer within the second threshold distance of the first destination (e.g., the location of the second user) because the location of the second user has changed to a new location. As an example, while the user of the electronic device is navigating to the first destination, the second user physically changes locations, which causes the location of the second electronic device that is associated with the second user to change as well. In some embodiments, when the electronic device receives the selection of the selectable option as discussed above, the electronic device scans/probes the location of the second electronic device (e.g., based on location information that is provided by the second electronic device (or a server in communication with the second electronic device)) and determines that the location of the second electronic device has changed to a new location. Accordingly, in accordance with the determination that the change in the location of the second electronic device causes the location of the electronic device to now be more than the second threshold distance from the new location of the second electronic device, the electronic device initiates navigation to the new location of the second electronic device via the maps application. For example, the electronic device displays visual navigation instructions for walking to the new location of the second electronic device associated with the second user. In some embodiments, in response to receiving the selection of the selectable option, in accordance with a determination that the location of the electronic device is no longer within the first threshold distance of the first destination, the electronic device displays the user interface associated with the maps application, including initiating navigation to the first destination via the first mode of transit (e.g., the electronic device displays visual navigation directions for driving to the new location of the second electronic device associated with the second user). In some embodiments, in response to receiving the selection of the selectable option, in accordance with a determination that the location of the electronic device is still within the second threshold distance of the first destination, the electronic device displays the user interface of the item finding application as discussed previously above. Initiating navigation to a location of another user via a respective mode of transit in response to detecting selection of an option for displaying a user interface of an item locating application in accordance with a determination that the location of the electronic device is no longer within a second threshold distance of the location of the user other facilitates discovery that the user of the electronic device is no longer within the second threshold distance of the location of the other user and/or reduces the number of inputs needed to redisplay navigation instructions for navigating to the new location of the other user via the respective mode of transit, thereby improving user-device interaction.

In some embodiments, while navigating to the first destination in accordance with the first mode of transit, in accordance with a determination that the first destination is associated with an arrival point (e.g., arrival point 693 in the legend 690 in FIG. 6HH) that requires navigation via the second mode of transit (e.g., the first destination includes a required/necessary walking route from the arrival point to the first destination or requires some other mode of transit that is different from the current mode of transit (e.g., the first mode of transit)) to arrive at the first destination (e.g., Venice Beach as indicated in the navigation user interface 640 in FIG. 6HH), the first threshold distance and the second threshold distance are determined relative to the arrival point (e.g., based on a direction of travel of the electronic device and/or the user relative to the first destination rather than relative to the first destination), such as the Arrival area and the Parking area being centered about the arrival point 693 as shown in the legend 690 in FIG. 6HH. For example, the first destination is a hiking trailhead, a beachfront, a pier, a monument, etc. or the first destination is a location of another user who is located at a hiking trailhead, a beachfront a pier, a monument, etc. that requires the user of the electronic device to walk the remaining duration of the route from the arrival point to the first destination (e.g., because there are no existing roads leading directly to the first destination). In some embodiments, the second threshold distance corresponds to a distance (e.g., a radius) of an arrival area centered on the arrival point. Accordingly, in some embodiments, the electronic device displays the arrival user interface discussed above when the electronic device is within the arrival area that is centered on the arrival point. Alternatively, in some embodiments, the first threshold distance is determined relative to the arrival point, and the electronic device forgoes determining a second threshold distance relative to the arrival point. For example, a minimum value of the first threshold distance discussed above is the arrival point while navigating to the first destination in accordance with the first mode of transit. For example, the arrival area that corresponds to a parking area (e.g., parking lot or parking garage) that is associated with the first destination and/or is proximate to (e.g., within 50, 100, 150, 200, 300, etc. feet of) the first destination and the arrival point is an entrance to the parking area. Displaying an arrival user interface for a destination while navigating to the destination in accordance with a first mode of transit when the location of the electronic device is within a threshold distance of an arrival point associated with the destination facilitates discovery that the destination is associated with the arrival point and helps visually facilitate user understanding that the first destination cannot be reached by navigating in accordance with the first mode of transit beyond the arrival point, thereby improving user-device interaction.

In some embodiments, in response to detecting the indication, in accordance with a determination that the first destination is associated with a pre-arrival area (e.g., the first destination includes a designated parking, valet, or other parking/drop-off area that is a fixed (and known) distance from the first destination (e.g., outside of, encompassing, and/or adjacent to the first destination)), such as parking region 694 as indicated in the navigation user interface 640 as shown in FIG. 6JJ, and in accordance with a determination that the indication is detected while the location of the electronic device is within the first threshold distance of the (e.g., an entrance or beginning of) pre-arrival area (e.g., rather than relative to the location of the first destination), (e.g., automatically (e.g., without user input)), such as within the Parking area as shown in the legend 690 in FIG. 6KK, the electronic device displays, via the display generation component, the first option (e.g., first option 652-1 as shown in FIG. 6T) in the user interface that is selectable to initiate navigation to the first destination via the maps application in accordance with the second mode of transit (e.g., walking mode of transit). As an example, if the first destination is a shopping mall/center that is associated with a parking garage (e.g., attached to the parking garage), the first threshold distance is determined relative to an entrance to the parking garage. In some embodiments, if the pre-arrival area has more than one entrance, the first threshold distance is determined relative to an entrance that is closest to the location of the electronic device (e.g., based on a direction of travel of the electronic device and/or the user relative to the first destination). Additionally, in some embodiments, the first threshold distance is determined relative to the pre-arrival area without a determination of the second threshold distance described previously above. For example, in instances where the first destination is associated with a pre-arrival area, the electronic device forgoes determining/establishing the second threshold distance. Accordingly, in some embodiments, when the location of the electronic device is outside of the pre-arrival area and within the first threshold distance of the pre-arrival area, the electronic device displays the parking or parked user interface described previously herein. In some embodiments, when the location of the electronic device is within the pre-arrival area, the electronic device displays the arrival user interface discussed previously above even though the user will be parking in the pre-arrival area and eventually walking the remainder of the route to the first destination (e.g., the entrance of the shopping mall/center). Displaying an arrival user interface for a destination while navigating to the destination when the user arrives at a pre-arrival area associated with the destination facilitates discovery that the destination is associated with the pre-arrival area and/or avoids unnecessary display of navigation directions when the user is in the pre-arrival area, which helps reduce power consumption of the electronic device, thereby improving user-device interaction.

In some embodiments, while navigating to the first destination via the maps application (e.g., running on the electronic device) in accordance with the first mode of transit and while displaying the user interface associated with the maps application, the electronic device detects the location of the electronic device within the second threshold distance (e.g., 50, 75, 100, 125, 150, 200, 250, 275, 300, 400, etc. feet) of the first destination, such as detecting the location 692 of the electronic device 500 within the Arrival area as shown in the legend 690 in FIG. 6U. For example, before and/or without parking the vehicle or otherwise changing the mode of transit to be different from the first mode of transit, the electronic device detects the location of the electronic device move to within the second threshold distance of the first destination. In some embodiments, the electronic device detects the location of the electronic device corresponds to (e.g., overlaps with) the location of the first destination.

In some embodiments, in response to detecting the location of the electronic device within the second threshold distance of the first destination, the electronic device displays, via the display generation component, the arrival user interface (e.g., arrival user interface 660 as shown in FIG. 6U) associated with the maps application for the first destination (e.g., as described previously above). In some embodiments, the electronic device maintains display of the arrival user interface while the location of the electronic device remains within the second threshold distance of the first destination. In some embodiments, while displaying the arrival user interface associated with the maps application for the first destination, without receiving an input terminating the navigation to the first destination, the electronic device detects the location of the electronic device outside the second threshold distance of the first destination (e.g., and within or no longer within the first threshold distance discussed above of the first destination), such as detecting the location 692 of the electronic device 500 within the Parking area as shown in the legend 690 in FIG. 6V. In some embodiments, while still navigating to the first destination in accordance with the first mode of transit, the electronic device detects the location of the electronic device move back outside of the second threshold distance of the first destination (e.g., without parking the vehicle or exiting the vehicle).

In some embodiments, in response to detecting the location of the electronic device outside the second threshold distance of the first destination, the electronic device replaces display, via the display generation component, of the arrival user interface associated with the maps application for the first destination with a user interface for changing a mode of transit for the navigation to the first destination (e.g., irrespective of whether the location of the electronic device is no longer within the first threshold distance discussed above of the first destination), such as redisplaying the parking user interface 650 as shown in FIG. 6V. For example, the electronic device displays a parked or parking user interface as described previously above. In some embodiments, the electronic device maintains display of the user interface for changing the mode of transit until detecting an input for changing the mode of transit (e.g., to the second mode of transit) or detecting an input for ending the navigation to the first destination, as discussed herein. In other embodiments, if the location of the electronic device is detected to be outside the first threshold distance of the first destination, the electronic device updated the first option in the parking user interface to be a second option that is selectable to redisplay the visual navigation instructions that are based on the first mode of transit in the user interface of the maps application (e.g., and cease display of the parking user interface). Transitioning between displaying a user interface changing a mode of transit for navigating to a destination and displaying an arrival user interface for the destination based on changes in distance between a location of the electronic device and the destination reduces the number of inputs needed to utilize a different mode of transit to navigate to the destination based on the changes in distance and/or enables the mode of transit to be changed automatically based on the changes in distance, thereby improving user-device interaction.

In some embodiments, the user interface for changing the mode of transit for the navigation to the first destination includes a selectable option (e.g., first option 652-1 as shown in FIG. 6V) that is selectable to change the mode of transit from the first mode of transit to the second mode of transit (e.g., as previously discussed above), and the selectable option includes an indication of a first estimated travel time to the first destination (e.g., 3 minutes as shown in the first option 652-1 in FIG. 6V) via the second mode of transit relative to the location of the electronic device (e.g., the indication indicates an estimated amount of time (e.g., in minutes, seconds, etc.) remaining in the navigation to the first destination based on walking (e.g., the user's current detected walking speed, the user's average walking speed, a known average walking pace, etc.)). In some embodiments, in response to detecting selection of the selectable option, the electronic device displays visual navigation directions for guiding the user to the first destination in accordance with the second mode of transit (e.g., walking).

In some embodiments, while navigating to the first destination via the maps application and while displaying the user interface for changing the mode of transit for the navigation to the first destination that includes the selectable option, the electronic device detects a change in the location of the electronic device, such as movement of the electronic device 500 further away from the first destination from FIGS. 6V-6W. For example, while the parking user interface is displayed (e.g., and before the user has parked or has left the vehicle or other transportation means), the electronic device detects the location of the electronic device is closer to or farther from the first destination (e.g., caused by further/continued movement of the user, and thus the electronic device).

In some embodiments, in response to detecting the change in the location of the electronic device, in accordance with a determination that the change in the location of the electronic device causes an estimated travel time to the first destination via the second mode of transit to be a second estimated travel time, different from the first estimated travel time, the electronic device updates the selectable option with an indication of the second estimated travel time, such as updating the first option 662-1 with a 2 minute travel time as shown in FIG. 6W. For example, the electronic device detects that the location of the electronic device has moved/changed by an amount relative to the first destination that causes the estimated travel time to the first destination via walking to change (e.g., increase or decrease). In some embodiments, the electronic device dynamically updates the indication of the selectable option (e.g., in real-time) as the location of the electronic device continues to (or does not continue to) change relative to the first destination (e.g., while the user interface for changing the mode of transit remains displayed via the display generation component). In some embodiments, as similarly discussed above, the indication of the second estimated travel time is updated independently of the location of the electronic device relative to the first threshold distance and the second threshold distance while the selectable option is displayed in the user interface for changing the mode of transit. Updating an estimated travel time relative to a destination while navigating to the destination in accordance with a respective mode of travel in response to detecting changes in distance between the location of the electronic device and the destination facilitates user understanding of the estimated travel time for the user's current location, which helps inform user decisions regarding traveling to the destination via the respective mode of transit, thereby improving user-device interaction.

In some embodiments, while navigating to the first destination via the maps application (e.g., running on the electronic device) in accordance with the first mode of travel (e.g., driving, riding as passenger via carpool, cycling, train, bus, etc.) or the second mode of travel (e.g., walking), the electronic device detects an event corresponding to a request to terminate navigation to the first destination via the maps application, such as selection of option 662-2 in FIG. 6Y. For example, the electronic device detects an input directed to a user interface associated with the maps application. In some embodiments, the input includes selection of an end option that is selectable to terminate the navigation to the first destination. In some embodiments, the end option is displayed in the user interface of the maps application (e.g., the navigation user interface) while the electronic device is navigation to the first destination in accordance with the first mode of travel. In some embodiments, the end option is displayed in the parked or parking user interface previously discussed above that is displayed while the location of the electronic device is within the first threshold distance of the first destination (e.g., but outside the second threshold distance of the first destination). In some embodiments, the end option is displayed in the arrival user interface previously discussed above that is displayed while the location of the electronic device is within the second threshold distance of the first destination (e.g., while the electronic device is navigating in accordance with the first mode of travel or the second mode of travel). In some embodiments, the event includes detecting the location of the electronic device corresponds to the location of the first destination. For example, the electronic device determines, based on an overlap in locations of the electronic device and the first destination, that the user of the electronic device has arrived at the first destination.

In some embodiments, in response to detecting the event, the electronic device ceases navigation to the first destination in accordance with the first mode of travel or the second mode of travel, such as ceasing display of the navigation user interface 640 as shown in FIG. 6GG. For example, the electronic device ceases displaying the visual navigation instructions for guiding the user to the first destination in accordance with the first mode of travel or the second mode of travel as discussed previously above. In some embodiments, the electronic device redisplays the user interface of the maps application (e.g., in place of the parked or parking user interface or the arrival user interface discussed previously above).

In some embodiments, the electronic device displays, in the user interface associated with the maps application, a map of a physical region (e.g., map 623) that includes the location of the electronic device and the first destination. For example, as previously discussed above, the user interface of the maps application includes the display of a map of a physical region surrounding the location of the user of the electronic device. In some embodiments, the map region includes the location of the user of the electronic device. In some embodiments, the map region includes a location of the first destination because the distance between the location of the user and the first destination is smaller than a total distance/area included in the physical region of the map.

In some embodiments, the electronic device concurrently displays on the map, a visual indication of the location of the electronic device (e.g., visual indication 638) at a location on the map corresponding to the location of the electronic device, and a representation of the first destination (e.g., representation 612-1) at a location on the map corresponding to a location of the first destination. In some embodiments, the visual indication of the location of the electronic device and the representation of the first destination are represented on the map as bubbles and/or circles. However, it should be understood that these representations are optionally any shape and/or size. In some embodiments, a zoom level (e.g., magnification and/or scaling amount) of the map that is displayed in the user interface of the maps application is selected based on a distance between the location of the electronic device and the location of the first destination that enables the visual indication of the location of the electronic device to be concurrently displayed with the representation of the first destination on the map when the event is detected. For example, if the electronic device detects the event while the first destination is a first distance from the location of the electronic device, the electronic device concurrently displays the visual indication of the location of the electronic device and the representation of the first destination on the map while the map has a first zoom level. In some embodiments, if the electronic device detects the event while the first destination is a second distance, smaller than the first distance, from the location of the electronic device, the electronic device concurrently displays the visual indication of the location of the electronic device and the representation of the first destination on the map while the map has a second zoom level, greater than the first zoom level. Additionally, in some embodiments, the user interface of the maps application includes a page or virtual card of the first destination (e.g., displayed below and/or overlaid on a portion of the map region). In some embodiments, the page or virtual card of the first destination includes information corresponding to the first destination, such as a name associated with the first destination, an address associated with the first destination, contact information associated with the first destination, etc., as similarly discussed above. Displaying the current location of the electronic device and the location of destination on a map region of a user interface of a maps application after navigation to the destination is ended allows the first user to be aware of their location relative to the destination within the map area after the navigation is ended, which helps visually facilitate user understanding of the location of the destination relative to the user's current location.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 700 described above with respect to FIG. 7.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, displaying operations 702, 708, and 710 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the ability for users to find and locate items that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify the location of remote locator objects and/or identify the location of the user. Accordingly, use of such personal information data enables users to identify, find, and otherwise interact with remote locator objects. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data and notifications can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:

at an electronic device in communication with a display generation component and one or more input devices:

while navigating to a first destination via a maps application, including displaying, via the display generation component, a navigation user interface associated with the maps application, detecting a location of the electronic device within a first threshold distance of the first destination, wherein the navigation to the first destination is in accordance with a first mode of transit;

while the location of the electronic device is within the first threshold distance of the first destination, detecting an indication that a user of the electronic device is no longer utilizing the first mode of transit to the first destination; and in response to detecting the indication:

in accordance with a determination that the indication is detected while the location of the electronic device is outside a second threshold distance, less than the first threshold distance, from the first destination, displaying, via the display generation component, a first option in the navigation user interface that is selectable to initiate navigation to the first destination via the maps application in accordance with a second mode of transit, different from the first mode of transit; and in accordance with a determination that the indication is detected while the location of the electronic device is within the second threshold distance from the first destination, replacing display, via the display generation component, of the navigation user interface with an arrival user interface, different from the navigation user interface, associated with the maps application for the first destination.

2. The method of claim 1, further comprising:

in response to detecting the location of the electronic device within the first threshold distance of the first destination:

displaying, via the display generation component, a user interface for changing a mode of transit for the navigation to the first destination.

3. The method of claim 2, wherein the user interface for changing the mode of transit for the navigation to the first destination includes a selectable option that is selectable to change the mode of transit from the first mode of transit to the second mode of transit.

4. The method of claim 1, further comprising:

before navigating to the first destination via the maps application, and while displaying a user interface associated with the maps application, receiving, via the one or more input devices, a sequence of one or more inputs directed to the user interface associated with the maps application corresponding to a request to navigate to the first destination; and in response to receiving the sequence of one or more inputs, initiating a process to navigate to the first destination via the maps application.

5. The method of claim 4, wherein the first destination corresponds to a location of a second electronic device, different from the electronic device, that is associated with a second user, different from a user of the electronic device.

6. The method of claim 5, wherein the sequence of one or more inputs directed to the user interface associated with the maps application includes respective input directed to a user interface for the second user.

7. The method of claim 6, wherein the user interface for the second user includes:

in accordance with a determination that the user of the electronic device has access to the location of the second electronic device that is associated with the second user:

a second option that is selectable to display a user interface of an item locating application; and an indication of a current location of the second electronic device that is associated with the second user.

8. The method of claim 7, wherein the user interface for the second user includes:

in accordance with a determination that the user of the electronic device does not have access to the location of the second electronic device that is associated with the second user:

a third option that is selectable to initiate a process to request access to the location of the second electronic device from the second user.

9. The method of claim 6, wherein the user interface for the second user includes:

an indication of a current location of the second electronic device that is associated with the second user;

information indicating one or more addresses associated with the second user; and one or more options associated with the one or more addresses, wherein the one or more options are selectable to initiate a process to navigate to a selected address of the one or more addresses.

10. The method of claim 4, wherein the first destination corresponds to a location of a business.

11. The method of claim 1, wherein:

while navigating along a route including the first destination, in accordance with a determination that the first destination is associated with a location of a second electronic device, different from the electronic device, that is associated with a second user, different from a user of the electronic device, the navigation user interface associated with the maps application includes a selectable indication for sharing an estimated time of arrival (ETA) at the first destination with the second user.

12. The method of claim 11, wherein the first destination corresponds to a final destination of the route.

13. The method of claim 11, wherein:

the first destination corresponds to a location of a third electronic device, different from the electronic device and the second electronic device, that is associated with a third user, different from the user of the electronic device and the second user; and in accordance with the determination that the route includes a second destination that is associated with the location of the second electronic device that is associated with the second user:

the selectable indication is selectable to initiate a process for sharing the ETA at the second destination with one or more of a plurality of users, including the second user and the third user.

14. The method of claim 1, further comprising:

while displaying the first option in the navigation user interface in accordance with the determination that the indication is detected while the location of the electronic device is outside the second threshold distance from the first destination in response to detecting the indication, receiving, via the one or more input devices, a selection of the first option; and in response to detecting the selection of the first option:

initiating navigation to the first destination via the maps application in accordance with the second mode of transit, including updating display of the navigation user interface associated with the maps application in accordance with the navigation.

15. The method of claim 14, further comprising:

while navigating to the first destination via the maps application in accordance with the second mode of transit, detecting the location of the electronic device within the second threshold distance of the first destination; and in response to detecting the location of the electronic device within the second threshold distance of the first destination:

displaying, via the display generation component, the arrival user interface associated with the maps application for the first destination.

16. The method of claim 1, wherein the first destination corresponds to a location of a second electronic device, different from the electronic device, that is associated with a second user, different from a user of the electronic device, and the arrival user interface associated with the maps application for the first destination includes a selectable option that is selectable to display a user interface of an item locating application, the method further comprising:

while displaying the arrival user interface that includes the selectable option in accordance with the determination that the indication is detected while the location of the electronic device is within the second threshold distance from the first destination in response to detecting the indication, receiving, via the one or more input devices, a selection of the selectable option in the arrival user interface; and in response to receiving the selection of the selectable option:

displaying, via the display generation component, the user interface of the item locating application, wherein the user interface includes information corresponding to the second user.

17. The method of claim 16, wherein the information corresponding to the user includes a selectable option that is selectable to display a user interface for locating the first destination, the method further comprising:

while displaying the user interface of the item locating application including the selectable option, receiving, via the one or more input devices, a selection of the selectable option; and in response to receiving the selection of the selectable option:

in accordance with a determination that the location of the electronic device is still within the second threshold distance of the first destination, displaying, via the display generation component, the user interface for locating the first destination.

18. The method of claim 17, wherein displaying the user interface for locating the first destination includes displaying, via the display generation component, a first visual indicator that indicates a direction in which the first destination is located relative to the electronic device.

19. The method of claim 17, wherein displaying the user interface for locating the first destination includes displaying, via the display generation component, an indication of a distance to the first destination relative to the electronic device.

20. The method of claim 17, further comprising:

in response to receiving the selection of the selectable option:

initiating a process to transmit an indication to the second electronic device that is associated with the second user that notifies the second user that the user of the electronic device is attempting to locate the second electronic device associated with the second user.

21. The method of claim 17, further comprising:

while displaying the user interface for locating the first destination, receiving, via the one or more input devices, an input corresponding to a request to minimize display of the user interface for locating the first destination; and in response to receiving the input:

minimizing, via the display generation component, the display of the user interface, including displaying at least a subset of information associated with locating the first destination in a predetermined region of the display generation component.

22. The method of claim 17, further comprising:

in response to receiving the selection of the selectable option:

in accordance with a determination that the location of the electronic device is no longer within the second threshold distance of the first destination, displaying, via the display generation component, the navigation user interface associated with the maps application, including initiating navigation to the first destination via the second mode of transit.

23. The method of claim 1, wherein:

while navigating to the first destination in accordance with the first mode of transit, in accordance with a determination that the first destination is associated with an arrival point that requires navigation via the second mode of transit to arrive at the first destination, the first threshold distance and the second threshold distance are determined relative to the arrival point.

24. The method of claim 1, further comprising:

in response to detecting the indication, in accordance with a determination that the first destination is associated with a pre-arrival area and in accordance with a determination that the indication is detected while the location of the electronic device is within the first threshold distance of the pre-arrival area, displaying, via the display generation component, the first option in the navigation user interface that is selectable to initiate navigation to the first destination via the maps application in accordance with the second mode of transit.

25. The method of claim 1, further comprising:

while navigating to the first destination via the maps application in accordance with the first mode of transit and while displaying the navigation user interface associated with the maps application, detecting the location of the electronic device within the second threshold distance of the first destination;

in response to detecting the location of the electronic device within the second threshold distance of the first destination, displaying, via the display generation component, the arrival user interface associated with the maps application for the first destination;

while displaying the arrival user interface associated with the maps application for the first destination, without receiving an input terminating the navigation to the first destination, detecting the location of the electronic device outside the second threshold distance of the first destination; and in response to detecting the location of the electronic device outside the second threshold distance of the first destination:

replacing display, via the display generation component, of the arrival user interface associated with the maps application for the first destination with a user interface for changing a mode of transit for the navigation to the first destination.

26. The method of claim 25, wherein the user interface for changing the mode of transit for the navigation to the first destination includes a selectable option that is selectable to change the mode of transit from the first mode of transit to the second mode of transit, and the selectable option includes an indication of a first estimated travel time to the first destination via the second mode of transit relative to the location of the electronic device, the method further comprising:

while navigating to the first destination via the maps application and while displaying the user interface for changing the mode of transit for the navigation to the first destination that includes the selectable option, detecting a change in the location of the electronic device; and in response to detecting the change in the location of the electronic device:

in accordance with a determination that the change in the location of the electronic device causes an estimated travel time to the first destination via the second mode of transit to be a second estimated travel time, different from the first estimated travel time, updating the selectable option with an indication of the second estimated travel time.

27. The method of claim 1, further comprising:

while navigating to the first destination via the maps application in accordance with the first mode of travel or the second mode of travel, detecting an event corresponding to a request to terminate navigation to the first destination via the maps application; and in response to detecting the event:

ceasing navigation to the first destination in accordance with the first mode of travel or the second mode of travel;

displaying, in a user interface associated with the maps application, a map of a physical region that includes the location of the electronic device and the first destination; and concurrently displaying on the map:

a visual indication of the location of the electronic device at a location on the map corresponding to the location of the electronic device; and a representation of the first destination at a location on the map corresponding to a location of the first destination.

28. An electronic device, comprising:

one or more processors;

memory; and one or more programs, wherein the one or more programs are stored in the memory and configured to be executed by the one or more processors, the one or more programs including instructions for:

while navigating to a first destination via a maps application, including displaying, via a display generation component, a navigation user interface associated with the maps application, detecting a location of the electronic device within a first threshold distance of the first destination, wherein the navigation to the first destination is in accordance with a first mode of transit;

while the location of the electronic device is within the first threshold distance of the first destination, detecting an indication that a user of the electronic device is no longer utilizing the first mode of transit to the first destination; and in response to detecting the indication:

in accordance with a determination that the indication is detected while the location of the electronic device is outside a second threshold distance, less than the first threshold distance, from the first destination, displaying, via the display generation component, a first option in the navigation user interface that is selectable to initiate navigation to the first destination via the maps application in accordance with a second mode of transit, different from the first mode of transit; and in accordance with a determination that the indication is detected while the location of the electronic device is within the second threshold distance from the first destination, replacing display, via the display generation component, of the navigation user interface with an arrival user interface, different from the navigation user interface, associated with the maps application for the first destination.

29. A non-transitory computer readable storage medium storing one or more programs, the one or more programs comprising instructions, which when executed by one or more processors of an electronic device, cause the electronic device to perform a method comprising:

while navigating to a first destination via a maps application, including displaying, via a display generation component, a navigation user interface associated with the maps application, detecting a location of the electronic device within a first threshold distance of the first destination, wherein the navigation to the first destination is in accordance with a first mode of transit;

while the location of the electronic device is within the first threshold distance of the first destination, detecting an indication that a user of the electronic device is no longer utilizing the first mode of transit to the first destination; and in response to detecting the indication:

in accordance with a determination that the indication is detected while the location of the electronic device is outside a second threshold distance, less than the first threshold distance, from the first destination, displaying, via the display generation component, a first option in the navigation user interface that is selectable to initiate navigation to the first destination via the maps application in accordance with a second mode of transit, different from the first mode of transit; and in accordance with a determination that the indication is detected while the location of the electronic device is within the second threshold distance from the first destination, replacing display, via the display generation component, of the navigation user interface with an arrival user interface, different from the navigation user interface, associated with the maps application for the first destination.

30. The electronic device of claim 28, wherein the one or more programs further include instructions for:

before navigating to the first destination via the maps application, and while displaying a user interface associated with the maps application, receiving, via one or more input devices, a sequence of one or more inputs directed to the user interface associated with the maps application corresponding to a request to navigate to the first destination; and in response to receiving the sequence of one or more inputs, initiating a process to navigate to the first destination via the maps application.

31. The electronic device of claim 30, wherein the first destination corresponds to a location of a second electronic device, different from the electronic device, that is associated with a second user, different from a user of the electronic device.

32. The electronic device of claim 31, wherein the sequence of one or more inputs directed to the user interface associated with the maps application includes respective input directed to a user interface for the second user.

33. The electronic device of claim 32, wherein the user interface for the second user includes:

in accordance with a determination that the user of the electronic device has access to the location of the second electronic device that is associated with the second user:

a second option that is selectable to display a user interface of an item locating application; and an indication of a current location of the second electronic device that is associated with the second user.

34. The electronic device of claim 33, wherein the user interface for the second user includes:

in accordance with a determination that the user of the electronic device does not have access to the location of the second electronic device that is associated with the second user:

a third option that is selectable to initiate a process to request access to the location of the second electronic device from the second user.

35. The electronic device of claim 28, wherein the one or more programs further include instructions for:

while navigating along a route including the first destination, in accordance with a determination that the first destination is associated with a location of a second electronic device, different from the electronic device, that is associated with a second user, different from a user of the electronic device, the navigation user interface associated with the maps application includes a selectable indication for sharing an estimated time of arrival (ETA) at the first destination with the second user.

36. The electronic device of claim 35, wherein:

the first destination corresponds to a location of a third electronic device, different from the electronic device and the second electronic device, that is associated with a third user, different from the user of the electronic device and the second user; and in accordance with the determination that the route includes a second destination that is associated with the location of the second electronic device that is associated with the second user:

the selectable indication is selectable to initiate a process for sharing the ETA at the second destination with one or more of a plurality of users, including the second user and the third user.

37. The electronic device of claim 28, wherein the first destination corresponds to a location of a second electronic device, different from the electronic device, that is associated with a second user, different from a user of the electronic device, and the arrival user interface associated with the maps application for the first destination includes a selectable option that is selectable to display a user interface of an item locating application, wherein the one or more programs further include instructions for:

while displaying the arrival user interface that includes the selectable option in accordance with the determination that the indication is detected while the location of the electronic device is within the second threshold distance from the first destination in response to detecting the indication, receiving, via one or more input devices, a selection of the selectable option in the arrival user interface; and in response to receiving the selection of the selectable option:

displaying, via the display generation component, the user interface of the item locating application, wherein the user interface includes information corresponding to the second user.

38. The electronic device of claim 37, wherein the information corresponding to the user includes a selectable option that is selectable to display a user interface for locating the first destination, wherein the one or more programs further include instructions for:

while displaying the user interface of the item locating application including the selectable option, receiving, via one or more input devices, a selection of the selectable option; and in response to receiving the selection of the selectable option:

in accordance with a determination that the location of the electronic device is still within the second threshold distance of the first destination, displaying, via the display generation component, the user interface for locating the first destination.

39. The electronic device of claim 38, wherein the one or more programs further include instructions for:

in response to receiving the selection of the selectable option:

in accordance with a determination that the location of the electronic device is no longer within the second threshold distance of the first destination, displaying, via the display generation component, the navigation user interface associated with the maps application, including initiating navigation to the first destination via the second mode of transit.

40. The electronic device of claim 28, wherein the one or more programs further include instructions for:

while navigating to the first destination in accordance with the first mode of transit, in accordance with a determination that the first destination is associated with an arrival point that requires navigation via the second mode of transit to arrive at the first destination, the first threshold distance and the second threshold distance are determined relative to the arrival point.

41. The electronic device of claim 28, wherein the one or more programs further include instructions for:

in response to detecting the indication, in accordance with a determination that the first destination is associated with a pre-arrival area and in accordance with a determination that the indication is detected while the location of the electronic device is within the first threshold distance of the pre-arrival area, displaying, via the display generation component, the first option in the navigation user interface that is selectable to initiate navigation to the first destination via the maps application in accordance with the second mode of transit.

42. The electronic device of claim 28, wherein the one or more programs further include instructions for:

while navigating to the first destination via the maps application in accordance with the first mode of transit and while displaying the navigation user interface associated with the maps application, detecting the location of the electronic device within the second threshold distance of the first destination;

in response to detecting the location of the electronic device within the second threshold distance of the first destination, displaying, via the display generation component, the arrival user interface associated with the maps application for the first destination;

while displaying the arrival user interface associated with the maps application for the first destination, without receiving an input terminating the navigation to the first destination, detecting the location of the electronic device outside the second threshold distance of the first destination; and in response to detecting the location of the electronic device outside the second threshold distance of the first destination:

replacing display, via the display generation component, of the arrival user interface associated with the maps application for the first destination with a user interface for changing a mode of transit for the navigation to the first destination.

43. The electronic device of claim 42, wherein the user interface for changing the mode of transit for the navigation to the first destination includes a selectable option that is selectable to change the mode of transit from the first mode of transit to the second mode of transit, and the selectable option includes an indication of a first estimated travel time to the first destination via the second mode of transit relative to the location of the electronic device, wherein the one or more programs further include instructions for:

while navigating to the first destination via the maps application and while displaying the user interface for changing the mode of transit for the navigation to the first destination that includes the selectable option, detecting a change in the location of the electronic device; and in response to detecting the change in the location of the electronic device:

in accordance with a determination that the change in the location of the electronic device causes an estimated travel time to the first destination via the second mode of transit to be a second estimated travel time, different from the first estimated travel time, updating the selectable option with an indication of the second estimated travel time.

44. The non-transitory computer readable storage medium of claim 29, the method further comprising:

before navigating to the first destination via the maps application, and while displaying a user interface associated with the maps application, receiving, via one or more input devices, a sequence of one or more inputs directed to the user interface associated with the maps application corresponding to a request to navigate to the first destination; and in response to receiving the sequence of one or more inputs, initiating a process to navigate to the first destination via the maps application.

45. The non-transitory computer readable storage medium of claim 44, wherein the first destination corresponds to a location of a second electronic device, different from the electronic device, that is associated with a second user, different from a user of the electronic device.

46. The non-transitory computer readable storage medium of claim 45, wherein the sequence of one or more inputs directed to the user interface associated with the maps application includes respective input directed to a user interface for the second user.

47. The non-transitory computer readable storage medium of claim 46, wherein the user interface for the second user includes:

in accordance with a determination that the user of the electronic device has access to the location of the second electronic device that is associated with the second user:

a second option that is selectable to display a user interface of an item locating application; and an indication of a current location of the second electronic device that is associated with the second user.

48. The non-transitory computer readable storage medium claim 47, wherein the user interface for the second user includes:

in accordance with a determination that the user of the electronic device does not have access to the location of the second electronic device that is associated with the second user:

a third option that is selectable to initiate a process to request access to the location of the second electronic device from the second user.

49. The non-transitory computer readable storage medium of claim 29, the method further comprising:

while navigating along a route including the first destination, in accordance with a determination that the first destination is associated with a location of a second electronic device, different from the electronic device, that is associated with a second user, different from a user of the electronic device, the navigation user interface associated with the maps application includes a selectable indication for sharing an estimated time of arrival (ETA) at the first destination with the second user.

50. The non-transitory computer readable storage medium of claim 49, the method further comprising:

the first destination corresponds to a location of a third electronic device, different from the electronic device and the second electronic device, that is associated with a third user, different from the user of the electronic device and the second user; and in accordance with the determination that the route includes a second destination that is associated with the location of the second electronic device that is associated with the second user:

the selectable indication is selectable to initiate a process for sharing the ETA at the second destination with one or more of a plurality of users, including the second user and the third user.

51. The non-transitory computer readable storage medium of claim 29, wherein the first destination corresponds to a location of a second electronic device, different from the electronic device, that is associated with a second user, different from a user of the electronic device, and the arrival user interface associated with the maps application for the first destination includes a selectable option that is selectable to display a user interface of an item locating application, the method further comprising:

while displaying the arrival user interface that includes the selectable option in accordance with the determination that the indication is detected while the location of the electronic device is within the second threshold distance from the first destination in response to detecting the indication, receiving, via one or more input devices, a selection of the selectable option in the arrival user interface; and in response to receiving the selection of the selectable option:

displaying, via the display generation component, the user interface of the item locating application, wherein the user interface includes information corresponding to the second user.

52. The non-transitory computer readable storage medium of claim 51, wherein the information corresponding to the user includes a selectable option that is selectable to display a user interface for locating the first destination, the method further comprising:

while displaying the user interface of the item locating application including the selectable option, receiving, via one or more input devices, a selection of the selectable option; and in response to receiving the selection of the selectable option:

in accordance with a determination that the location of the electronic device is still within the second threshold distance of the first destination, displaying, via the display generation component, the user interface for locating the first destination.

53. The non-transitory computer readable storage medium of claim 52, the method further comprising:

in response to receiving the selection of the selectable option:

in accordance with a determination that the location of the electronic device is no longer within the second threshold distance of the first destination, displaying, via the display generation component, the navigation user interface associated with the maps application, including initiating navigation to the first destination via the second mode of transit.

54. The non-transitory computer readable storage medium of claim 29, the method further comprising:

while navigating to the first destination in accordance with the first mode of transit, in accordance with a determination that the first destination is associated with an arrival point that requires navigation via the second mode of transit to arrive at the first destination, the first threshold distance and the second threshold distance are determined relative to the arrival point.

55. The non-transitory computer readable storage medium of claim 29, the method further comprising:

in response to detecting the indication, in accordance with a determination that the first destination is associated with a pre-arrival area and in accordance with a determination that the indication is detected while the location of the electronic device is within the first threshold distance of the pre-arrival area, displaying, via the display generation component, the first option in the navigation user interface that is selectable to initiate navigation to the first destination via the maps application in accordance with the second mode of transit.

56. The non-transitory computer readable storage medium of claim 29, the method further comprising:

while navigating to the first destination via the maps application in accordance with the first mode of transit and while displaying the navigation user interface associated with the maps application, detecting the location of the electronic device within the second threshold distance of the first destination;

in response to detecting the location of the electronic device within the second threshold distance of the first destination, displaying, via the display generation component, the arrival user interface associated with the maps application for the first destination;

while displaying the arrival user interface associated with the maps application for the first destination, without receiving an input terminating the navigation to the first destination, detecting the location of the electronic device outside the second threshold distance of the first destination; and in response to detecting the location of the electronic device outside the second threshold distance of the first destination:

replacing display, via the display generation component, of the arrival user interface associated with the maps application for the first destination with a user interface for changing a mode of transit for the navigation to the first destination.

57. The non-transitory computer readable storage medium of claim 56, wherein the user interface for changing the mode of transit for the navigation to the first destination includes a selectable option that is selectable to change the mode of transit from the first mode of transit to the second mode of transit, and the selectable option includes an indication of a first estimated travel time to the first destination via the second mode of transit relative to the location of the electronic device, the method further comprising:

while navigating to the first destination via the maps application and while displaying the user interface for changing the mode of transit for the navigation to the first destination that includes the selectable option, detecting a change in the location of the electronic device; and in response to detecting the change in the location of the electronic device:

in accordance with a determination that the change in the location of the electronic device causes an estimated travel time to the first destination via the second mode of transit to be a second estimated travel time, different from the first estimated travel time, updating the selectable option with an indication of the second estimated travel time.

* * * * *